(12) United States Patent
Yuminami et al.

(10) Patent No.: US 11,815,769 B2
(45) Date of Patent: *Nov. 14, 2023

(54) DISPLAY DEVICE

(71) Applicant: Sharp Kabushiki Kaisha, Sakai (JP)

(72) Inventors: Ryosuke Yuminami, Sakai (JP); Masakazu Miyamoto, Sakai (JP); Masahiro Yoshida, Sakai (JP); Masayuki Takashima, Sakai (JP); Toshiaki Fujihara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,868

(22) Filed: Nov. 22, 2022

(65) Prior Publication Data

US 2023/0080375 A1 Mar. 16, 2023

Related U.S. Application Data

(63) Continuation of application No. 17/238,256, filed on Apr. 23, 2021, now Pat. No. 11,513,403, which is a (Continued)

(30) Foreign Application Priority Data

Apr. 25, 2013 (JP) ................ 2013-092836

(51) Int. Cl.
*G02F 1/1345* (2006.01)
*G02F 1/1335* (2006.01)
(Continued)

(52) U.S. Cl.
CPC ........ *G02F 1/13452* (2013.01); *G02F 1/1337* (2013.01); *G02F 1/1339* (2013.01);
(Continued)

(58) Field of Classification Search
CPC ........... G02F 1/13452; G02F 1/133512; G02F 1/1337; G02F 1/1339; G02F 1/1345; G02F 1/133388
See application file for complete search history.

(56) References Cited

U.S. PATENT DOCUMENTS 10,989,967 B2 * 4/2021 Yuminami ........ G02F 1/133512
11,513,403 B2 * 11/2022 Yuminami .......... G02F 1/13452

OTHER PUBLICATIONS

Yuminami et al., "Display Device", U.S. Appl. No. 17/238,256, filed Apr. 23, 2021.

* cited by examiner

*Primary Examiner* — Edward J Glick
*Assistant Examiner* — David Y Chung
(74) *Attorney, Agent, or Firm* — KEATING & BENNETT, LLP

(57) ABSTRACT

A liquid crystal panel (display panel) 11 includes a display area AA configured to display images, a non-display area NAA outside the display area AA, a light blocking layer (a light blocking portion) 11*i* disposed at least in the non-display area NAA and configured to block light, a signal line connection line (a narrow line portion) 29 where lines are arranged at intervals in the non-display area NAA, and a common electrode connection line portion (a wide line portion) 30 disposed in the non-display area and having a line width greater than that of the signal line connection line 29 and including empty portions 34.

22 Claims, 28 Drawing Sheets

Related U.S. Application Data continuation of application No. 16/459,799, filed on Jul. 2, 2019, now Pat. No. 10,989,967, which is a continuation of application No. 14/785,388, filed as application No. PCT/JP2014/054809 on Feb. 27, 2014, now Pat. No. 10,394,094.

(51) Int. Cl.
*G02F 1/1337* (2006.01)
*G02F 1/1339* (2006.01)
*G02F 1/1333* (2006.01)

(52) U.S. Cl.
CPC ...... *G02F 1/1345* (2013.01); *G02F 1/133512* (2013.01); *G02F 1/133388* (2021.01)

DISPLAY DEVICE

TECHNICAL FIELD

The present invention relates to a display device.

BACKGROUND ART

A known liquid crystal panel that is a main component of a liquid crystal display device has the following configuration. The liquid crystal panel includes liquid crystals held between a pair of transparent boards. A sealing member is formed around the liquid crystals to seal the liquid crystals. One of the boards includes TFTs that are switching components, pixel electrodes, and traces. The other board includes color filters, common electrodes, and black matrix. Such a liquid crystal panel having the configuration is supplied with light from a backlight unit arranged on a rear surface side of the liquid crystal panel so that images appear on the liquid crystal panel. No black matrix is formed around the sealing member on the liquid crystal panel and therefore, light from the backlight unit may leak therefrom. A technology disclosed in Patent Document 1 is proposed to solve such a problem. In Patent Document 1, no black matrix is formed near the sealing member and a light blocking layer made of a metal layer is formed near the sealing member on a liquid crystal side surface of one of the transparent boards. The light blocking layer blocks light near the sealing member so that light from the backlight unit may not leak from the portion near the sealing member.

RELATED ART DOCUMENT

Patent Document

Patent Document 1: Japanese Unexamined Patent Application Publication No. 2000-338474

Problem to be Solved by the Invention

In Patent Document 1, the light blocking layer that is a metal layer is arranged to block light and therefore, the light blocking layer may generate parasitic capacitance with respect to other traces. To obviate such a problem, the black matrix may extend near the sealing member instead of forming the metal light blocking layer so as to ensure light blocking property near the sealing member. In such a configuration, following problems may be caused. The black matrix improves its light blocking property as it increases a thickness thereof. However, flatness of the panel may be deteriorated or a gap error may be caused as the black matrix increases the thickness. The black matrix improves its light blocking property as a density of a light blocking material contained therein increases. However, if the black matrix that contains a photosensitive resin material is patterned with a photolithographic technique and the density of the photosensitive material excessively increases, sensitivity of the photosensitive resin material is lowered and it may be difficult to form the black matrix. Due to such problems, the thickness of the black matrix or the density of the light blocking material may not be ensured. Then, the light blocking property is decreased and light may be likely to pass the black matrix so that traces that are arranged to overlap the black matrix may be seen as a shadow by a user. This may deteriorate appearance of the panel. Especially, in a liquid crystal panel of a normally white mode where light transmissivity is highest when no voltage is applied to the liquid crystals, no pixel electrode is arranged near the sealing member and the light transmissivity of the liquid crystals is always highest. Therefore, light is likely to leak near the sealing member and the above-described shadow is seen and the appearance of the panel may be deteriorated.

Further, the traces that overlap the black matrix may include signal line connection traces that are connected to signal lines and common electrode connection traces that are connected to a common electrode. In such a configuration, the signal line connection traces are arranged at intervals and the common electrode connection traces are arranged with a solid pattern. Accordingly, a part of rays of light passing through the black matrix passes through the signal line connection traces and the rays of light passing through the black matrix are less likely to pass through the common electrode connection traces. Therefore, the common electrode connection traces are likely to be seen as a shadow and an appearance of the panel may be degraded.

DISCLOSURE OF THE PRESENT INVENTION

The present invention was made in view of the foregoing circumstances. An object of the present invention is to improve an appearance.

Means for Solving the Problem

A display device according to the present invention includes a display area where images are displayed, a non-display area that is outside the display area, a light blocking portion disposed in at least the non-display area and configured to block light, a narrow line portion disposed in the non-display area and including narrow lines that are arranged at intervals, and a wide line portion disposed in the non-display area and having a width greater than that of the narrow line portion and including empty portions.

According to such a configuration, the light blocking portion for blocking light is disposed in the non-display area that is outside the display area where images appear. Therefore, the narrow line portion and the wide line portion are less likely to be seen by a user of the display device. If the light blocking property of the light blocking portion is insufficient and light transmits through the light blocking portion, the light transmits through portions between the adjacent narrow lines that are arranged at intervals. In such a configuration, if the wide line portion has no empty portions and is formed in a solid pattern, the light is less likely to pass through the wide line portion and the amount of light passing through the wide line portion and that of light passing through the narrow line portion greatly differ from each other. As a result, the wide line portion is likely to be seen as a shadow by the user of the display device and this may deteriorate the appearance of the display device. The wide line portion partially includes empty portions and the light passes through the empty portions of the wide line portion similarly to the narrow line portion. Accordingly, it is less likely to occur that the wide line portion is seen as a shadow by the user of the display device and the good appearance of the display device is maintained. If the light blocking portion of a metal for blocking light is additionally arranged to prevent leakage of light, the metal light blocking portion may generate parasitic capacitance with the narrow line portion or the wide line portion. However, the side line portion partially having the empty portions may obviate occurrence of such a problem.

Preferable embodiments of a first display device of the present invention may include the following configurations.

(1) The side line portion may be configured such that a ratio of an area of the empty portions to an area of the wide line portion is substantially equal to a ratio of an area of the empty parts to an area of the narrow line portion. According to such a configuration, the amount of light that is blocked by the wide line portion is equal to the amount of light that is blocked by the narrow line portion, and the amount of light passing through the empty portions of the wide line portion is equal to the amount of light passing through the empty parts between the adjacent narrow lines. Therefore, the wide line portion and the narrow line portion are seen by the user of the display device with similar brightness and this effectively improves the appearance of the display device.

(2) The wide line portion may include divided lines that are defined by the empty portions and are arranged at intervals. According to such a configuration, the divided lines included in the wide line portion are defined by the empty portions and are arranged parallel to each other at intervals similarly to the narrow line portion. Accordingly, the wide line portion and the narrow line portion are seen by the user of the display device with similar brightness and the appearance is improved.

(3) In the wide line portion, each of the divided lines may have a line width that is equal to that of each of the narrow lines and adjacent divided lines have an interval therebetween that is equal to an interval between adjacent narrow lines. According to such a configuration, the amount of light that is blocked by the divided lines included in the wide line portion is equal to the amount of light that is blocked by the narrow line portion, and the amount of light passing through the empty portions between the adjacent divided lines is equal to the amount of light passing through the empty portions between the adjacent narrow lines. Accordingly, the wide line portion and the narrow line portion are seen by the user of the display device with similar brightness and the appearance is improved.

(4) The wide line portion may further include short-circuit portions configured to short-circuit adjacent divided lines. According to such a configuration, the adjacent divided lines are short-circuited by the short-circuit portion. Therefore, even if any one of the divided lines is disconnected, the divided line having the disconnection is electrically connected to the adjacent divided lines via the short-circuit portions. Further, line resistance of the wide line portion is reduced.

(5) The display device may further include boards each including the display area and the non-display area, a liquid crystal layer sandwiched between the boards, alignment films disposed on plate surfaces of the respective boards opposite the liquid crystal layer, disposed over the display area and the non-display area, and configured to orient liquid crystal molecules included in the liquid crystal layer. The narrow line portion may include a portion that overlaps the alignment films in a plan view, and the wide line portion may include an alignment film overlap portion overlapping the alignment films and an alignment film non-overlap portion that does not overlap the alignment films, and the empty portions may be formed at least in the alignment non-overlap portion. According to such a configuration, a pair of alignment films is formed on respective plate surfaces of a pair of boards opposite the liquid crystal layer so that the liquid crystal molecules in the liquid crystal layer are oriented appropriately. The amount of light passing through the liquid crystal layer is controlled by a voltage applied to the liquid crystal layer. The pair of alignment films is disposed to extend over the display area and the non-display area. Therefore, even if positions of the alignment films are displaced from the correct positions during the manufacturing process, the alignment films are possibly disposed in the display area. A part of rays of light passing through the liquid crystal layer including the liquid crystal molecules oriented by the alignment films passes through portions between the narrow lines at least a part of which overlaps the alignment films in a plan view. The wide line portion includes the alignment film overlap portion overlapping the alignment films n a plan view and the alignment film non-overlap portion that does not overlap the alignment films in a plan view. The alignment film overlap portion includes the empty portions and therefore, a part of rays of light passing through the liquid crystal layer oriented by the alignment films passes through the empty portions formed in the alignment film overlap portion. Accordingly, the wide line portion is less likely to be seen as a shadow by the user and the good appearance of the display device is maintained.

(6) The display device may further include a sealing member disposed between the boards to surround and seal the liquid crystal layer. The sealing member may be made of thermosetting resin. The alignment film non-overlap portion may include a sealing member overlap portion overlapping the sealing member in a plan view and a sealing member non-overlap portion that does not overlap the sealing member in a plan view, and the sealing member overlap portion may include sealing empty portions through which light passes to cure the sealing member. According to such a configuration, the liquid crystal layer sandwiched between the boards is disposed between the boards and enclosed by the sealing member that surrounds the liquid crystal layer. The sealing member made of photo curing resin is cured by irradiation of light during the manufacturing process. The alignment film non-overlap portion includes the sealing member overlap portion overlapping the sealing member in a plan view and the sealing member non-overlap portion that does not overlap the sealing member in a plan view. The sealing member overlap portion selectively includes the sealing member empty portions so that light for curing the sealing member passes through the sealing member empty portions of the sealing member overlap portion and is directed to the sealing member during the manufacturing process. Even if the alignment film non-overlap portion includes the sealing member overlap portion, the sealing member is effectively cured. The sealing member non-overlap portion of the alignment film non-overlap portion does not include the sealing member empty portions. This is preferable for keeping an area of the wide line portion and decreasing line resistance in the wide line portion.

(7) The narrow line portion, the wide line portion, and at least pixel electrodes may be disposed on a plate surface of one of the boards opposite the liquid crystal layer. The light blocking portion and a common electrode that is opposite at least the pixel electrode may be disposed on a plate surface of another one of the boards opposite the liquid crystal layer. The sealing member non-overlap portion may be electrically connected to the common electrode in the wide line portion. According to such a configuration, potential difference is generated between the pixel electrodes disposed on the liquid crystal layer side plate surface of the one board and the common electrode disposed on the liquid crystal layer side plate surface of the other board so that the amount of light passing through the liquid crystal layer is controlled by controlling the orientation of the liquid crystal molecules in the liquid crystal layer. In the wide line portion, no empty portion is formed in the sealing member non-overlap portion that does not overlap the sealing member. This ensures high reliability in the electrical connection with the common electrode.

(8) The display device may further include signal processors arranged at intervals and configured to process input signals supplied from an external signal supplier and generate output signals and output the output signals to the display area. The narrow line portion may extend over the signal processors and the display area to transmit the output signals to the display area and routed to spread from the respective signal processors toward the display area so as to have a shape of fan. The wide line portion may be sandwiched between the narrow lines that are routed from the respective signal processors that are adjacent to each other. According to such a configuration, the output signals generated by the signal processors are transmitted to the display area via the narrow line portion extending and spreading from the respective signal processors, which are arranged at intervals, to the display area in a fan-shape. In the configuration that the wide line portion is disposed between the two adjacent groups of the narrow lines extending from the respective adjacent two signal processors, if the amount of light passing through the narrow line portion differs from the amount of light passing through the wide line portion, the appearance of the display device may be deteriorated. However, the wide line portion includes the empty portions in this embodiment so that the difference between the amount of light passing through the narrow line portion and the amount of light passing through the wide line portion is reduced. Accordingly, the appearance of the display device is improved.

(9) The display device may further include boards each including the display area and the non-display area, a liquid crystal layer sandwiched between the boards, and alignment films disposed on plate surfaces of the respective boards opposite the liquid crystal layer, disposed over the display area and the non-display area, and configured to orient liquid crystal molecules included in the liquid crystal layer. One of the boards may include a liquid crystals non-orientation portion that overlaps the narrow line portion and the wide line portion in the non-display area in a plan view and the liquid crystal molecules included in the liquid crystal layer are not oriented. According to such a configuration, even if light passes through the light blocking portion, portions between the adjacent narrow lines, and the empty portions of the wide line portion, the liquid crystal molecules are not oriented due to the liquid crystals non-orientation portion. Thus, the light is less likely to pass therethrough and the light leakage is less likely to be caused and the good appearance of the display device is effectively maintained.

(10) The display device may further include check lines that are disposed in the non-display area and connected to the narrow line portion to check the narrow line portion. The wide line portion may include the check lines and the check lines may include the empty portions. According to such a configuration, the empty portions are formed between the check lines included in the wide line portion, and light passes through the empty portions similarly to the narrow line portion. Accordingly, the check lines are less likely to be seen by a user and good appearance of the display device is maintained.

(11) The display device may further include boards each including the display area and the non-display area, a liquid crystal layer sandwiched between the boards, and alignment films disposed on plate surfaces of the respective boards opposite the liquid crystal layer, disposed at least in the display area, and configured to orient liquid crystal molecules included in the liquid crystal layer. The display device is a normally white mode where light transmissivity is highest when no voltage is applied between the boards. In the display device that is a normally white mode panel, the light transmittance is highest when no voltage is applied between the boards. Therefore, the outer appearance may be deteriorated due to the leakage of light. However, even if the light passing through the empty portions included in the wide line portion leaks therefrom, the wide line portion is less likely to be seen by the user as a shadow and the appearance is less likely to be deteriorated.

A second display device according to the present invention includes boards each including a display area where images are displayed and a non-display area that is outside the display area, a liquid crystal layer sandwiched between the boards, liquid crystals orientation portions disposed in the display area of plate surfaces of the boards opposite the liquid crystal layer and configured to orient liquid crystal molecules in the liquid crystal layer, a light blocking portion disposed at least in the non-display area of one of the boards, lines arranged at intervals in the non-display area of one of the boards, and a liquid crystals non-orientation portion that overlaps at least the lines in a plan view in the non-display area of one of the boards and does not orient the liquid crystal molecules included in the liquid crystal layer.

According to such a configuration, a pair of the liquid crystals orientation portions is disposed in the display area of the plate surfaces of the boards opposite the liquid crystal layer. Therefore, liquid crystal molecules in the liquid crystal layer are appropriately oriented and the amount of light passing through the liquid crystal layer is controlled by adjusting the voltage applied to the liquid crystal layer. The light blocking portion is disposed in the non-display area of one of the boards. The non-display area is outside the display area where images appear. Thus, the lined disposed in the non-display area are less likely to be seen by the user of the display device.

If the light blocking portion has an insufficient light blocking property and the light passes through the light blocking portion, the light passes through portions between the adjacent lines that are disposed at intervals and the light leaks therefrom. The lines are seen as a shadow by the user of the display device and the appearance of the display device may be deteriorated. If a light blocking portion made of metal for blocking light to prevent leakage of light, the light blocking portion may generate parasitic capacitance with the lines. The liquid crystals non-orientation portion is disposed to overlap at least the lines in a plan view in the non-display area of one of the boards. The liquid crystals non-orientation portion is not subjected to the orientation of the liquid crystal molecules in the liquid crystal layer. Therefore, even if light passes through the portions between the adjacent lines, the liquid crystal molecules are not oriented via the liquid crystals non-orientation portion and the light is less likely to pass therethrough. Accordingly, the leakage of light is less likely to occur and the lines are less likely to be seen as the shadow and the good appearance of the display device is maintained. Further, the additional light blocking portion made of metal is not necessary to be arranged to prevent leakage of light. Therefore, the parasitic capacitance is less likely to be generated between the metal light blocking portion and the lines.

Preferable embodiments of a second display device of the present invention may include the following configurations.

(1) The display device may further include alignment films disposed on plate surfaces of the boards opposite the liquid crystal layer and in at least the display area. The liquid crystals orientation portion may correspond to portions of the respective alignment films in the display area. One of the boards may include an alignment film non-arrangement area on a plate surface thereof opposite the liquid crystal layer, and one of the alignment films may be disposed not to overlap the lines in a plan view in the alignment film non-arrangement area. The liquid crystals non-orientation portion may correspond to the alignment film non-arrangement area. According to such a configuration, the liquid crystals non-orientation portion corresponds to the alignment film non-arrangement area where no alignment film is disposed, and light is less likely to pass therethrough. The position of the areas where the alignment films are formed is precisely determined.

(2) The alignment films may extend over the display area and the non-display area. The display device may further include a second light blocking portion configured to block light and disposed in the non-display area of one of the boards and overlapping the alignment films in a plan view and disposed on a display area side with respect to the lines. According to such a configuration, the pair of the alignment films extends over the display area and the non-display area. Therefore, even if the arrangement position of the alignment films is displaced during the manufacturing process, the alignment films are reliably arranged in the display area. A part of each alignment film is disposed in the non-arrangement area, and light passing through the light blocking portion may leak therefrom. The light is blocked by the second light blocking portion that overlaps in a plan view the portions of the alignment films in the non-display area and is arranged closer to the display area side than the lines. Accordingly, the leakage of light is less likely to occur.

(3) The display device may further include alignment films disposed on plate surfaces of the boards opposite the liquid crystal layer and in at least the display area. The alignment films may include portions disposed in the display area and the portions may correspond to an orientation processed portion that is subjected to orientation processing. One of the alignment films may include an orientation non-processed portion in the non-display area, the orientation non-processed portion overlapping at least the lines in a plan view, and the orientation non-processed portion is not subjected to the orientation processing. The liquid crystals orientation portion may correspond to the orientation processed portion and the liquid crystals non-orientation portion may correspond to the orientation non-processed portion. According to such a configuration, the pair of alignment films extends over the display area and non-display area. Therefore, even if the positions of the alignment films are displaced during the manufacturing process, the alignment films are reliably disposed in the display area. The liquid crystals orientation portion corresponds to the rubbing processed portion that is a portion of the pair of alignment films that are subjected to the orientation process, and the liquid crystals non-orientation portion corresponds to the rubbing non-processed portion that is a portion of one of the pair of alignment films that is not subjected to the orientation process. In this configuration, the accuracy of the forming area of the alignment films may not be ensured. Even if the accuracy of the position of the forming area of the alignment films is low, the liquid crystals non-orientation portion is reliably arranged and this reduces a cost.

(4) The alignment films may have a same formation area in a plan view of the boards, and the liquid crystals non-orientation portion may be included in each of the boards. According to such a configuration, since the liquid crystals non-arrangement portion is disposed on each of the boards, the light passing through portions between the adjacent lines is reliably prevented from leaking therefrom. Therefore, the lines are further less likely to be seen as the shadow and good appearance of the display device is effectively maintained. Further, the alignment films have the same plan view forming areas on the boards. Therefore, the alignment film printing plate is commonly used for patterning the alignment films during the manufacturing process and a manufacturing cost is reduced.

(5) The display device may further include a wide line portion that is disposed in the non-display area of one of the boards and has a line width greater than the lines and partially includes empty portions. If the wide line portion has no empty portions and is formed in a solid pattern, the light is less likely to pass through the wide line portion and the amount of light passing through the wide line portion and that of light passing through the lines greatly differ from each other. As a result, the wide line portion is likely to be seen as a shadow by the user of the display device and this may deteriorate the appearance of the display device. In this embodiment, the wide line portion partially includes empty portions and the light passes through the empty portions of the wide line portion similarly to the lines. Accordingly, it is less likely to occur that the wide line portion is seen as a shadow by the user of the display device and the good appearance of the display device is maintained.

(6) The display device may further include boards each including the display area and the non-display area, a liquid crystal layer sandwiched between the boards, and alignment films disposed on plate surfaces of the respective boards opposite the liquid crystal layer, disposed in at least the display area, and configured to orient liquid crystal molecules included in the liquid crystal layer. The display device is a normally white mode where light transmissivity is highest when no voltage is applied between the boards. According to such a configuration, in the display device that is in a normally white mode, the light transmittance is maximum when no voltage is applied between the boards. Therefore, the appearance may be deteriorated due to the leakage of light. However, even if light leaks from the empty portions of the wide line portion or the portions between the adjacent lines, the wide line portion or the lines are less likely to be seen as the shadow by the user, and the appearance is less likely to be deteriorated.

Advantageous Effect of the Invention

According to the present invention, the appearance is improved.

MODE FOR CARRYING OUT THE INVENTION

First Embodiment

Figure 1:
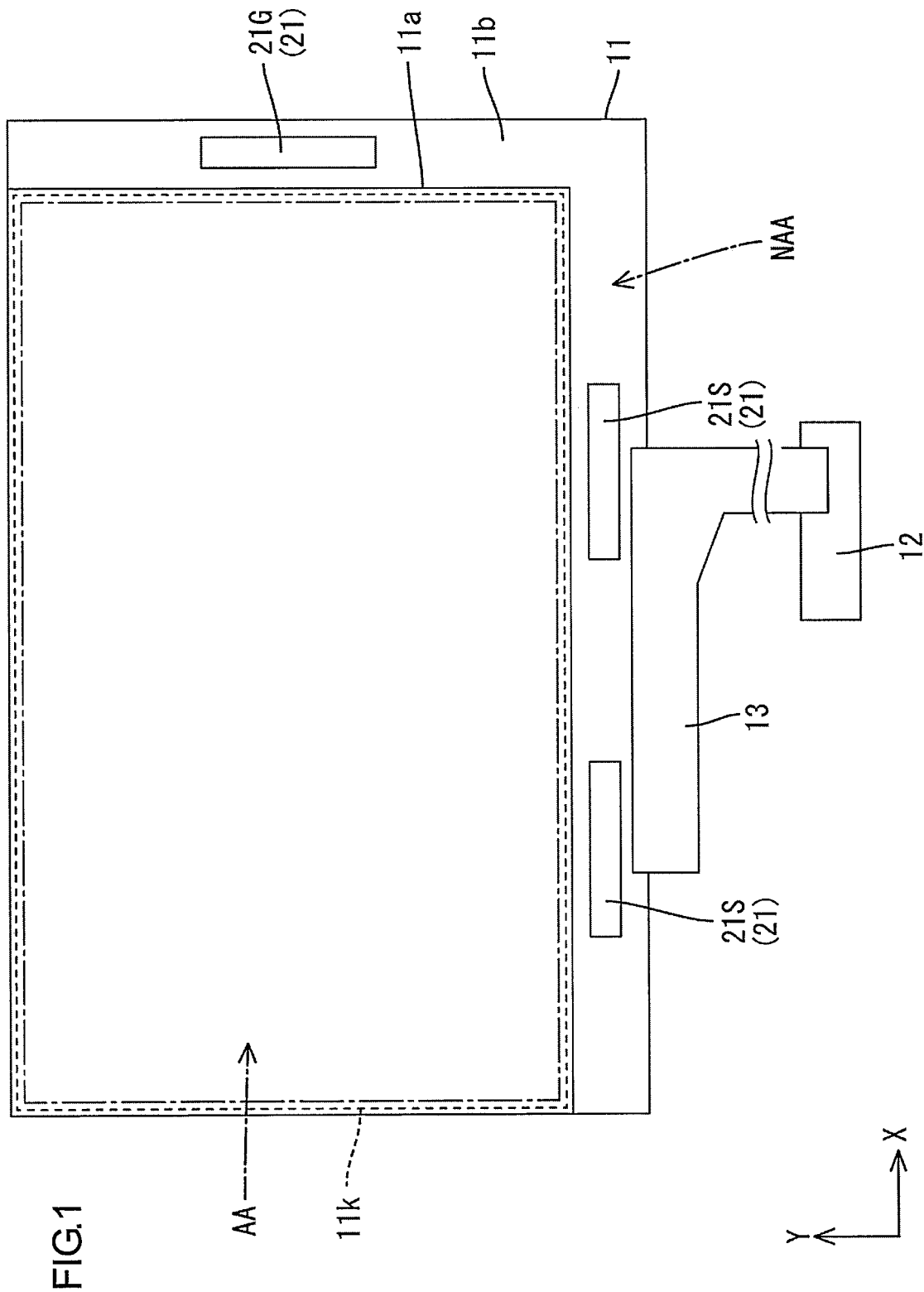
FIG. 1 is a schematic plan view of a liquid crystal panel with a driver mounted thereon, a flexible printed circuit board, and a control circuit board according to a first embodiment of the present invention illustrating connection thereamong.

A first embodiment of the present invention will be described with reference to FIGS. 1 to 8. A liquid crystal display device 10 will be described as an example. X-axis, the Y-axis and the Z-axis may be present in the drawings. The axes in each drawing correspond to the respective axes in other drawings. The vertical direction is defined based on FIG. 2. An upper side and a lower side in FIG. 2 correspond to a front side and the back side, respectively.

Figure 2:
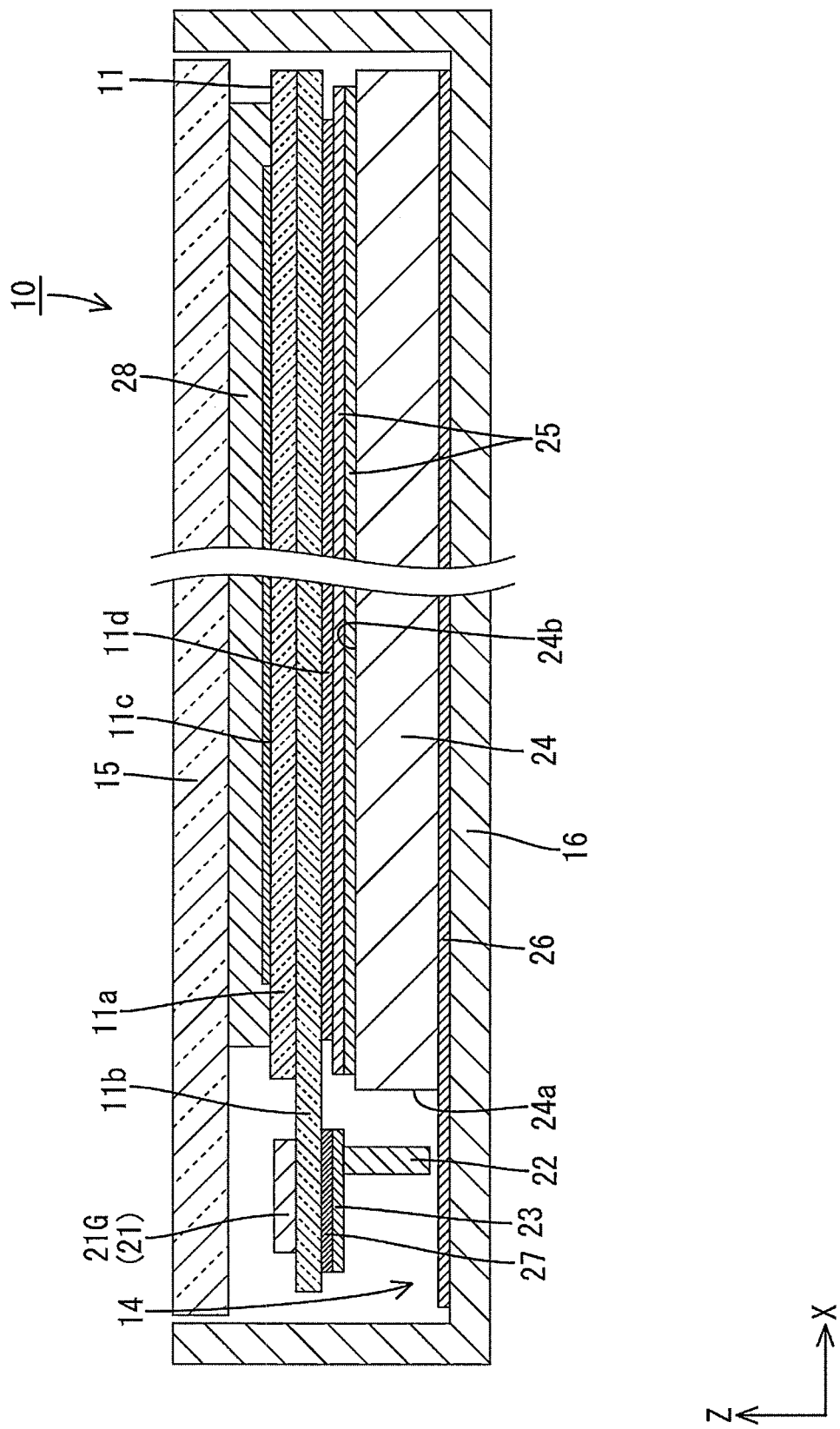
FIG. 2 is a schematic cross-sectional view of a liquid crystal display device illustrating a cross-sectional configuration along a long-side direction thereof.

As illustrated in FIGS. 1 and 2, a liquid crystal display device 10 includes a liquid crystal panel (a display panel, a display device) 11, a driver (a signal processor, drive circuit) 21, a control circuit board (an external signal source) 12, a flexible printed circuit board (an external connecting component) 13, and a backlight unit (a lighting device) 14. The liquid crystal panel 11 includes a display area AA and a non-display area NAA around the display area AA. The display area AA is an inner area configured to display images. The driver 21 is configured to drive the liquid crystal panel 11. The control circuit board 12 is configured to supply various input signals (input signals relating driving power, reference electric potential, and images, for example) from the outside to the driver 21. The flexible printed circuit board 13 electrically connects the liquid crystal panel 11 to the external control circuit board 12. The backlight unit 14 is an external light source configured to supply light to the liquid crystal panel 11. The liquid crystal display device 10 further includes a touch panel 15 and a casing (a casing, an exterior member) 16. A user inputs position information in the display area AA of the liquid crystal panel 11 via the touch panel 15. The liquid crystal panel 11, the backlight unit 14, and the touch panel 15 are arranged in the casing 16. The liquid crystal display device 10 according to this embodiment may be used in various kinds of electronic devices (not illustrated) such as in-vehicle terminals (car-mounted navigation system, mobile (movable, portable) car navigation system). The liquid crystal panel 11 in the liquid crystal display device 10 has a screen size of about seven inches. Namely, the liquid crystal panel 11 is in a size that is classified as a small or a small-to-medium.

A general configuration of the liquid crystal panel 11 will be described. As illustrated in FIG. 1, the liquid crystal panel 11 has a horizontally-long rectangular overall shape (a rectangular shape). The liquid crystal panel 11 includes the display area (an active area) AA that is off centered toward one of ends of a short dimension thereof (the upper side in FIG. 1) and toward one of ends of a long dimension thereof (the left side in FIG. 1). The driver 21 and the flexible printed circuit board 13 are mounted to a portion of the liquid crystal panel 11 closer to the other end of the long dimension and the short dimension of the liquid crystal panel 11 (the lower side and the right side in FIG. 1), respectively. In FIG. 1, a frame shape of a dot-and-dashed line that is slightly smaller than the CF board 11a represents an outer line of the display area AA and an area outside the dot-and-dashed line is a non-display area NAA. An area of the liquid crystal panel 11 outside the display area AA is the non-display area (a non-active area) NAA in which images are not displayed. The non-display area NAA includes a frame-shaped area around the display area AA that includes a mounting area (an attachment area) to which the driver 21 and the flexible printed circuit board 13 are mounted. The long dimension of the liquid crystal panel 11 coincides with the X-axis direction of each drawing and the short dimension thereof coincides with the Y-axis direction of each drawing.

Figure 3:
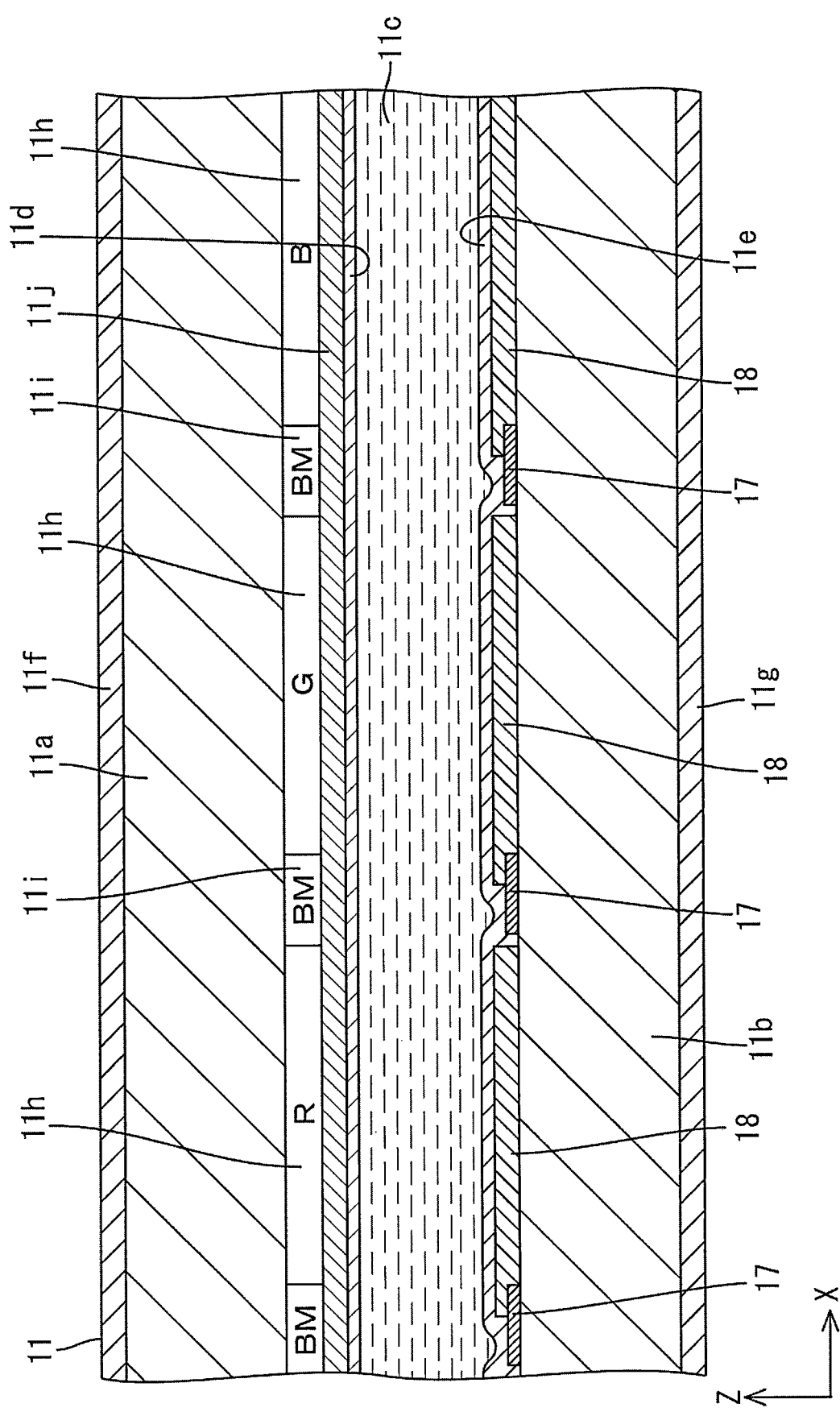
FIG. 3 is a schematic cross-sectional view illustrating a cross-sectional configuration of a display area of the liquid crystal panel.

As illustrated in FIG. 3, the liquid crystal panel 11 includes at least a pair of transparent glass boards (having light transmissivity) 11a and 11b, a liquid crystal layer 11c, and a sealing member 11c. The liquid crystal layer 11c is between the boards 11a and 11b and includes liquid crystal molecules having optical characteristics that change according to application of the electric field. The sealing member 11c is between the boards 11a and 11b so as to surround and seal the liquid crystal layer 11c. One of the boards 11a and 11b on the front side is a CF board (a counter board) 11a. The other one of the boards 11a and 11b on the rear side (the back side) is an array board (an active matrix board, component board) 11b. As illustrated in FIG. 1, the CF board 11a has a long dimension smaller than that of the array board 11b. The CF board 11a is bonded to the array board 11b with one of ends of the short dimension (the upper end in FIG. 1) aligned with a corresponding edge of the array board 11b and one of ends of the short dimension (the left end in FIG. 1) aligned with a corresponding edge of the array board 11b. A predetermined area of the other end of the short dimension of the array board 11b (the lower end in FIG. 1) and a predetermined area of the other end of the long dimension of the array board 11b (the right end in FIG. 1) do not overlap the CF board 1a and front and back plate surfaces of the area are exposed to the outside. The mounting area in which the driver 21 and the flexible printed circuit board 13 are mounted is provided in this area.

As illustrated in FIG. 3, alignment films 11d and 11e are formed on inner surfaces of the boards 11a and 11b, respectively, for alignment of the liquid crystal molecules included in the liquid crystal layer 11c. The alignment films 11d and 11e are formed of, for example, polyimide. The alignment films 11d and 11e are configured to align, by rubbing an entire area of the inner surface thereof with cloth along a certain direction in the manufacturing process (an alignment process), the liquid crystal molecules included in the liquid crystal layer 11c that are opposite the alignment films 11d and 11e in a certain direction and maintains the alignment condition. This is so-called anchoring process. Extending directions of grooves formed with the anchoring process on the inner surfaces of the alignment film 11d on the CF board 11a side and the alignment film 11e on the array board 11b side are perpendicular to each other (different by 90 degrees). Thus, the liquid crystal panel 11 is a Twisted Nematic type (TN type), namely, the liquid crystal molecules in the liquid crystal layer 11c that are subjected to the anchoring process by the alignment films 11d, 11e are twisted at an angle of 90 degrees. A pair of polarizing plates 11f and 11g are bonded to the outer surfaces of the boards 11a and 11b, respectively. The polarizing plates 11f and 11g are arranged in a crossed Nicol state and polarizing directions of the polarizing plates 11f and 11g are perpendicular to each other (different by 90 degrees). The liquid crystal panel 11 is a panel of a normally white mode and when no voltage is applied to the liquid crystal layer 11c, the light transmissivity of the liquid crystal panel 11 is maximum and the liquid crystal panel 11 displays white. The alignment films 11d and 11e are arranged to cover the display area AA and the non-display area NAA. Therefore, even if the alignment films 11d, 11e may be formed out of position during the manufacturing process, the alignment films 11d and 11e are possibly arranged to cover the display area AA due to a margin on the non-display area NAA side. The alignment films 11d and 11e have a margin on the non-display area NAA side (a dimension of an extra part out of the display area AA toward the non-display area NAA) and the margin is about several hundred μm, for example.

As illustrated in FIG. 3, the liquid crystal layer 11c is sealed between the boards 11a and 11b by a so-called one drop filling method. Liquid crystals that are material for the liquid crystal layer 11c are dropped on the CF board 11a and the array board 11b is bonded to the CF board 11a. The liquid crystals evenly spread in a space between the boards 11a and 11b. As illustrated in FIG. 1, the sealing member 11k is disposed in the non-display area NAA of the liquid crystal panel 11. As illustrated in FIG. 1, the sealing member 11k has a horizontally-long rectangular frame shape following the display area AA and the non-display area NAA in a plan view (viewed from a direction normal to a plate surface of the array board 11b). In FIG. 1, the sealing member 11k is illustrated by a dot line forming a frame shape that is larger than an outer edge line of the display area AA. A distance between the boards 11a and 11b (a thickness of the liquid crystal layer 11c), that is, a cell gap is maintained constant with columnar spacers (not illustrated) that are formed on the CF board 11a in the display area AA. The cell gap is maintained constant with the sealing member 11k at edge areas of the boards 11a and 11b. The sealing member 11k contains ultraviolet curing resin (curing resin) that is hardened by application of ultraviolet rays. Before the application of the ultraviolet rays, the ultraviolet curing resin is in the liquid state having flowability. After the application of the ultraviolet rays, the ultraviolet curing resin is hardened and in the solid state. A number of spacer particles (not illustrated) are dispersed in the ultraviolet curing resin.

Figure 4:
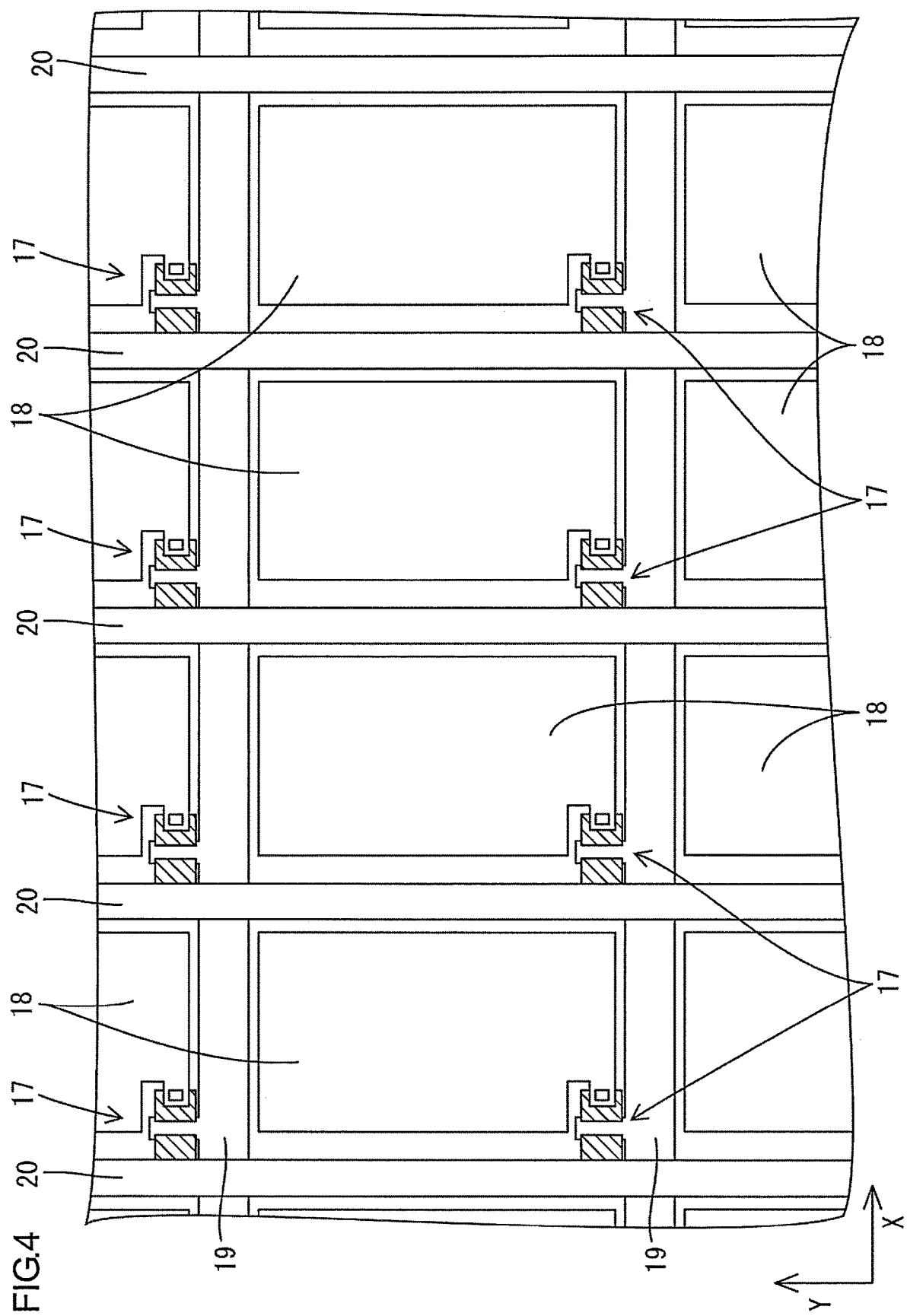
FIG. 4 is a magnified plan view illustrating a plan view configuration of a display area of an array board included in the liquid crystal panel.

Next, configurations of components in the display area AA of the array board 11b and the CF board 11a will be described in detail. As illustrated in FIGS. 3 and 4, on an inner surface side (the liquid crystal layer 11c side, a surface side opposite the CF board 11a) of the array board 11b, a number of TFTs (thin film transistors) 17, which are switching components, and a number of pixel electrodes 18 are disposed in a matrix. Gate lines (row control lines, scanning lines) 19 and source lines (column control lines, data lines) 20 are routed in a matrix such that each of the TFTs 17 and the pixel electrodes 18 is surrounded by the gate lines 19 and the source lines 20. Namely, pixels PX each including the TFT 17 and the pixel electrode 18 are disposed in parallel to be arranged in a matrix at respective corners defined by the gate lines 19 and the source lines 20 that are formed in a matrix. The pixels PX are arranged in the X-axis direction and the Y-axis direction. The gate lines 19 and the source lines 20 are formed from metal (conductive material). An insulator is interposed between the gate line 19 and the source line 20 at an intersection thereof. The gate lines 19 and the source lines 20 are connected to gate electrodes and source electrodes of the TFTs 17, respectively. The pixel electrodes 18 are connected to drain electrodes of TFTs 17. The TFTs 17 include an amorphous silicon (a-Si) thin film as a semiconductor film that enables electron mobility between the source electrodes and the drain electrodes. Each of the pixel electrodes 18 has a vertically-long rectangular plan view shape (a rectangular shape) and is made of a transparent electrode material such as indium tin oxide (ITO) or zinc oxide (ZnO). The pixel electrodes 18 are supplied with a predetermined voltage according to a gradation of a display image at a predetermined timing via the TFTs 17. The array board 11b may be provided with an auxiliary capacitor line (not illustrated) that is in parallel to the gate line 19 and crosses and overlaps the pixel electrode 18 having an insulation layer therebetween.

Figure 5:
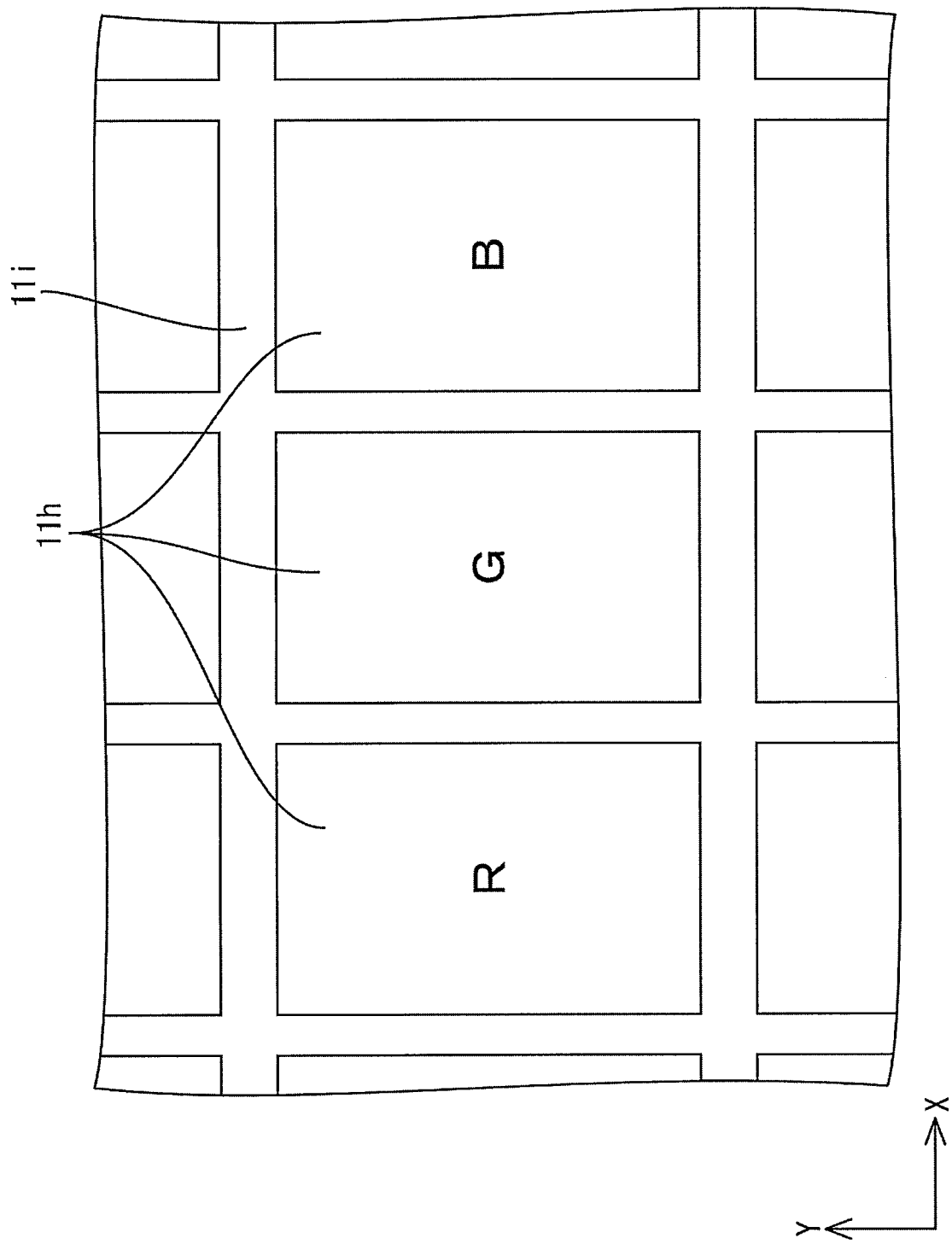
FIG. 5 is a magnified plan view illustrating a plan view configuration of the display area of a CF board included in the liquid crystal panel.

As illustrated in FIGS. 3 and 5, the CF board 11a includes color filters 11h including red (R), green (G), and blue (B) color portions arranged in a matrix so as to overlap the pixel electrodes 18 on the array board 11b side in a plan view. A light blocking layer (a light blocking portion, a black matrix) 11i is formed in a grid between the coloring portions of the color filters 11h for preventing colors from mixing. The light blocking layer 11i is made of photosensitive resin that contains a light locking material such as carbon black. The light blocking layer 11i is disposed in a grid to overlap the gate lines 19 and the source lines 20 in a plan view in the display area AA by patterning with a photolithography method. The light blocking layer 11i extends over the display area AA and the non-display area NAA and arrangement of the light blocking layer 11i in the non-display area NAA will be described later in detail. On surfaces of the color filters 11h and the light blocking layer 11i, a common electrode 11j is disposed in a solid area opposite the pixel electrode 18 that is on the array board 11b side. The common electrode 11j is made of a transparent electrode material such as indium tin oxide (ITO) or zinc oxide (ZnO) similar to the pixel electrodes 18. The common electrode 11j is supplied with reference potential (common potential) from the array board 11b side via a connection configuration, which will be described later. A voltage is generated according to a potential difference between the common electrode 11j and the pixel electrodes 18 and the voltage is applied to the liquid crystal layer 11c. The common electrode 11j extends over the display area AA and the non-display area NAA similar to the light blocking layer 11i.

As illustrated in FIG. 1, the control circuit board 12 includes a substrate, power components, and electronic components (control circuit). The substrate is made of paper phenol or glass epoxy resin. The power components and the electronic components are mounted on the substrate. The power components are configured to supply the driving power and the reference potential to each driver 21. The electronic components are configured to control supply of input signals of images to the liquid crystal panel 11. Traces (electrically conductive paths) which are not illustrated are formed in predetermined patterns. An end (end side) of the flexible printed circuit board 13 is electrically and mechanically connected to the control circuit board 12 via an anisotropic conductive film (ACF), which is not illustrated.

The flexible printed circuit board (an FPC board) 13 includes a base member made of synthetic resin having an insulating property and flexibility (e.g., polyimide resin) as illustrated in FIG. 1. A number of traces are formed on the base member (not illustrated). One end of the long dimension of the flexible printed circuit board 13 is connected to the control circuit board 12 as described above, while the other end of the long dimension of the flexible printed circuit board 13 is connected to the array board 11b in the liquid crystal panel 11 via the ACF. The flexible printed circuit board 13 is therefore bent or folded back inside the liquid crystal display device 10 such that a cross-sectional shape thereof forms a U-like shape. At the ends of the long dimension of the flexible printed circuit board 13, the tracing patterns are exposed to the outside and configured as terminals (not illustrated). The terminals are electrically connected to the control circuit board 12 and the liquid crystal panel 11 via the ACF. With this configuration, input signals supplied by the control circuit board 12 are transmitted to the liquid crystal panel 11.

As illustrated in FIG. 1, the driver 21 is provided by an LSI chip including drive circuits which are not illustrated. The driver 21 is configured to be operated according to signals supplied by the control circuit board 12 serving as a power source, to process the input image signal supplied by the control circuit board 12 serving as a signal source to generate output signals, and to output the output signals to the display area AA of the liquid crystal panel 11. The driver 21 has an elongated rectangular shape in a plan view. The driver 21 is directly mounted in the non-display area NAA of the array board 11b included in the liquid crystal panel 11, that is, mounted by the chip-on-glass (COG) mounting method. The driver 21 has a driver-side terminal on a bottom surface thereof and the driver-side terminal (not illustrated) is electrically connected via the ACF (not illustrated) to a board-side terminal (not illustrated) formed on the array board 11b. The driver 21 includes a gate-side driver 21G and source-side drivers 21S. The gate-side driver 21G is configured to supply scanning signals as output signals to the gate lines 19 that are disposed in the display area AA. The source-side drivers 21S are configured to supply data signals as output signals to the source lines 20. The gate-side driver 21G is disposed in substantially middle on the short-side edge area of the array board 11b and the long dimension and the short dimension thereof correspond to the Y-axis direction and the X-axis direction, respectively. The source-side drivers 21S are disposed in the long-side edge area of the array board 11b to be offset from the middle, and the long dimension and the short dimension thereof correspond to the X-axis direction and the Y-axis direction, respectively. The two source-side drivers 21S are disposed having a predetermined distance therebetween in the X-axis direction (in the long-side direction of the array board 11b) and on a straight line along the X-axis. In the following, a suffix letter of "G" is provided to the reference numerals for the gate-side drivers and a suffix letter of "S" is provided to the reference numerals for the source-side drivers to distinguishing each of the drivers 21, and no suffix letter is provided to the reference numerals for the general drivers 21.

Next, the backlight unit 14 will be described. As illustrated in FIG. 2, the backlight unit 14 includes at least LEDs 22 as light sources, an LED board 23 where the LEDs 22 are mounted, a light guide plate 24, optical sheets 25, and a reflection sheet 26. The light guide plate 24 guides light emitted by the LEDs 22 toward the liquid crystal panel 11. The optical sheets 25 apply optical characteristics to the light from the light guide plate 24 and convert the light into a planar light and the planar light exits the optical sheets 25 toward the liquid crystal panel 11. The reflection sheet 26 is disposed on an opposite side from the optical sheet 25 side with respect to the light guide plate 24. The light reflects off the reflection sheet 26 and is directed toward the optical sheets 25 (a liquid crystal panel 11 side). The LEDs 22 emits substantially white light and each LED 22 has a light emission surface on a side surface adjacent to a mount surface that is attached to the LED board 23, namely, the LEDs 22 are so called a side-surface light emission type. The LED board 23 includes a sheet-like (film-like) flexible base board made of an insulation material. The LEDs 22 are surface mounted on the base board and the tracing pattern for supplying power to the LEDs 22 is formed on the base board with patterning. The LED board 23 is bonded directly to a rear-side surface of the liquid crystal panel 11 on the short-side edge portion thereof with a double-sided adhesive tape 27. The light guide plate 24 is made of synthetic resin that is substantially transparent (having high transmissivity) (acrylic resin such as PMMA). The light guide plate 24 has an elongated sheet-like (film-like) shape having a plate surface parallel to the plate surface of the liquid crystal panel 11. The light guide plate 24 has peripheral edge surfaces and a short-side edge surface of the peripheral edge surfaces is opposite the LEDs 22. The short-side edge surface is a light entrance surface 24a through which light from the LEDs 22 enters the light guide plate 24. The light guide plate 24 has front and rear surfaces and the front surface is a light exit surface 24b that is opposite the optical sheets 25 and through which light guided within the light guide plate 24 exits the light guide plate 24. The optical sheets 25 are disposed on the light exit surface 24b of the light guide plate 24 and interposed between the liquid crystal panel 11 and the light guide plate 24. Accordingly, while the light exiting the light guide plate 24 passes through the optical sheets 25, the optical sheets 25 apply certain optical characteristics to the light and the light exits the optical sheets 25 toward the liquid crystal panel 11. The reflection sheet 26 is disposed to cover the rear-side surface of the light guide plate (the opposite surface from the light exit surface 24b). The reflection sheet 26 has a flexible sheet-like shape made of synthetic resin and having a light reflective white surface. With such a configuration, the light travelling within the light guide plate 24 is effectively directed by the reflection sheet 26 toward the front side (the light exit surface 24b).

As illustrated in FIG. 2, the touchpanel 15 is a position input device with which a user inputs position information within a display surface plane of the liquid crystal panel 11. The touch panel 15 includes a substantially transparent glass substrate having a horizontally-long rectangular shape and good light transmissivity and a predetermined touch panel pattern (not illustrated) formed thereon. Specifically, the touch panel 15 includes a glass substrate that has a horizontally-long rectangular in a plan view similar to the liquid crystal panel 11 and touch panel transparent electrodes (not illustrated) formed thereon. The touch panel transparent electrodes formed on a front surface of the glass substrate have a touch panel pattern of a projection capacitance type. Within a substrate plane, the touch panel transparent electrodes are arranged in rows and columns. The touch panel 15 includes a terminal (not illustrated) on one of the long side edge portions thereof. The terminal is connected to an end of a line extended from the touch panel transparent electrode included in the touch panel pattern. The flexible board (not illustrated) is connected to the terminal so that a potential is applied from a touch panel driving circuit board to the touch panel transparent electrodes included in the touch panel pattern. An inner plate surface of the touch panel 15 is opposite an outer plate surface of the liquid crystal panel 11 (an opposite surface opposite from the optical sheet 25 side surface) and the touch panel 15 is bonded to the liquid crystal panel 11 firmly with an adhesive 28 therebetween. The adhesive 28 is made of ultraviolet curing resin, for example.

The casing 16 is made of synthetic resin or metal and has a substantially box shape opening frontward as illustrated in FIG. 2. The components of the touch panel 15, the liquid crystal panel 11, and the backlight unit 14 are arranged in the casing 16 through the opening in a certain sequence from the front side. The casing 16 includes a bottom portion that supports the light guide plate 24 and the reflection sheet 26 included in the backlight unit 14 from the rear side. The casing 16 includes outer walls that projects from the bottom portion and the outer walls surround the touch panel 15, the liquid crystal panel 11, and the backlight unit 14 from the outer peripheral side.

Figure 6:
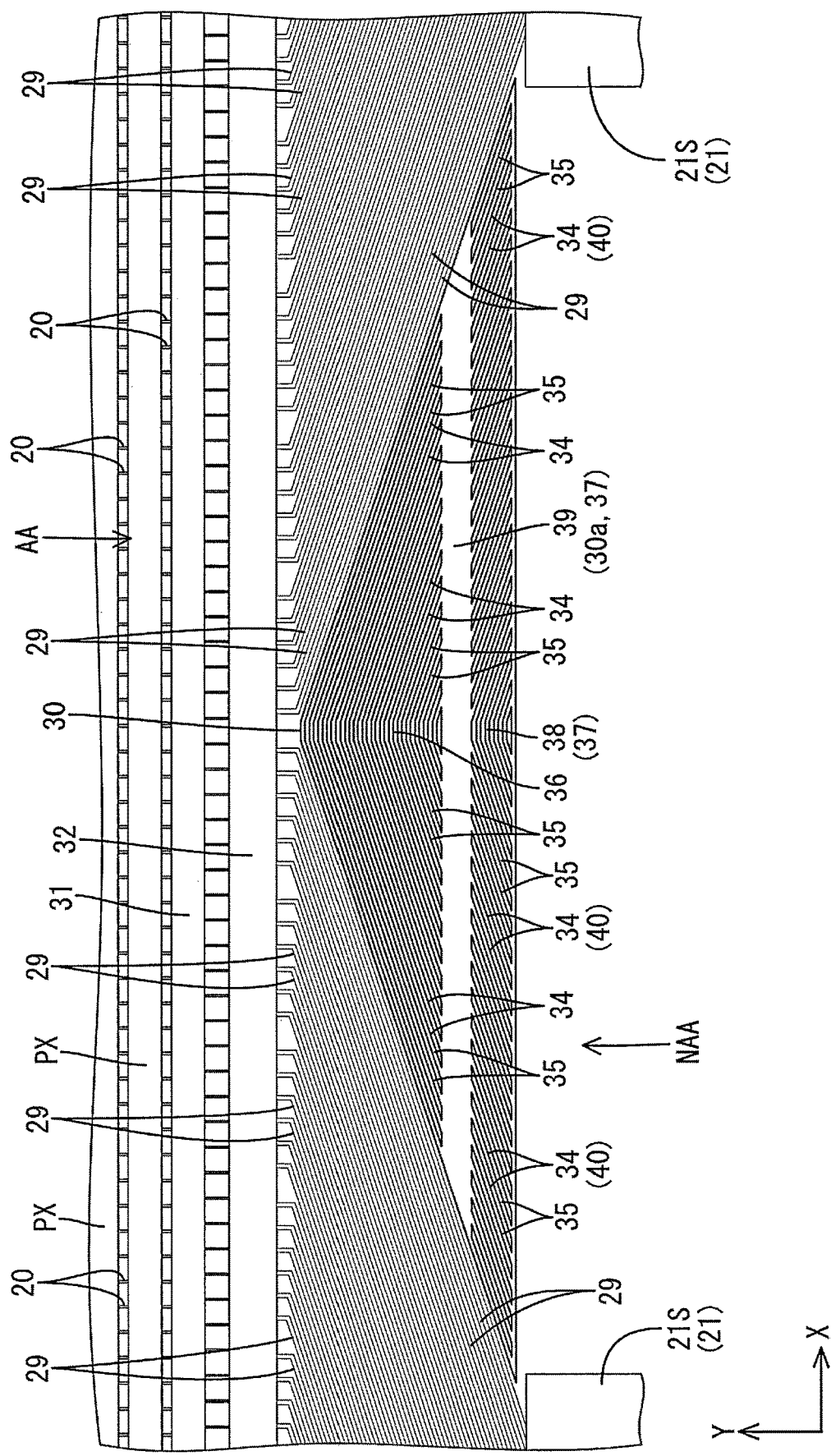
FIG. 6 is a plan view illustrating a tracing configuration between a pair of source side drivers in a non-display area of the array board included in the liquid crystal panel.

Next, a configuration of components in the non-display area NAA of the array board 11b and the CF board 11a will be described in detail. As illustrated in FIG. 6, the array board 11b includes signal line connection line portion (a narrow line portion, a signal transmit line portion) 29 and a common electrode connection line portion (a wide line portion, a reference potential transmit line portion) 30 on an inner surface side thereof (on the liquid crystal layer 11c side, a surface side opposite the CF board 11a). The signal line connection lines 29 connect each of the drivers 21G, 21S and the lines 19, 20 disposed in the display area AA. The common electrode connection line portion 30 is connected to the common electrode 11j. The signal line connection lines 29 are configured to transmit output signals generated with processed by the drivers 21G, 21S to the lines 19, 20. The common electrode connection line portion 30 is configured to transmit a reference potential to the common electrode 11j of the CF board 11a. The reference potential is transmitted from the control circuit board 12 to the liquid crystal panel 11 via the flexible board 13. The signal line connection lines 29 transmit image output signals to each of the lines 19, 20 independently. Therefore, the signal line connection lines 29 are disposed parallel to each other and each of the lines has a width smaller than a line width of lines included in the common electrode connection line portion 30. The common electrode connection line portion 30 needs to decrease line resistance to ensure stable transmission of the reference potential. Therefore, each line included in the common electrode connection line portion 30 has a width greater than that of each signal line connection line 29 and the common electrode connection line portion 30 has an area greater than that of the signal line connection lines 29. The signal line connection lines 29 and the lines included in the common electrode connection line portion 30 are made of metal same as that of one of the lines 19 and the lines 20. The signal line connection lines 29 and the common electrode connection line portion 30 are formed on the array board 11b with pattering by a known photolithography method at the same time of forming the gate lines 19 or the source lines 20 with patterning in the manufacturing process of the array board 11b. Specifically, in this embodiment, the signal line connection lines 29 and the lines included in the common electrode connection line portion 30 are made of the metal same as that of the gate lines 19.

As illustrated in FIGS. 1 and 6, some of the signal line connection lines 29 are connected to the gate-side driver 21G and the gate lines 19, and another of the signal line connection lines 29 are connected to the source-side drivers 21S and the source lines 20. The signal line connection lines 29 are routed from each driver 21G, 21S to spread toward the display area AA like a fan-shape. This is because the length of each driver 21G, 21S is smaller than the range in the display area AA where the lines 19, 20 are disposed (that is the range slightly smaller than the short dimension or the long dimension of the array board 11b). Specifically, the signal line connection lines 29 are disposed in the mount area of the array board 11b where the drivers 21G, 21S are mounted. The signal line connection lines 29 extend toward the display area AA from the output board-side terminals that are connected to the output driver-side terminals of each driver 21G, 21S so as to be angled with respect to the extending direction of the lines 19, 20. Accordingly, the signal line connection lines 29 extend and spread outwardly to be farther away from each driver 21G, 21S as is closer to the display area AA. The signal line connection lines 29 are parallel to each other with having a certain distance therebetween to constitute a signal line connection line 29 group for each of the drivers 21G, 21S. The signal line connection line 29 groups that are routed from the respective drivers 21G, 21S have a substantially inverted triangle shape in a plan view as a whole. An entire width dimension of the signal line connection line 29 group as a whole is increased as is closer to the display area AA and decreased as is farther away from the display area AA. Among the signal line connection lines 29 included in the signal line connection line 29 group, the signal line connection lines 29 extending from end portions of each driver 21G, 21S are angled at a relatively greater angle with respect to the extending direction of the lines 19, 20 to be connected than the signal line connection lines 29 extending from a middle portion of each driver 21G, 21S. The signal line connection lines 29 are arranged at an interval (that is an empty portion width of an empty portion formed between adjacent signal line connection lines 29) and the interval is substantially equal to a line width of each signal line connection line 29. Specifically, the line width of the signal line connection line 29 and the interval between the signal line connection lines 29 are about 10 μm, for example. In this embodiment, the signal line connection lines 29 that connect the source-side drivers 21S and the source lines 20 are illustrated in the drawings. However, the signal line connection lines 29 that connect the gate-side driver 21G and the gate lines 19 have similar configurations.

As illustrated in FIG. 6, in the non-display area NAA of the array board 11b, the signal line connection line 29 groups extending from the respective source-side drivers 21S form a substantially triangle region in a plan view therebetween, and the common electrode connection line portion 30 is disposed in the triangle region. Namely, the common electrode connection line portion 30 is disposed between the two signal line connection line 29 groups. The common electrode connection line portion 30 has a substantially triangle island-shape in a plan view. The common electrode connection line group 30 has an area greater than that of the signal line connection line 29 portion and each line in the common electrode connection line group 30 has a line width greater than that of the signal line connection line 29. The common electrode connection line portion 30 has a planar shape so that a width dimension thereof decreases as a whole as is closer to the display area AA and the width dimension thereof increases as is farther away from the display area AA. The common electrode connection line portion 30 has an edge portion (a middle portion with respect to the X-axis direction) closest to the display area AA and the edge portion has a substantially straight outer line along the X-axis direction. The common electrode connection line portion 30 has two side edge portions opposite the respective signal line connection line 29 groups and the two side edge portions are angled in a plan view at an inclination angle same as the inclination angle of the signal line connection line 29. Namely, the side edge portions of the common electrode connection line portion 30 are substantially parallel to the extending direction of the signal line connection lines 29. The common electrode connection line portion 30 includes a transfer pad portion 30a that is electrically connected to the common electrode 11j on the CF board 11a side to supply the reference potential. The connection configuration of the transfer pad portion 30a and the common electrode 11j will be described in detail later. The common electrode connection line portion 30 is connected to the source-side driver 21S or the flexible board 13 and has a terminal to receive supply of the reference potential directly from the source-side driver 21S or the flexible board 13.

As illustrated in FIG. 6, each of the signal line connection lines 29 is not connected directly to each of the lines 19, 20 but is connected thereto via a dummy pixel 31 and an ESD protection portion 32. The dummy pixels 31 and the ESD protection portions 32 are disposed in the non-display area NAA of the array board 11b. The dummy pixels 31 are disposed adjacent to the pixels PX that are arranged on an outermost edge in the display area AA, and the ESD protection portions 32 are disposed to sandwich the dummy pixels 31 with the pixels PX that are arranged on the outermost edge in the display area AA. In FIG. 6, due to a size of the paper, the pixels PX, the ESD protection portions 32 and the dummy pixels 31 are illustrated simply. A group of the pixels PX arranged in the X-axis direction, a group of the ESD protection portions 32 arranged in the X-axis direction, and a group of the dummy pixel 31 arranged in the X-axis direction are represented by a horizontally-long block.

Figure 7:
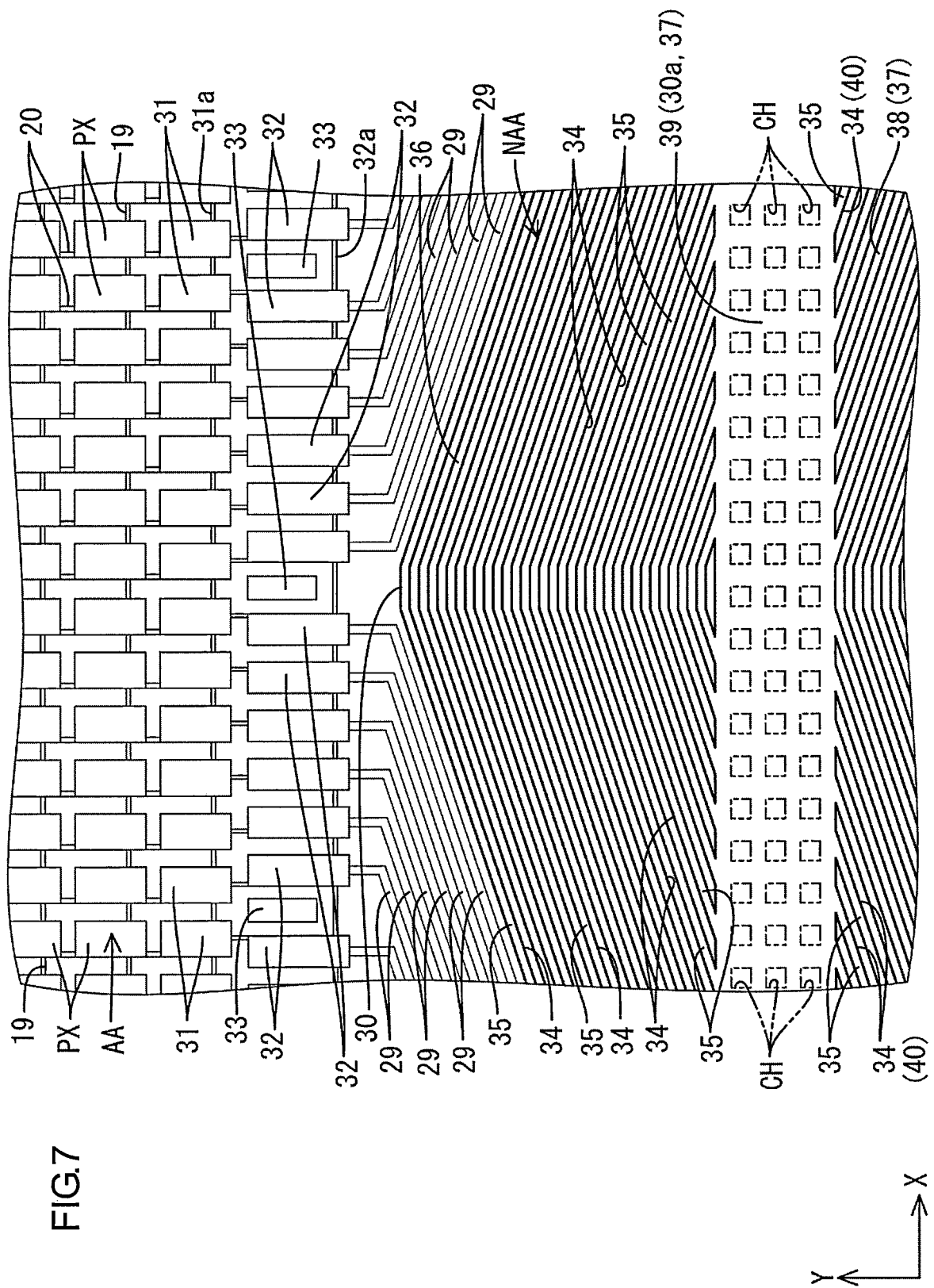
FIG. 7 is a magnified plan view of FIG. 6.

As illustrated in FIG. 6, the dummy pixel 31 includes a dummy TFT connected to the source line 20, a dummy gate line 31a connected to the dummy TFT, a dummy pixel electrode connected to the dummy TFT, and a dummy pixel light blocking portion having a light blocking property. Namely, the dummy pixel 31 has a configuration substantially same as that of the pixel PX and such dummy pixels 31 are arranged so that the pixels PX arranged adjacent to the dummy pixels 31 and on the outermost edge in the display area AA and other pixels PX have the same conditions such as a capacity. The dummy pixels 31 are arranged in the non-display area NAA. Therefore, light is blocked by the dummy pixel light blocking portions to prevent the light from transmitting through the dummy pixel electrodes. The dummy pixel light blocking portions are made of metal same as that of one of the lines 19 and the lines 20. The dummy TFTs are monolithically fabricated on the array board 11b with using an amorphous-silicon thin film as a base material same as that of the TFTs 17 included in the pixels PX. As illustrated in FIG. 7, the dummy pixels 31 are arranged at intervals along the X-axis direction that is perpendicular to the extending direction of the source lines 20. The dummy pixel 31 has a width dimension substantially same as that of the pixel PX and relatively greater than that of the signal line connection line 29. Therefore, the light blocking rate of a dummy pixel 31 group, that is a rate of the light blocking amount to the light transmission amount, is higher than the light blocking rate of the signal line connection line 29 group.

As illustrated in FIG. 6, the ESD protection portion 32 is disposed for every signal line connection line 29 corresponding to each source line 20. The ESD protection portion 32 includes a diode ring (not illustrated) as an ESD protection circuit. The diode ring includes two diodes that are arranged in a ring shape. The diode ring is independently connected to each signal line connection line 29 corresponding to each source line 20. The diode rings are monolithically fabricated on the array board 11b using an amorphous-silicon thin film as a base material same as that of the TFTs 17 included in the pixels PX. As illustrated in FIG. 7, the ESD protection portions 32 are arranged at intervals along the X-axis direction that is perpendicular to the extending direction of the source lines 20. The adjacent ESD protection portions 32 are short-circuited by an ESD short-circuit line 32a. If static electricity is discharged to any one of the signal line connection lines 29, the static electricity is discharged or dispersed to the adjacent signal line connection lines 29 via the ESD protection portions 32 so that the static electricity is less likely to be discharged and reach the pixels PX via the source lines 20. The ESD protection portion 32 has a width dimension relatively greater than that of the signal line connection line 29 and relatively smaller than that of the pixel PX and the dummy pixel 31. The ESD protection portions 32 are arranged at two different intervals. Six adjacent ESD protection portions 32 are arranged at intervals same as the pixels PX and the dummy pixels 31 are arranged. An interval between an outermost ESD protection portion 32 included in the ESD protection 32 group including the ESD protection portions 32 arranged at equal intervals and an outermost ESD protection portion 32 included in another ESD protection 32 group adjacent to the above ESD protection 32 group is greater than the interval between the pixels PX and the interval between the dummy pixels 31. A light blocking portion between ESD protection portions 33 having a light blocking property is disposed in the relatively great interval between the adjacent two outermost ESD protection portions 32. The light blocking portion between ESD protection portions 33 is made of metal same as that of one of the lines 19 and the lines 20 (the source lines 20, in this embodiment). An interval between the light blocking portion between ESD protection portions 33 and the adjacent ESD protection portion 32 is substantially equal to the interval between the adjacent ESD protection portions 32. Therefore, the light blocking rate of the ESD protection 32 group, that is a rate of the light blocking amount to the light transmission amount, is substantially equal to the light blocking rate of the dummy pixel 31 group. The light blocking rate of the ESD protection portion 32 group is higher than the light blocking rate of the signal line connection line 29 group.

Figure 8:
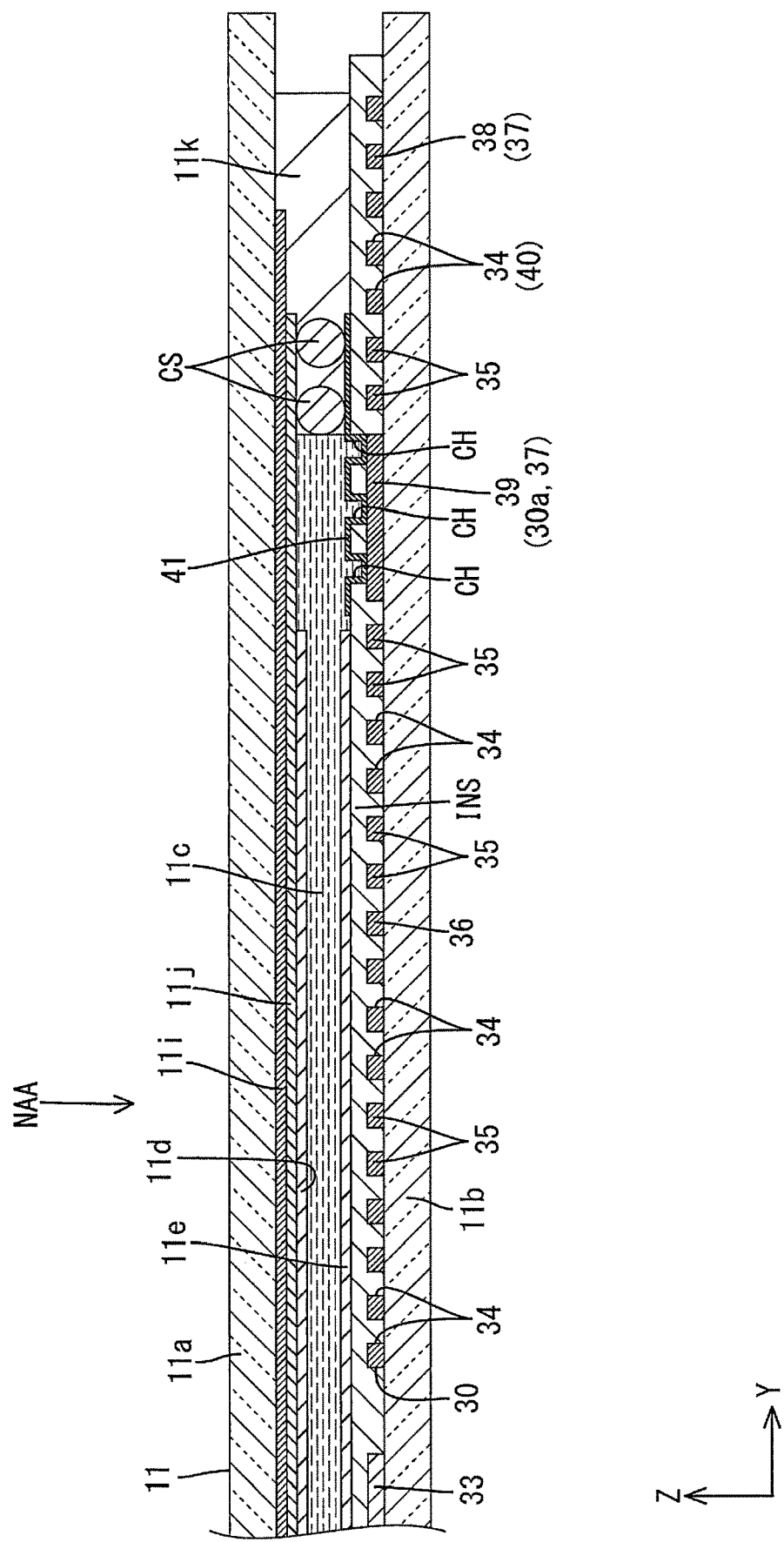
FIG. 8 is a cross-sectional view illustrating a cross-sectional configuration along a short-side direction of the non-display area of the liquid crystal panel.

The light blocking layer 11i that is formed in a grid in the display area A of the CF board 11a is formed in a solid area in the non-display area NAA, as illustrated in FIG. 8. An outer edge of the light blocking layer 11i in the non-display area NAA reaches a middle of the sealing member 11k. Accordingly, in the non-display area NAA, the light blocking layer 11i overlaps the dummy pixel 31 group, the ESD protection portion 32 group, the signal line connection line 29 group, and the common electrode connection line portion 30 in a plan view. In the non-display area NAA of the CF board 11a and the array board 11b, the pair of alignment films 11d and 11e are formed in a solid area ranging over a substantially entire area except for the connection portion between the transfer pad portion 30a of the common electrode connection line portion 30 and the common electrode 11j and the portion where the sealing member 11k is formed. The alignment films 11d and 11e are formed to overlap the dummy pixel 31 group, the ESD protection portion 32 group, the signal line connection line 29 group, and a part of the common electrode connection portion 30 (an alignment film overlap portion 36) in a plan view. On the array board 11b, the signal line connection lines 29 and the common electrode connection line portion 30 are covered with an insulation film INS.

The light blocking layer 11i improves the light blocking property thereof as the thickness thereof increases. However, the flatness of the layer may be deteriorated or a cell gap error may be caused if the thickness of the light blocking layer 11i increases. Further, the light blocking property of the light blocking layer 11i is improved as a density of the light blocking material (such as carbon black) contained in the light blocking layer 11i is increased. However, sensitivity of the photosensitive resin material is lowered in patterning the photosensitive resin with the photolithography to form the light blocking layer 11i and it is difficult to form the light blocking layer 11i. Accordingly, it may be difficult to ensure an effective thickness of the light blocking layer 11i or an effective density of the light blocking material. Then, the light blocking layer 11i may have insufficient light blocking property and light is likely to pass through the light blocking layer 11i. The signal line connection lines 29 disposed to overlap the light blocking layer 11i in a plan view are arranged at intervals. Therefore, light passes through the empty portions between the adjacent signal line connection lines 29 so that the signal line connection lines 29 may be seen by a user of the liquid crystal display device 10 as a shadow and this may deteriorate appearance of the liquid crystal display device 10 (the liquid crystal panel 11). Especially, the liquid crystal panel 11 in this embodiment is a normally white mode panel in which the light transmittance is highest when no voltage is applied to the liquid crystal layer 11c. Since no pixel PX is disposed near the sealing member 11k, the light transmittance of the portion of the liquid crystal layer 11c near the sealing member 11k is always highest and light easily leaks therefrom. Therefore, the shadow is seen by the user and the appearance is likely to be deteriorated. Further, other than the signal line connection lines 29, the common electrode connection line portion 30 overlaps the light blocking layer 11i in a plan view. If the common electrode connection line portion is formed in a solid pattern, light is less likely to pass through the common electrode connection line portion. Therefore, the transmission amount of light passing through the signal line connection lines 29 that are arranged at intervals greatly differs from that of light passing through the common electrode connection line portion. In such a configuration, the common electrode connection line is likely to be seen as a shadow by a user and this may deteriorate the appearance of the panel. If a light blocking layer made of a metal layer is disposed in addition to the light blocking layer 11i, a parasitic capacitance is formed between the light blocking layer made of the metal layer and the signal line connection lines 29 and this may cause distortion of signals transmitted to the signal line connection lines 29.

In this embodiment, as illustrated in FIGS. 6 and 7, the common electrode connection line portion 30 partially includes empty portions 34 and light passes through the empty portions 34. According to such a configuration, even if light passes through the light blocking layer 11i in the non-display area NAA, the light passes through the empty portions between the adjacent signal line connection lines 29 and the light passes through the empty portions 34 in the common electrode connection line portion 30. Accordingly, it is less likely to be caused that only the common electrode connection line portion 30 is seen by the user as a shadow. Even if light leaks through the light blocking layer 11i, both of the signal line connection line 29 portion and the common electrode connection line portion 30 are similarly seen through by a user. Therefore, a belt-shaped shadow is seen as a whole. In such a configuration, the appearance of the liquid crystal display device 10 (the liquid crystal panel 11) is less likely to be deteriorated compared to the configuration in which only the common electrode connection line portion 30 having a substantially triangle plan view shape is seen as a shadow. Especially, when the liquid crystal display device 10 is used as an in-vehicle terminal and a great amount of outside light streams into a vehicle interior, an amount of rays of light directed toward the liquid crystal panel 11 from the backlight unit 14 is increased. Therefore, the above problems may occur. However, the common electrode connection line portion 30 includes the empty portions 34 so that the common electrode connection line portion 30 is less likely to be seen and good appearance of the liquid crystal display device 10 is maintained. According to the above configuration, another light blocking layer made of a metal layer is not necessary to be arranged unlike the configuration in that the light blocking layer made of metal layer is separately arranged from the light blocking layer 11i. Therefore, unnecessary parasitic capacitance is not generated with respect to the signal line connection lines 29 and distortion is less likely to be caused in the signals transmitted to the signal line connection lines 29. The empty portions 34 are formed when the common electrode connection line portion 30 is patterned during the manufacturing process of the liquid crystal panel 11. For example, the area where the alignment films 11d and 11e are formed may be changed so that the alignment films 11d and 11e do not overlap the common electrode connection line portion 30. Accordingly, the empty portions 34 are formed in precise positions and production yield is improved compared to the configuration in which light is less likely to pass through the liquid crystal layer 11c in a portion thereof overlapping the common electrode connection line portion 30.

More specifically, as illustrated in FIG. 7, the empty portion 34 is formed in a slit-like shape that extends along two side edge portions of the common electrode connection line portion 30 and an edge portion of the common electrode connection line portion 30 closest to the display area AA. The common electrode connection line portion 30 includes multiple empty portions 34 that are arranged at intervals. The common electrode connection line portion 30 includes divided common electrode connection lines (divided lines) 35 that are defined by the empty portions 30 and arranged at intervals. The divided common electrode connection lines 35 are parallel to the empty portions 34. The empty portions 34 and the divided common electrode connection lines 35 include angled portions and straight portions. The angled portions extend along the two side edge portions of the common electrode connection line portion 30. The straight portions extend along the edge portion of the common electrode connection line portion 30 closest to the display area AA, that is, along the X-axis direction. The empty portions 34 and the divided common electrode connection lines 35 are arranged alternately and in a repeated sequence in the common electrode connection line portion 30. The empty portion 34 is disposed between the two adjacent divided common electrode connection lines 35 and the distance between the two adjacent divided common electrode connection lines 35 is equal to the empty portion width of the empty portion 34. The empty portion width of the empty portion 34 is substantially equal to a line width of the divided common electrode connection line 35. Specifically, the empty portion width of the empty portion 34 and the line width of the divided common electrode connection lien 35 is approximately 10 µm, for example. Therefore, the empty portion width of the empty portion 34 and the line width of the divided common electrode connection line 35 are substantially equal to the line width of the signal line connection line 29 and the distance between the signal line connection lines 29 (the empty width of the empty portion between the adjacent two signal line connection lines 29). Further, in an area of the common electrode connection line portion 30, a ratio of a total area of the divided common electrode connection lines 35 to a total area of the empty portions 34 is substantially equal to a ratio of a total area of the signal line connection lines 29 to a total area of the empty portions between the adjacent signal line connection lines 29. According to such a configuration, even if light leaks through the light blocking layer 11i, the signal line connection line 29 group and the common electrode connection line portion 30 are similarly seen to a user of the liquid crystal device 10 and the appearance of the liquid crystal display device 10 is preferably maintained. Specific light blocking rate of the common electrode connection line portion 30 and that of the signal line connection line 29 group is approximately 50% in this embodiment.

As illustrated in FIGS. 7 and 8, the empty portions 34 are not formed over an entire area of the common electrode connection line portion 30, and the empty portions 34 are not formed in a certain portion of the common electrode connection line portion 30. Specifically, the common electrode connection line portion 30 is divided into an alignment film overlap portion 36 that overlaps the alignment films 11d and 11e in a plan view and an alignment film non-overlap portion 37 that does not overlap the alignment films 11d and 11e in a plan view. The empty portions 34 are formed in an entire area of the alignment overlap portion 36 and a part of the alignment film non-overlap portion 37. Since the empty portions 34 are formed over an entire area of the alignment film overlap portion 36, a part of rays of light that passes through the liquid crystal layer 11c having orientation by the alignment films 11d and 11e is passed through the empty portions 34. Thus, the signal line connection line 29 group and the common electrode connection line portion 30 keep the respective amount of transmission light to be equal and good appearance of the liquid crystal display device 10 is maintained. The alignment film overlap portion 36 corresponds to a substantially plan view triangle portion of the common electrode connection line portion 30 that is opposite the display area AA. The alignment film non-overlap portion 37 corresponds to a substantially plan view trapezoidal portion of the common electrode connection line portion 30 except for the alignment film overlap portion 36. Further, the alignment film non-overlap portion 37 is divided into a sealing member overlap portion 38 that overlaps the sealing member 11k in a plan view and a sealing member non-overlap portion 39 that does not overlap the sealing member 11k in a plan view. The empty portions 34 are formed over an entire area of the sealing member overlap portion 38 and are not formed in the sealing member non-overlap portion 39. Namely, the empty portions 34 are selectively formed only on the sealing member overlap portion 38 of the alignment film non-overlap portion 37. The empty portions 34 formed in the sealing member overlap portion 38 correspond to sealing empty portions (empty portions for curing sealing member) 40 through which ultraviolet rays passes to cure ultraviolet rays curing resin included in the sealing member 11k. Accordingly, when the sealing member 11k is cured during the manufacturing process of the liquid crystal panel 11, ultraviolet rays pass through the sealing empty portions 40 and are directed toward the ultraviolet curing resin included in the sealing member 11*k*. Thus, the curing of the ultraviolet curing resin is effectively accelerated.

As illustrated in FIGS. 7 and 8, in the alignment film non-overlap portion 37, the sealing member non-overlap portion 39 having no empty portions 34 corresponds to the transfer pad portion 30*a* that is connected to the common electrode 11*j*. Namely, no empty portions 34 are formed on the transfer pad portion 30*a* and this increases reliability of connection between a conductive pad portion 41 and the common electrode 11*j*. A connection configuration of the transfer pad portion 30*a* and the common electrode 11*j* will be described in detail. Contact holes CH are formed in a portion of the insulation film INS overlapping the transfer pad portion 30*a* in a plan view. The conductive pad portion 41 that is on an upper-layer side is electrically connected to the transfer pad portion 30*a* via the contact holes CH. The contact holes CH are illustrated by two-dot chain lines in FIG. 7. The contact holes CH are disposed in rows and columns at intervals on the transfer pad portion 30*a*. The interval between the contact holes CH is relatively greater than the line width of the signal line connection line 29, the interval between the signal line connection lines 29, the empty portion width of the empty portion 34, and the line width of the divided common electrode connection line 35 (for example, the contact holes each having a size of 45 μm by 45 μm are arranged at the interval of 30 μm). Conducting particles CS are disposed between the conductive pad portion 41 and the common electrode 11*j*, and the common electrode 11*j* and the common electrode connection line portion 30 are electrically connected each other via the conducting particles CS. The conducting particles CS are mixed with a material of the sealing member 11*k* and the conductive pad portion 31 and the common electrode 11*j* are arranged to fit into the sealing member 11*k*. Accordingly, the conductive pad portion 41 and the common electrode 11*j* are connected to each other via the conducting particles CS in the sealing member 41*k*.

As is described above, the first liquid crystal panel (the display device) 11 of this embodiment includes the display area AA for displaying images, the non-display area NAA outside the display area AA, the light blocking layer (the light blocking portion) 11*j* arranged at least in the non-display area for blocking light, the signal line connection lines (the narrow line portion) 29 that are disposed at intervals in the non-display area NAA, the common electrode connection line portion (the wide line portion) 30 disposed in the non-display area NAA and partially including empty portions 34. Each of the connection lines included in the common electrode connection line portion 30 is wider than the signal line connection line 29.

According to such a configuration, the light blocking layer 11*i* for blocking light is disposed in the non-display area NAA that is outside the display area AA where images appear. Therefore, the signal line connection lines 29 and the common electrode connection line portion 30 are less likely to be seen by a user of the liquid crystal panel 11. If the light blocking property of the light blocking layer 11*i* is insufficient and light transmits through the light blocking layer 11*i*, the light transmits through portions between the adjacent signal line connection lines 29 that are arranged at intervals. In such a configuration, if the common electrode connection line portion 30 has no empty portions 34 and is formed in a solid pattern, the light is less likely to pass through the common electrode connection line portion 30 and the amount of light passing through the common electrode connection line portion 30 and that of light passing through the signal line connection lines 29 greatly differ from each other. As a result, the common electrode connection line portion 30 is likely to be seen as a shadow by the user of the liquid crystal panel 11 and this may deteriorate the appearance of the liquid crystal panel 11. In this embodiment, the common electrode connection line portion 30 partially includes empty portions 34 and the light passes through the empty portions 34 of the common electrode connection portion 30 similarly to the signal line connection lines 29. Accordingly, it is less likely to occur that the common electrode connection line portion 30 is seen as a shadow by the user of the liquid crystal panel 11 and the good appearance of the liquid crystal panel 11 is maintained. If the light blocking layer of a metal for blocking light is additionally arranged to prevent leakage of light, the metal light blocking layer may generate parasitic capacitance with the signal line connection lines 29 or the common electrode connection line portion 30. However, the common electrode connection line portion 30 partially having the empty portions 34 may obviate occurrence of such a problem.

The common electrode connection line portion 30 is formed such that a ratio of the area thereof to the area of the empty portions 34 is substantially equal to a ratio of the area of the signal line connection line 29 portion to an area of the empty portions that are between the adjacent signal line connection lines 29. According to such a configuration, the amount of light that is blocked by the common electrode connection line portion 30 is equal to the amount of light that is blocked by the signal line connection lines 29, and the amount of light passing through the empty portions 34 of the common electrode connection line portion 30 is equal to the amount of light passing through the empty portions between the adjacent signal line connection lines 29. Therefore, the common electrode connection line portion 30 and the signal line connection line 29 portion are seen by the user of the liquid crystal panel 11 with similar brightness and this effectively improves the appearance of the liquid crystal panel 11.

The common electrode connection line portion 30 includes the divided common electrode connection lines (the divided lines) 35 that are defined by the empty portions 34 and arranged at intervals with the empty portions therebetween. According to such a configuration, the divided common electrode connection lines 35 included in the common electrode connection line portion 30 are defined by the empty portions 34 and are arranged parallel to each other at intervals similarly to the signal line connection lines 29. Accordingly, the common electrode connection line portion 30 and the signal line connection lines 29 are seen by the user of the liquid crystal panel 11 with similar brightness and the appearance is improved.

In the common electrode connection line portion 30, the line width of each divided common electrode connection line 35 is equal to the line width of each signal line connection line 29 and the interval between the adjacent divided common electrode connection lines 35 is equal to the interval between the adjacent signal line connection lines 29. According to such a configuration, the amount of light that is blocked by the divided common electrode connection lines 35 included in the common electrode connection line portion 30 is equal to the amount of light that is blocked by the signal line connection lines 29, and the amount of light passing through the empty portions 34 between the adjacent divided common electrode connection lines 35 is equal to the amount of light passing through the empty portions between the adjacent signal line connection lines 29. Accordingly, the common electrode connection line portion 30 and the signal line connection lines 29 are seen by the user of the liquid crystal panel 11 with similar brightness and the appearance is improved.

The liquid crystal panel 11 further includes a pair of boards 11a and 11b that are defined into the display area AA and the non-display area NAA, the liquid crystal layer 11c sandwiched between the boards 11a and 11b, and a pair of alignment films 11d and 11e. The alignment films 11d and 11e are formed on plate surfaces of the respective boards 11a and 11b on the liquid crystal layer 11c side and extend over the display area AA and the non-display area NAA. The alignment films 11d and 11e are configured to orient the liquid crystal molecules contained in the liquid crystal layer 11c. A part of the signal line connection lines 29 overlaps the alignment films 11d and 11e. The common electrode connection line portion 30 includes the alignment film overlap portion 36 and the alignment film non-overlap portion 37. The alignment film overlap portion 36 overlaps the alignment films 11d and 11e in a plan view. The alignment film non-overlap portion 37 does not overlap the alignment films 11d and 11e in a plan view. The empty portions 34 are formed at least on the alignment film overlap portion 36. According to such a configuration, a pair of alignment films 11d and 11e is formed on respective plate surfaces of a pair of boards 11a and 11b opposite the liquid crystal layer 11c so that the liquid crystal molecules in the liquid crystal layer 11c are oriented appropriately. The amount of light passing through the liquid crystal layer 11c is controlled by a voltage applied to the liquid crystal layer 11c. The pair of alignment films 11d and 11e is disposed to extend over the display area AA and the non-display area NAA. Therefore, even if positions of the alignment films 11d and 11e are displaced from the correct positions during the manufacturing process, the alignment films are possibly disposed in the display area AA. A part of rays of light passing through the liquid crystal layer 11c including the liquid crystal molecules oriented by the alignment films 11d and 11e passes through portions between the signal line connection lines 29 at least a part of which overlaps the alignment films 11d and 11e in a plan view. The common electrode connection line portion 30 includes the alignment film overlap portion 36 overlapping the alignment films 11d and 11e in a plan view and the alignment film non-overlap portion 37 that does not overlap the alignment films 11d and 11e in a plan view. The alignment film overlap portion 36 includes the empty portions 34 and therefore, a part of rays of light passing through the liquid crystal layer 11c oriented by the alignment films 11d and 11e passes through the empty portions 34 formed in the alignment film overlap portion 36. Accordingly, the common electrode connection line portion 30 is less likely to be seen as a shadow by the user and the good appearance of the liquid crystal panel 11 is maintained.

The liquid crystal panel 11 includes the sealing member 11k between the boards 11a and 11b and the sealing member 11k surrounds the liquid crystal layer 11c to enclose the liquid crystal layer 11c. The sealing member 11k is made of photo curing resin. The alignment film non-overlap portion 37 includes the sealing member overlap portion 38 that overlaps the sealing member 11k in a plan view and the sealing member non-overlap portion 39 that does not overlap the sealing member 11k in a plan view. The sealing member overlap portion 38 selectively includes sealing member empty portions 40 through which light passes to cure the sealing member 11k. Accordingly, the liquid crystal layer 11c sandwiched between the boards 11a and 11b is disposed between the boards 11a and 11b and enclosed by the sealing member 11k that surrounds the liquid crystal layer 11c. The sealing member 11k made of photo curing resin is cured by irradiation of light during the manufacturing process. The alignment film non-overlap portion 37 includes the sealing member overlap portion 38 overlapping the sealing member 11k in a plan view and the sealing member non-overlap portion 39 that does not overlap the sealing member 11k in a plan view. The sealing member overlap portion 38 selectively includes the sealing member empty portions 40 so that light for curing the sealing member 11k passes through the sealing member empty portions 40 of the sealing member overlap portion 38 and is directed to the sealing member 11k during the manufacturing process. Even if the alignment film non-overlap portion 37 includes the sealing member overlap portion 38, the sealing member 11k is effectively cured. The sealing member non-overlap portion 39 of the alignment film non-overlap portion 37 does not include the sealing member empty portions 40. This is preferable for keeping an area of the common electrode connection line portion 30 and decreasing line resistance in the common electrode connection line portion 30.

The signal line connection lines 29, the common electrode connection line portion 30, and at least the pixel electrodes 18 are formed on a plate surface of one 11b of the boards 11a and 11b opposite the liquid crystal layer 11c. The light blocking layer 11k and the common electrode 11j opposite at least the pixel electrodes 18 are disposed on a plate surface of another board 11a opposite the liquid crystal layer 11c. The sealing member non-overlap portion 39 of the common electrode connection line portion 30 is electrically connected to the common electrode 11j. According to such a configuration, potential difference is generated between the pixel electrodes 18 disposed on the liquid crystal layer 11c side plate surface of the one board 11b and the common electrode 11j disposed on the liquid crystal layer 11c side plate surface of the other board 11a so that the amount of light passing through the liquid crystal layer 11c is controlled by controlling the orientation of the liquid crystal molecules in the liquid crystal layer 11c. In the common electrode connection line portion 30, no empty portion 34 is formed in the sealing member non-overlap portion that does not overlap the sealing member 11k. This ensures high reliability in the electrical connection with the common electrode 11j.

The drivers (signal processors) 21 are disposed at intervals in the non-display area NAA. The drivers receive input signals supplied from an external signal supply source and processes the input signals to generate output signals and output the generated signals to the display area AA. The signal line connection lines 29 extend from the drivers 21 to the display area AA and transmit the output signals to the display area AA. The signal line connection lines 29 extend and spread from the respective drivers 21 toward the display area AA in a fan-shape. The common electrode connection line portion 30 is disposed between two adjacent groups of the signal line connection lines 29 extending from the respective adjacent two drivers 21. According to such a configuration, the output signals generated by the drivers 21 are transmitted to the display area AA via the signal line connection lines 29 extending and spreading from the respective drivers 21, which are arranged at intervals, to the display area AA in a fan-shape. In the configuration that the common electrode connection line portion 30 is disposed between the two adjacent groups of the signal line connection lines 29 extending from the respective adjacent two drivers 21, if the amount of light passing through the signal line connection lines 29 differs from the amount of light passing through the common electrode connection line portion 30, the appearance of the liquid crystal panel 11 may be deteriorated. However, the common electrode connection line portion 30 includes the empty portions 34 in this embodiment so that the difference between the amount of light passing through the signal line connection lines 29 and the amount of light passing through the common electrode connection line portion 30 is reduced. Accordingly, the appearance of the liquid crystal panel 11 is improved.

The liquid crystal panel 11 further includes a pair of boards 11a and 11b that include the display area AA and the non-display area NAA, the liquid crystal layer 11c between the boards 11a and 11b, and a pair of alignment films 11d and 11e. The alignment films 11d and 11e are disposed on the respective liquid crystal layer 11c side plate surfaces of the boards 11a and 11b and are disposed in at least the display area AA to orient the liquid crystal molecules included in the liquid crystal layer 11c. The liquid crystal panel 11 is a normally white mode panel in which the light transmittance is highest when no voltage is applied between the boards 11a and 11b. In the liquid crystal panel 11 that is a normally white mode panel, the light transmittance is highest when no voltage is applied between the boards 11a and 11b. Therefore, the outer appearance may be deteriorated due to the leakage of light. However, even if the light passing through the empty portions 34 included in the common electrode connection line portion 30 leaks therefrom, the common electrode connection line portion 30 is less likely to be seen by the user as a shadow and the appearance is less likely to be deteriorated.

Second Embodiment

A second embodiment according to the present invention will be described with reference to FIGS. 9 to 12. The second embodiment changes in the number of drivers 121 and a common electrode connection line portion 130 from those of the first embodiment and check lines 42 are additionally disposed. Structures, functions, and effects similar to those of the first embodiment will not be described.

Figure 9:
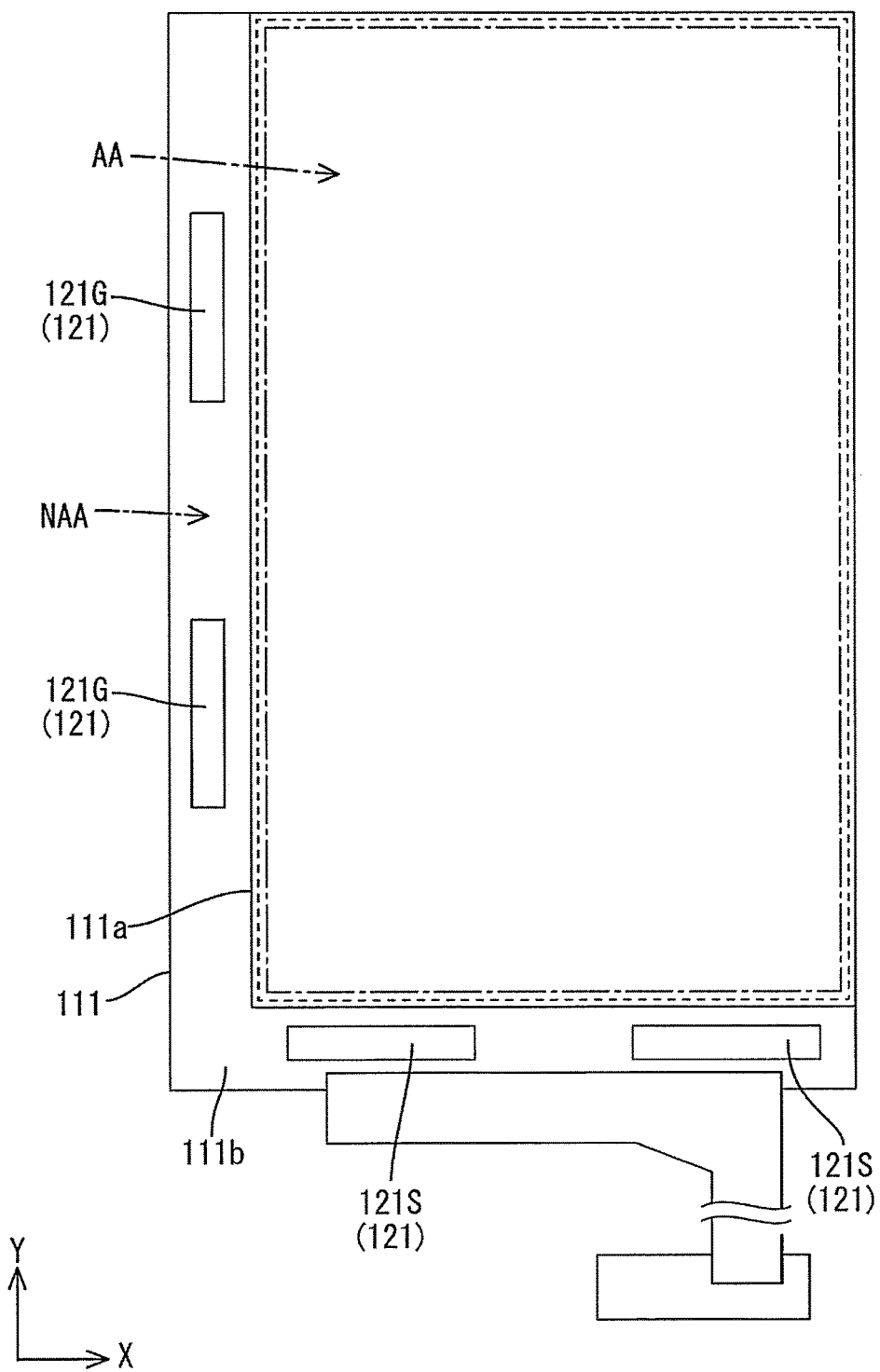
FIG. 9 is a schematic plan view of a liquid crystal panel with a driver mounted thereon, a flexible printed circuit board, and a control circuit board according to a second embodiment of the present invention illustrating connection thereamong.
Figure 10:
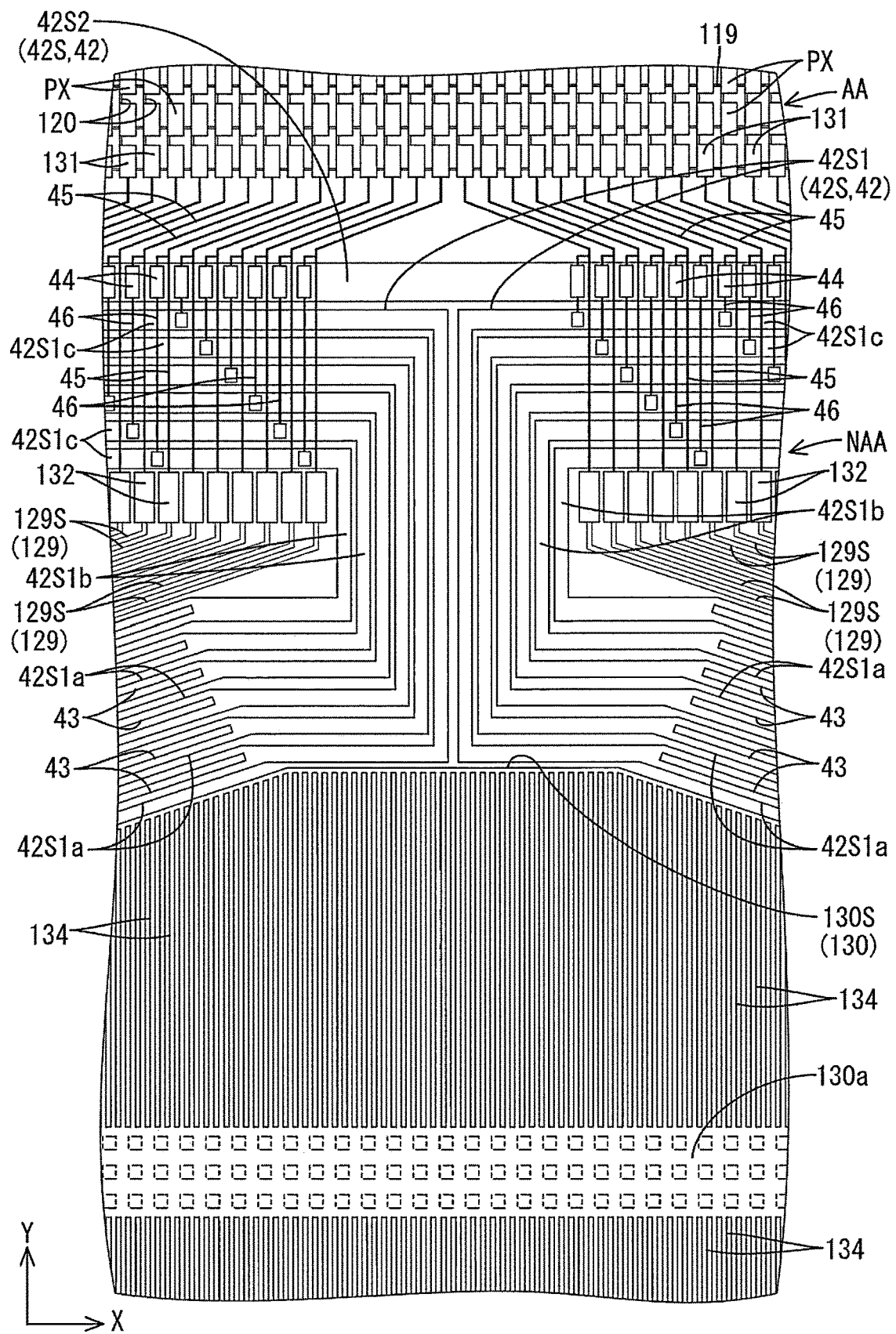
FIG. 10 is a plan view illustrating a tracing configuration between a pair of source side drivers in the non-display area of the array board included in the liquid crystal panel.
Figure 11:
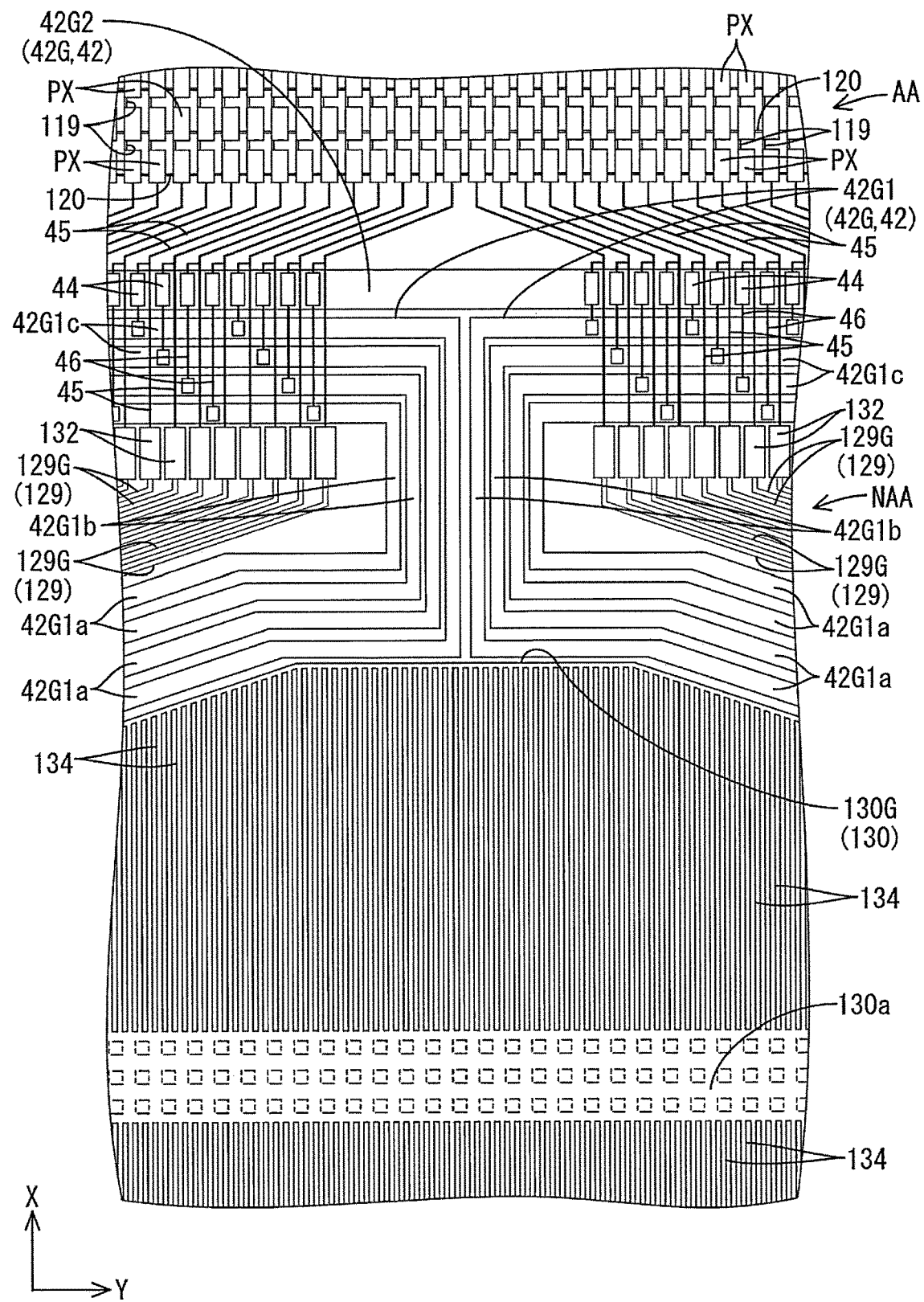
FIG. 11 is a plan view illustrating a tracing configuration between a pair of gate side drivers in the non-display area of the array board included in the liquid crystal panel.

As illustrated in FIG. 9, a liquid crystal panel 111 according to this embodiment has a vertically-long rectangular plan view shape and includes four drivers 121 in the non-display area. The four drivers 121 includes two gate-side drivers 121G and two source-side drivers 121S. The two gate-side drivers 121G are disposed on a long-side edge portion of an array board 111b to be displaced from the middle thereof and away from each other with a certain distance therebetween in the Y-axis direction (in the long-side direction of the array board 111b). The two source-side drivers 121S are disposed on a short-side edge portion of the array board 111b to be displaced from the middle thereof and away from each other with a certain distance therebetween in the X-axis direction (in the short-side direction of the array board 111b). As illustrated in FIG. 10, a source-side common electrode connection line portion 130S that is a common electrode connection line portion 130 is disposed between two adjacent groups of source-side signal line connection lines 129S extending from the respective adjacent two source-side drivers 121S. As illustrated in FIG. 11, a gate-side common electrode connection line portion 130G that is the common electrode connection line portion 130 is disposed between two adjacent groups of gate-side signal line connection lines 129G extending from the respective adjacent two gate-side drivers 121G. In this embodiment, the common electrode connection line portion 130 is disposed between the two source-side drivers 121A and between the two gate-side drivers 121G. The gate-side common electrode connection line portion 130G is in an area of the non-display area NAA of the array board 111b between the two gate-side drivers 121G and has a substantially triangle shape in a plan view. Dummy pixels 131 are disposed adjacent to the outermost pixel PX on the edge near the source-side driver 121S. However, the dummy pixels 131 are not disposed near the gate-side driver 121G.

Figure 12:
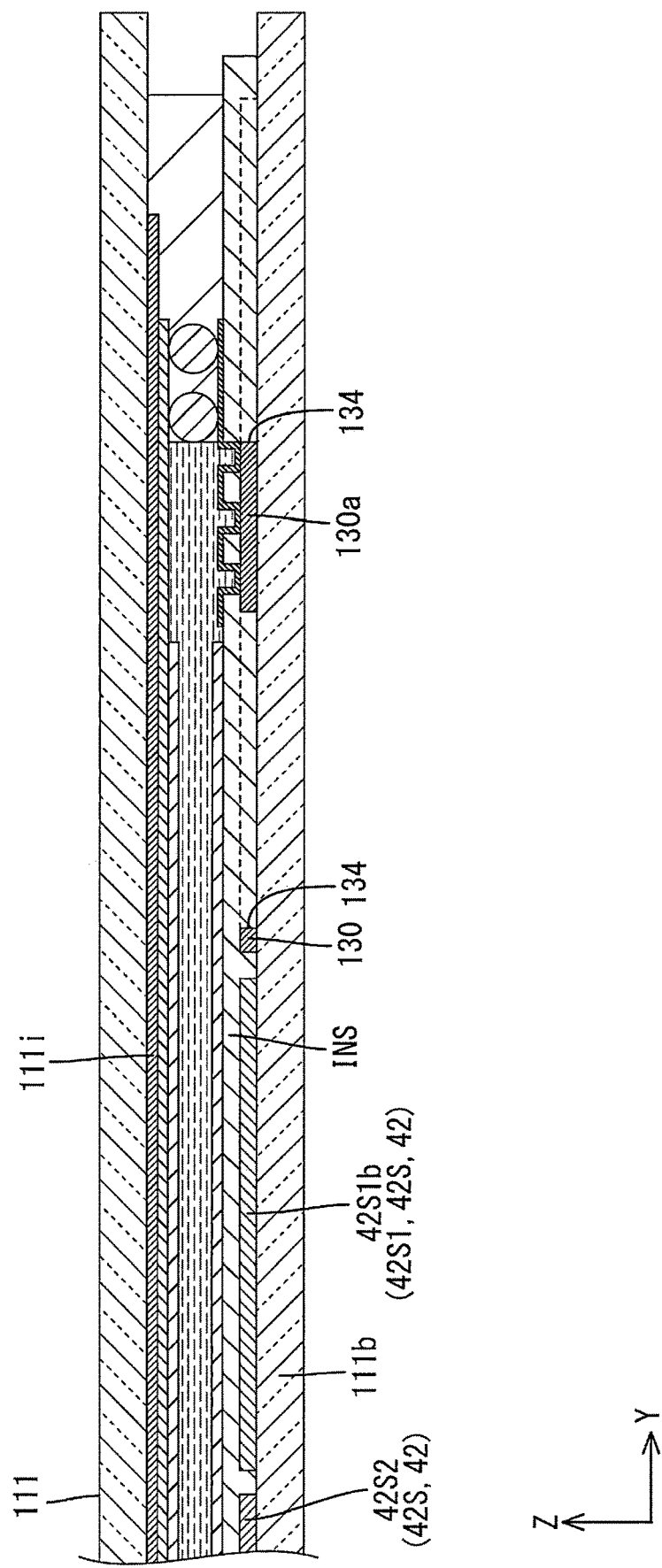
FIG. 12 is a cross-sectional view illustrating a cross-sectional configuration along a short-side direction of the non-display area of the liquid crystal panel.

As illustrated in FIGS. 10 and 12, the source-side common electrode connection line portion 130S includes empty portions 134. The empty portions 134 have slit-shape extending along an extending direction of source lines 120 (in the Y-axis direction) that is to be connected to the source line connection lines 129S. As illustrated in FIG. 11, the gate-side common electrode connection line portion 130G includes the empty portions 134. The empty portions 134 have slit-shape extending along an extending direction of gate lines 119 (in the X-axis direction) that is to be connected to the gate line connection lines 129G. Namely, the empty portions 134 extend in a direction perpendicular to an extending direction of a transfer pad 130a of each common electrode connection line portion 130. Further, check lines (a narrow line portion, a wide line portion, lines, check lines) 42 are disposed in the non-display area NAA of the array board 111b to check disconnection of the signal line connection lines 129, and the lines 119, 120. The check lines 42 include gate-side check lines 42G for checking the gate line connection lines 129G and the gate lines 119 and source-side check lines 42S for checking the source line connection lines 129S and the source lines 120. In this embodiment, the check lines 42 are made of metal same as that used for the gate lines 119. Among the signal line connection lines 129, the common electrode connection lines 130, and the check lines 42, to represent the gate-side common electrode connection line portion, the gate-side common electrode connection portion, and the gate-side check liens, a letter "G" is affixed to the respective reference numbers, and to represent the source-side common electrode connection line portion, the source-side common electrode connection portion, and the source-side check liens, a letter "S" is affixed to the respective reference numbers. No letter is affixed to the respective reference numbers to generally represent the components.

As illustrated in FIG. 10, the source-side check lines 42S include first source-side check lines 42S1 and second source-side check lines 42S2. The first source-side check lines 42S1 are disposed between the source-side common electrode connection line portion 130S and the source line connection line 129S group. The second source-side check lines 42S2 are disposed between ESD protection portion 132 group and a dummy pixel 131 group. The ESD protection portions 132 are disposed on a right side and a left side with respect to the middle of the source-side common electrode connection line portion 130S with a certain distance therebetween. The source-side check line 42S group is disposed between the ESD protection portion 132 group and the dummy pixel 131 group. First relay lines 45 are disposed to cross the source-side check line 42S group and relays the ESD protection portions 132 and the dummy pixels 131 via the insulation film INS. In this embodiment, the first relay lines 45 are made of metal same as that used for the source lines 120. Among the source-side check lines 42S, to represent the first source-side check lines, a numeral letter "1" is affixed to the reference number thereof, and to represent the second source-side check lines, a numeral letter "2" is affixed to the reference number thereof. No letter is affixed to the reference numbers to generally represent the component.

The first source-side check lines 42S1 includes angled portions 42S1*a*, first straight portions 42S1*b*, and second straight portions 42S1*c*. The angled portions 42S1*a* extend along respective side edge portions of the source line connection lines 129S and the source-side common electrode connection line portion 130S. The first straight portions 42S1*b* extend along the Y-axis direction toward the display area AA between the ESD protection 132 groups in a middle space of the source-side common electrode connection line portion 130S. The second straight portions 42S1*c* are disposed on an opposite side from the source line connection line 129 group with respect to the ESD protection 132 group and extend along a direction in which the ESD protection 132 group extends (in the X-axis direction). The first source-side check lines 42S1 are routed to surround the ESD protection portion 132 group and the source-side common electrode connection line portion 130S. The first source-side check lines 42S1 are parallel to each other and have a certain distance between the adjacent first source-side check lines 42S1. The first source-side check line 42S1 has a line width smaller than that of each line in the source-side common electrode connection line portion 130S and greater than that of each source line connection line 129S. Specifically, the first source-side check line 42S1 has a width of 100 µm or greater. Second empty portions 43 are formed between the first source-side check lines 42S1 of this embodiment similar to the empty portions 142 of the source-side common electrode connection line portion 130S. Light passes through the second empty portions 43. The second empty portions 43 are selectively formed between the angled portions 42S1*a* of the first source-side check lines 42S1, and the angled portions 42S1*a* are disposed between the source line connection lines 129S and the source-side common electrode connection line portion 130S. The second empty portions 43 are slits extending along the angled portions 42S1*a*. A ratio of area of the first source-side check lines 42S1 to an area of the second empty portions 43 and a ratio of the area of the first source-side check lines 42S1 to a total area of the empty portions between the adjacent first source-side check lines 42S1 are equal to a ratio of a total area of the source line connection lines 129S to a total area of the empty portions between the adjacent source line connection lines 129S and a ratio of an area of the source-side common electrode connection line portion 130S to a total area of the empty portions 134, respectively. Accordingly, a ratio of the amount of blocked light to the amount of transmitted light (a light blocking rate) in the first source-side check line 42S1 group is substantially equal to a ratio of the amount of blocked light to the amount of transmitted light in the source line connection lines 129 and is substantially equal to a ratio of the amount of blocked light to the amount of transmitted light in the source-side common electrode. Accordingly, even if light passes through a light blocking layer 111*i*, the portion of the first source-side checking lines 42S1 between the source line connection lines 129S and the source-side common electrode connection line portion 130S is less likely to be seen as a shadow. Therefore, a good appearance of the liquid crystal display device 110 is maintained. The second straight portions 42S1*c* of the first source-side check lines 42S1 include contact holes (not illustrated) in the insulation film INS and the second relay lines 46 are electrically connected thereto.

The second source-side check line 42S2 is disposed between the second straight portion 42S1*c* of the first source-side check line 42S1 closest to the display area AA and the dummy pixels 131. The second source-side check line 42S2 extends along the second straight portion of the first source-side check line 42S1 (in the X-axis direction) and has a line width greater than that of the first source-side check line 42S1. Check TFTs 44 are disposed on the second source-side check line 42S2 for checking the source line connection lines 129S. In this embodiment, a gate electrode of each check TFT 44 corresponds to the second source-side check line 42S2 and a source electrode thereof corresponds to an end portion of each second relay line 46, and a drain electrode thereof corresponds to an end portion of each first relay line 45. One end portion of the second relay line 46 is connected to the second straight portion 42S1*c* of the first source-side check line 42S1 through the contact hole and another end portion thereof corresponds to the drain electrode of the check TFT 44. The portion of the second relay line 46 between the two end portions cross the second straight portions 42S1*c*, which are not to be connected, via the insulation film INS. In this embodiment, the second relay lines 45 are made of metal same as that of the source lines 120. The check TFTs 44 are monolithically fabricated on the array board 111*b* with using an amorphous-silicon thin film as a base material same as that of the TFTs included in the pixels PX. According to such a configuration, a check signal is input to the first source-side check lines 42S1 and gate voltage is applied to the second source-side check line 42S2 to switch on the check TFTs 44. Accordingly, the check signals are supplied to the source line connection lines 129 via the check TFTs 44. Further, the gate voltage is applied to the gate lines 119 to switch on the TFTs included in the pixels PX and a reference voltage is applied to the common electrode. In the application of voltage, if no disconnection occurs in the source line connection lines 129S and the source lines 120, a linear defection does not appear in the display area AA. If any disconnection occurs in the source line connection lines 129S and the source lines 120, a linear defection appears in the display area AA. Thus, disconnection of the source line connection lines 129S and the source lines 120 is checked. As long as the gate voltage is not applied to the second source-side check line 42S2, the check TFTs 44 are not turned on. Therefore, data signals are supplied to the source line connection lines 129S effectively in the normal image display.

As illustrated in FIG. 11, the gate-side check lines 42G include first gate-side check lines 42G1 and second gate-side check lines 42G2. The first gate-side check lines 42G1 are disposed between the gate-side common electrode connection line portion 130G and the gate line connection line 129G group in the non-display area NAA of the array board 111*b*. The second gate-side check lines 42G2 are disposed between the ESD protection portion 132 group and the pixel PX group in the non-display area NAA of the array board 111*b*. The first gate-side check lines 42G1 do not include the second empty portions 43 and other configurations are same as those of the first source-side check lines 42S1. The first gate-side check lines 42G1 include angled portion 42G1*a*, first straight portions 42G1*b*, and second straight portions 42G1*b*. Each first gate-side check line 42G1 (especially, the angled portion 42G1*a*) has a line width smaller than that of each first source-side check line 42S1. The number of the first gate-side check lines 42G1 is smaller than that of the first source-side check portions 42S1. The second gate-side check line 42G2 has a configuration same as that of the second source-side check line 42S2 and the check TFTs 44 are disposed on and overlap the second gate-side check line 42G2. The first relay lines 45 are disposed to cross the second straight portions 42G1*b* of the first gate-side check lines 42G1 to relay the ESD protection portions 132 and the pixels PX. The second relay lines 46 are disposed to cross other second straight portions 42G1*b* to relay the second straight portions 42G1*b* of the first gate-side check lines 42G1 and the check TFTs 44. Such configurations are same as those of the source-side check lines 42S and will not be described. Checking of the disconnection of the first gate-side check lines 42G1 and the gate lines 119 with using the check TFTs 44 is same as the checking of the disconnection of the first source-side check lines 42S1 and will not be described. In FIG. 12, a cross sectional configuration of the source-side driver of the liquid crystal panel 111 is illustrated, and the gate-side driver has the same cross sectional configuration as that of the source-side driver.

As is described before, the liquid crystal panel (the display device) 11 of this embodiment includes the check lines (the check line portion) 42 that ae disposed in the non-display area NAA and connected to the signal line connection lines 129 to check the signal line connection lines 129. The wide line portion that is relatively wide includes the check lines 42 and the check lines 42 includes the second empty portions (the empty portions) 43 that are provided between the check lines 42. According to such a configuration, the second empty portions 43 are formed between the check lines 42 included in the wide line portion, and light passes through the second empty portions 43 similarly to the signal line connection lines 129. Accordingly, the check lines 42 are less likely to be seen by a user and good appearance of the liquid crystal panel 11 is maintained.

Third Embodiment

A third embodiment according to the present invention will be described with reference to FIGS. 13 and 14. The second embodiment differs from the first embodiment in positions of empty portions 234 in a common electrode connection line portion 230 and an area where alignment films 211*d* and 211*e* are formed. Structures, functions, and effects similar to those of the first embodiment will not be described.

Figure 13:
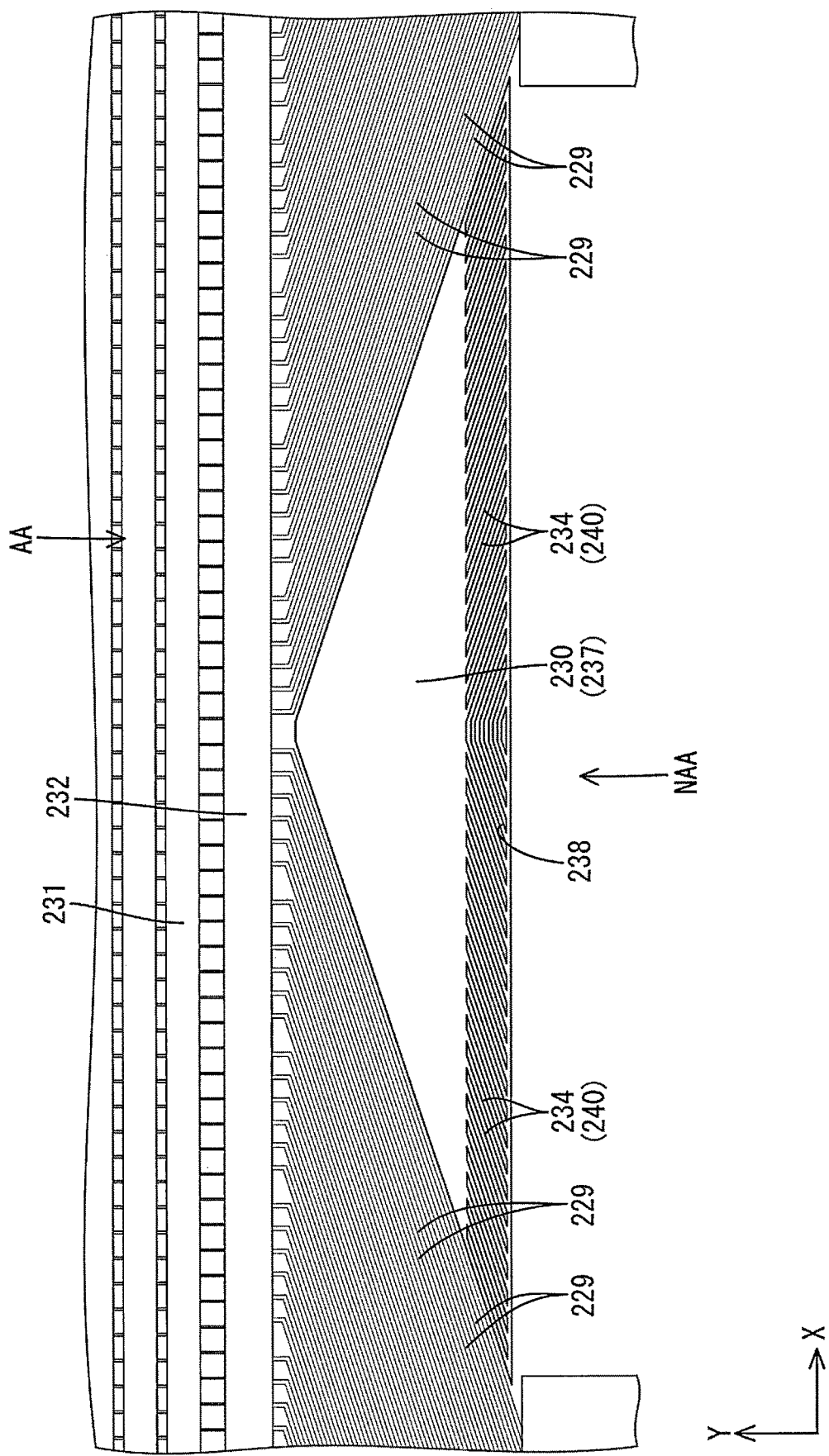
FIG. 13 is a plan view illustrating a tracing configuration between a pair of source side drivers in a non-display area of an array board included in a liquid crystal panel according to a third embodiment of the present invention.
Figure 14:
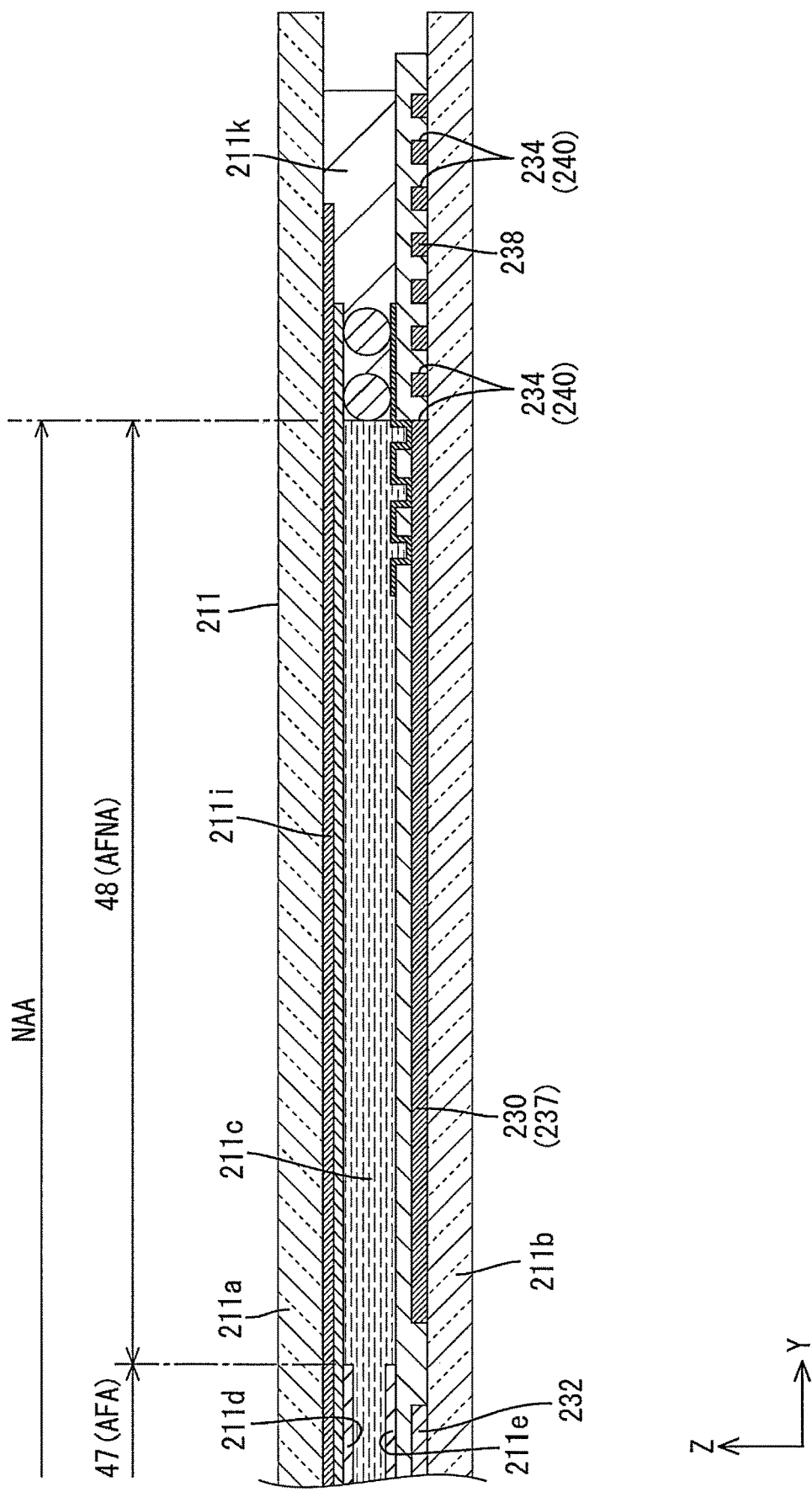
FIG. 14 is a cross-sectional view illustrating a cross-sectional configuration along a short-side direction of the non-display area of the liquid crystal panel.

As illustrated in FIGS. 13 and 14, the common electrode connection line portion 230 includes empty portions 234 only in a sealing member overlap portion 238 overlapping a sealing member 211*k* in a plan view and the common electrode connection line portion 230 is formed in a solid pattern except for the sealing member overlap portion 238. The solid patterned common electrode connection line portion 230 does not include any empty portion 234. The common electrode connection line portion 230 includes only sealing empty portions 240 for passing light therethrough for hardening the sealing member 211*k*. The common electrode connection line portion 230 does not include empty portions for obtaining the amount of light passing through the common electrode connection line portion 230 same as that of light passing through the signal line connection line 229 group.

As illustrated in FIGS. 13 and 14, a pair of alignment films 211*d* and 211*e* is disposed on plate surfaces of a pair of boards 211*a* and 211*b* opposite a liquid crystal layer 211*c*, respectively. The alignment films 211*d* and 211*e* are arranged to extend over the display area AA and the non-display area NAA. In the non-display area NAA, the alignment films 211*d* and 211*e* overlap a dummy pixel portion 231 group and an ESD protection portion 232 group in a plan view and do not overlap the signal line connection line 229 portion and the common electrode connection line portion 230 in a plan view. Namely, outer edges of the alignment films 211*d* and 211*e* in the Y-axis direction are between the ESD protection portion 232 group and both of the signal line connection line 229 group and the common electrode connection line portion 230 and the outer edges extend straight along the X-axis direction. An entire area of the common electrode connection line portion 230 corresponds to an alignment film non-overlap portion 237 that does not overlap the alignment films 211*d* and 211*e*. Accordingly, as illustrated in FIG. 14, the non-display area NAA of the boards 211*a* and 211*b* includes an alignment film arrangement area AFA where both of the alignment films 211*d* and 211*e* are disposed and an alignment film non-arrangement area AFNA were no alignment film 211*d*, 211*e* is disposed. In the alignment film arrangement area AFA, the liquid crystal molecules included in the liquid crystal layer 211*c* are oriented with the anchoring process so that the orientation of the liquid crystal molecules is controlled. In the alignment film non-arrangement area AFNA, the liquid crystal molecules included in the liquid crystal layer 211*c* are not oriented with the anchoring process and the orientation of the liquid crystal molecules is not controlled. Therefore, the non-display area NAA of the boards 211*a* and 211*b* is divided into a liquid crystals orientation portion 47 where the liquid crystal molecules in the liquid crystal layer 211*c* are oriented and a liquid crystals non-orientation portion 48 where the liquid crystal molecules in the liquid crystal layer 211*c* are not oriented. The liquid crystals orientation portion 47 corresponds to a portion overlapping the alignment film arrangement area AFA in a plan view and the liquid crystals non-orientation portion 48 corresponds to a portion overlapping the alignment film non-arrangement area AFNA in a plan view. The liquid crystal molecules included in the liquid crystal layer 211*c* are oriented to be twisted at 90° in the liquid crystals orientation portion 47. Therefore, in the liquid crystal panel 211 of the normally white mode, most of rays of light passes through the liquid crystals orientation portion 47. The orientation of the liquid crystal molecules included in the liquid crystal layer 211*c* is not controlled in the liquid crystals non-orientation portion 48. Therefore, the light from the backlight unit is less likely to pass through the liquid crystals non-orientation portion 48 of the liquid crystal panel 211. The liquid crystals non-orientation portion 48 overlaps the signal line connection line 229 group and the common electrode connection line portion 230 in a plan view. According to such a configuration, even if light passes through the empty portions between adjacent signal line connection lines 229 in the non-display area of the array board 211*b*, the light is less likely to pass through the liquid crystal panel 211. Therefore, the signal line connection lines 229 or the common electrode connection line portion 230 are less likely to be seen as a shadow by the user and a good appearance of the liquid crystal display device 210 is maintained.

The alignment films 211*d* and 211*e* are disposed to extend over the display area AA and the non-display area NAA and therefore, even if the alignment position of each of the alignment films 211*d* and 211*e* is displaced during the manufacturing process, the alignment films 211*d* and 211*e* are reliably disposed in the display area AA. In this configuration, the alignment films 211*d* and 211*e* are disposed in the non-display area NAA and the liquid crystal molecules included in the liquid crystal layer 211 between the alignment films 211*d* and 211*e* are oriented and this may cause leakage of light. However, the alignment films 211*d* and 211*e* are disposed to overlap the dummy pixel 231 group and the ESD protection portion 232 group (a second light blocking portion) in the non-display area NAA. The dummy pixel 231 group and the ESD protection portion 232 group are components that block light. According to such a configuration, the light is blocked by the dummy pixel 231 group and the ESD protection portion 232 group. Leakage of light may be less likely to be caused. The alignment films 211*d* and 211*e* are printed on the respective boards 211*a* and 211*b* with a transfer printing method in the manufacturing process of the liquid crystal panel 211. Specifically, with the transfer printing method, an alignment film material is put on a transfer roller and the alignment film material on the transfer roller is transferred to the boards 211*a* and 211*b* to form the alignment films 211*d* and 211*e*. With the transfer printing method, the area of forming each alignment film 211*d*, 211*e* is controlled with higher accuracy compared to an ink jetting method. Therefore, leakage of light is less likely to be caused.

As described before, the second liquid crystal panel 211 of this embodiment includes a pair of the boards 211*a* and 211*b*, the liquid crystal layer 211*c*, a pair of the liquid crystals orientation portions 47, a light blocking layer 211*i*, the signal line connection lines (a line portion) 229, and the liquid crystals non-orientation portion 48. The boards 211*a* and 211*b* are defined into the display area AA where images appear and the non-display area NAA that is outside the display area AA. The liquid crystal layer 211*c* is sandwiched between the boards 211*a* and 211*b*. The liquid crystals orientation portions 47 are disposed in the display area AA and on a liquid crystal layer 11*c* side of each of the boards 211*a* and 211*b*. The liquid crystal molecules included in the liquid crystal layer 211*c* are oriented by the liquid crystals orientation portions 47. The light blocking layer 211*i* is disposed in at least the non-display area NAA of one of the boards 211*a* and 211*b* to block light. The signal line connection lines 229 are arranged at intervals in the non-display area NAA of one of the boards 211*a* and 211*b*. The liquid crystals non-orientation portion 48 overlaps in a plan view at least the signal line connection lines 229 in the non-display area NAA of at least one of the boards 211*a* and 211*b*. The liquid crystals non-orientation portion 48 is not subjected to the orientation of the liquid crystal molecules included in the liquid crystal layer 211*c*.

Thus, a pair of the liquid crystals orientation portions 47 is disposed in the display area AA of the plate surfaces of the boards 211*a* and 211*b* opposite the liquid crystal layer 211*c*. Therefore, liquid crystal molecules in the liquid crystal layer 211*c* are appropriately oriented and the amount of light passing through the liquid crystal layer 211*c* is controlled by adjusting the voltage applied to the liquid crystal layer 211*c*. The light blocking layer 211*i* is disposed in the non-display area NAA of one of the boards 211*a* and 211*b*. The non-display area is outside the display area AA where images appear. Thus, the signal line connection lines 229 disposed in the non-display area NAA are less likely to be seen by the user of the liquid crystal panel 211.

If the light blocking layer 211*i* has an insufficient light blocking property and the light passes through the light blocking layer 211*i*, the light passes through portions between the adjacent signal line connection lines that are disposed at intervals and the light leaks therefrom. The signal line connection lines 229 are seen as a shadow by the user of the liquid crystal panel 211 and the appearance of the liquid crystal panel 211 may be deteriorated. If a light blocking layer made of metal for blocking light to prevent leakage of light, the light blocking layer may generate parasitic capacitance with the signal line connection lines 229. The liquid crystals non-orientation portion 48 is disposed to overlap at least the signal line connection lines 229 in a plan view in the non-display area NAA of one of the boards 211*a* and 211*b*. The liquid crystals non-orientation portion 48 is not subjected to the orientation of the liquid crystal molecules in the liquid crystal layer 211*c*. Therefore, even if light passes through the portions between the adjacent signal line connection lines 229, the liquid crystal molecules are not oriented via the liquid crystals non-orientation portion 48 and the light is less likely to pass therethrough. Accordingly, the leakage of light is less likely to occur and the signal line connection lines 229 are less likely to be seen as the shadow and the good appearance of the liquid crystal panel 211 is maintained. Further, the additional light blocking layer made of metal is not necessary to be arranged to prevent leakage of light. Therefore, the parasitic capacitance is less likely to be generated between the metal light blocking layer and the signal line connection lines 229.

The liquid crystal panel 211 includes a pair of alignment films 211*d* and 211*e* that is disposed on the respective plate surfaces of the base plates 211*a* and 211*b* opposite the liquid crystal layer 211*c* and disposed at least in the display area AA. The liquid crystals orientation portion 47 corresponds to the portions of the alignment films 211*d* and 211*e* in the display area AA. One of the alignment films 211*d* and 211*e* is selectively disposed in an area of the plate surface of one of the boards 211*a* and 211*b* opposite the liquid crystal layer 211. The area of the plate surface does not overlap the signal line connection lines 229 in a plan view. Thus, the liquid crystal panel 211 includes the alignment film non-arrangement area AFNA where no alignment film 211*d*, 211*e* is disposed and the liquid crystals non-orientation portion 48 corresponds to the alignment film non-arrangement area AFNA. Accordingly, the liquid crystals non-orientation portion 48 corresponds to the alignment film non-arrangement area AFNA where no alignment film 211*d*, 211*e* is disposed, and light is less likely to pass therethrough. The position of the areas where the alignment films 211*d* and 211*e* are formed is precisely determined.

The pair of the alignment films 211*d* and 211*e* extends over the display area AA and the non-display area NAA. In the non-display area NAA of at least one of the boards 211*a* and 211*b*, the dummy pixel portion 231 and the ESD protection portion 232 (the second light blocking layer) are formed to overlap the alignment films 211*d* and 211*e* in a plan view and arranged closer to the display area AA side than the signal line connection lines 229. The dummy pixel portion 231 and the ESD protection portion 232 block light. According to such a configuration, the pair of the alignment films 211*d* and 211*e* extends over the display area AA and the non-display area NAA. Therefore, even if the arrangement position of the alignment films 211*d* and 211*e* is displaced during the manufacturing process, the alignment films 211*d* and 211*e* are reliably arranged in the display area AA. A part of each alignment film 211*d*, 211*e* is disposed in the non-arrangement area NAA, and light passing through the light blocking layer 211*i* may leak therefrom. The light is blocked by the dummy pixels 231 and the ESD protection portion 232 that overlap in a plan view the portions of the alignment films 211*d* and 211*e* in the non-display area NAA and are arranged closer to the display area AA side than the signal line connection lines 229. Accordingly, the leakage of light is less likely to occur.

The liquid crystal panel 211 includes the pair of boards 211*a* and 211*b*, the liquid crystal layer 211*c*, and the pair of alignment films 211*d* and 211*e*. Each of the boards 211*a* and 211*b* is defined into the display area AA and the non-display area NAA. The liquid crystal layer 211*c* is sandwiched between the boards 211*a* and 211*b*. The alignment films 211*d* and 211*e* are disposed on the respective plate surfaces of the boards 211*a* and 211*b* opposite the liquid crystal layer 211 and at least in the display area AA. The liquid crystal molecules included in the liquid crystal layer 211*c* are oriented by the alignment films 211*d* and 211*e*. The liquid crystal panel 211 is in a normally white mode in which the light transmittance is maximum when no voltage is applied between the boards 211*a* and 211*b*. In this configuration, in the liquid crystal panel 211 that is in the normally white mode, the light transmittance is maximum when no voltage is applied between the boards 211*a* and 211*b*. Therefore, the appearance may be deteriorated due to the leakage of light. However, even in the configuration in which light leaks from the portions between the adjacent signal line connection lines 229, the signal line connection lines 229 are less likely to be seen as the shadow by the user due to the liquid crystals non-arrangement portion 48, and the appearance is less likely to be deteriorated.

Fourth Embodiment

A fourth embodiment according to the present invention will be described with reference to FIGS. 15 to 17. In the fourth embodiment, an area of a common electrode connection line portion 330 where empty portions 334 are formed and an area where alignment films 311*d* and 311*e* are formed differ from those in the second embodiment. The configurations of this embodiment have the similar to those of the third embodiment. Structures, functions, and effects similar to those of the second and third embodiments will not be described.

Figure 15:
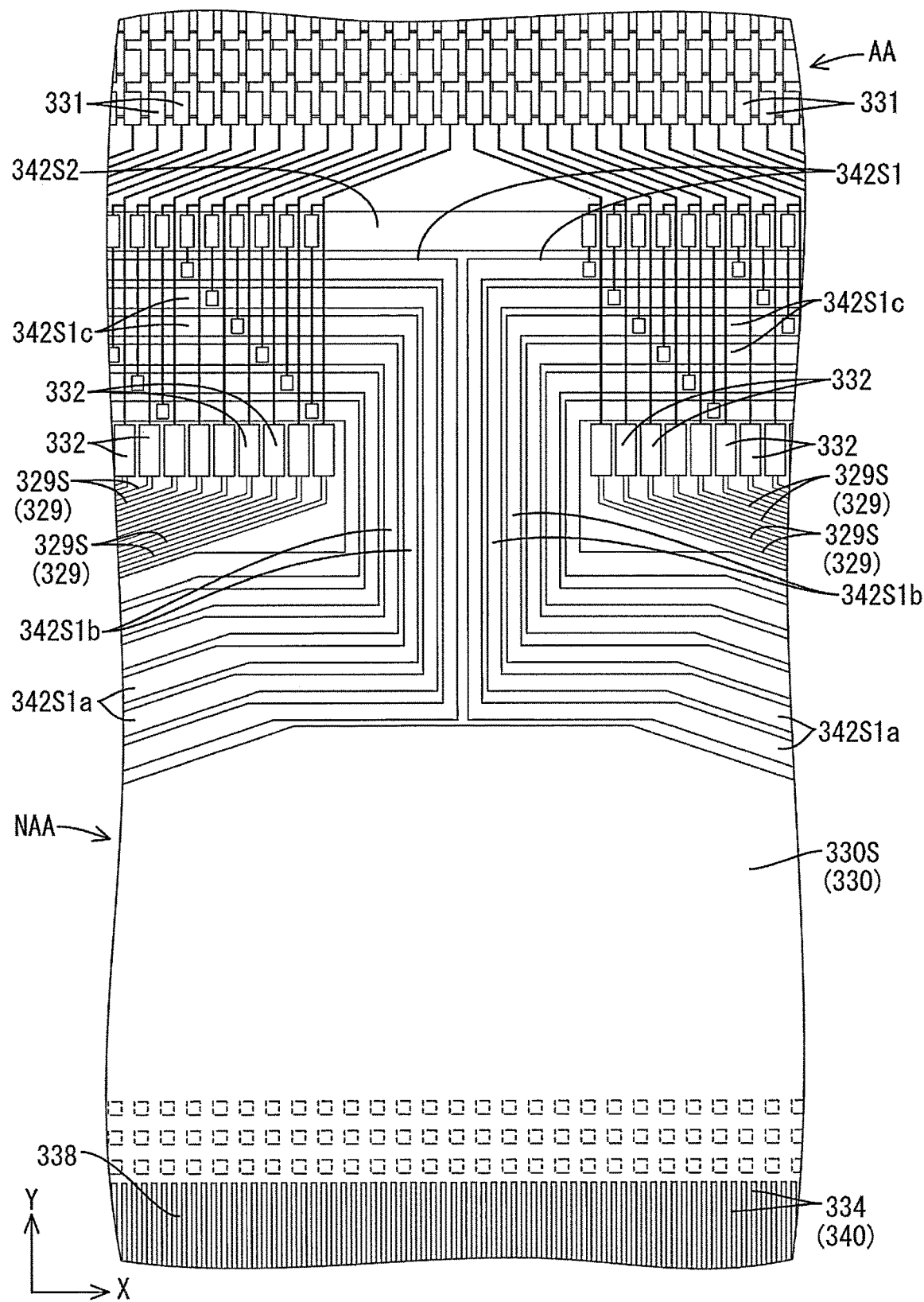
FIG. 15 is a plan view illustrating a tracing configuration between a pair of source side drivers in a non-display area of an array board included in a liquid crystal panel according to a fourth embodiment of the present invention.
Figure 16:
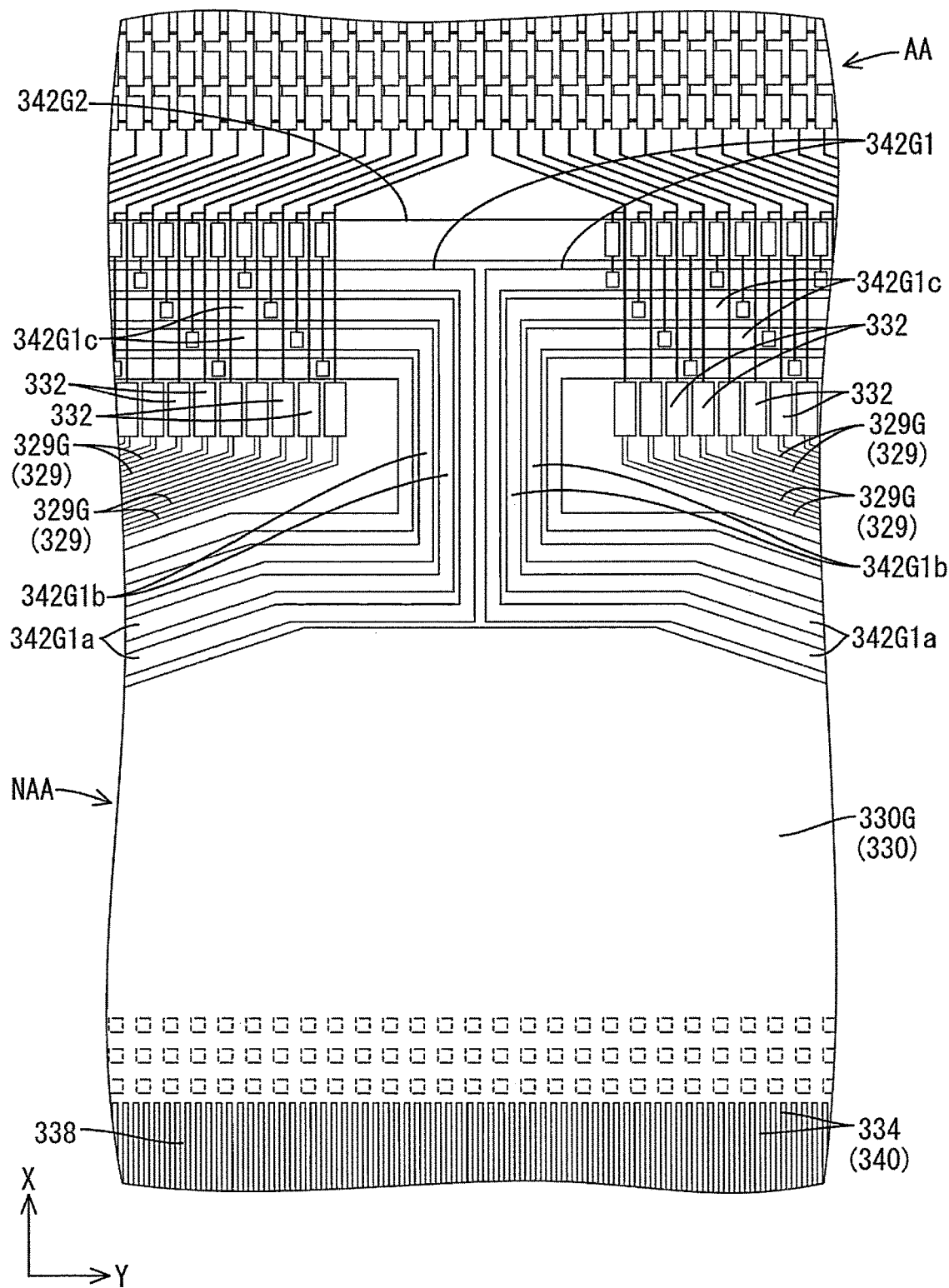
FIG. 16 is a plan view illustrating a tracing configuration between a pair of gate side drivers in a non-display area of an array board included in a liquid crystal panel.
Figure 17:
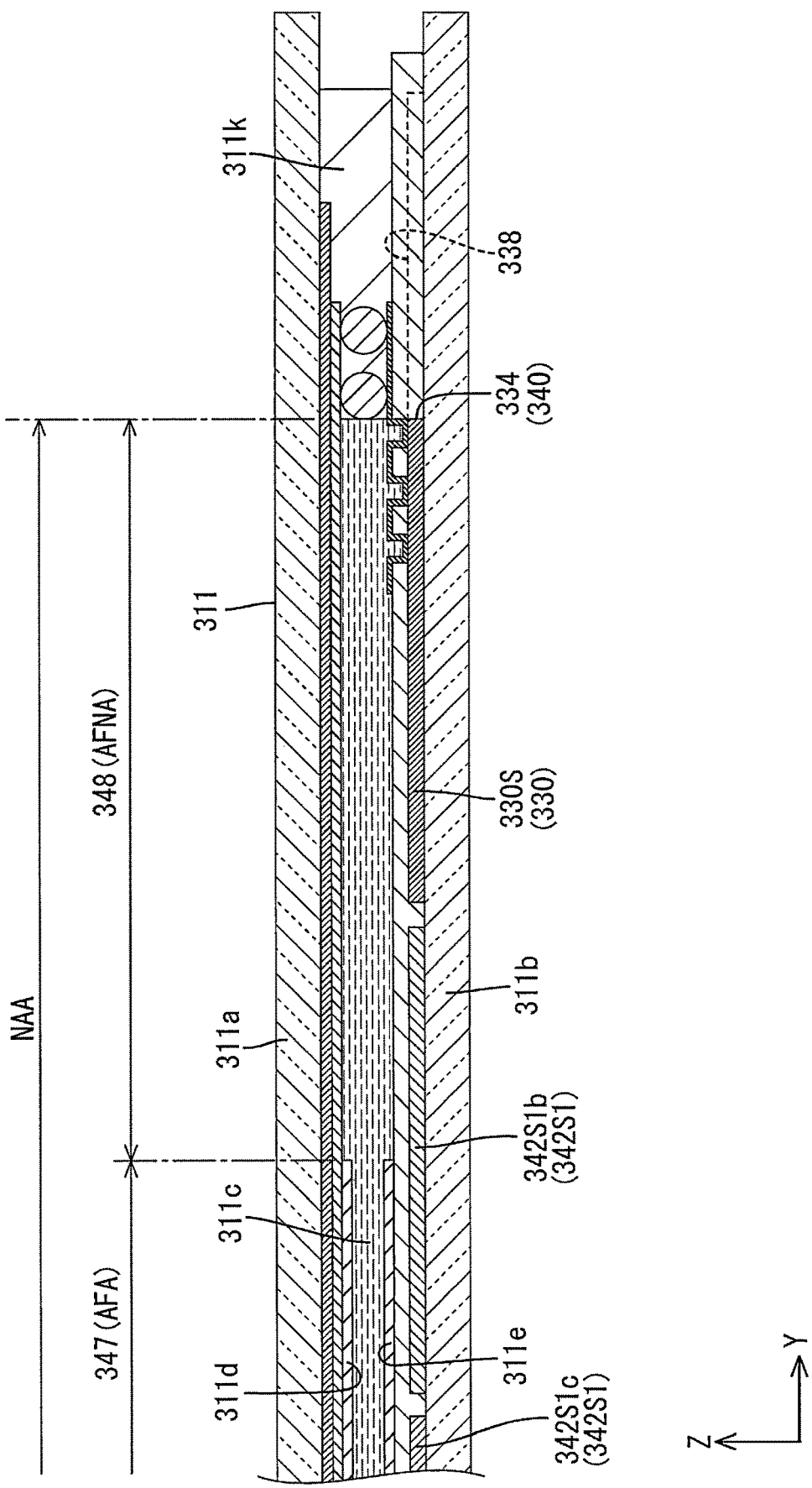
FIG. 17 is a cross-sectional view illustrating a cross-sectional configuration along a short-side direction of the non-display area of the liquid crystal panel.

As illustrated in FIGS. 15 to 17, a gate-side common electrode connection line portion 330G and a source-side common electrode connection line portion 330S included in the common electrode connection line portion 330 include empty portions 334 only in a sealing member overlap portion 338 overlapping a sealing member 311*k* in a plan view and the gate-side common electrode connection line portion 330G and the source-side common electrode connection line portion 330S are formed in a solid pattern except for the sealing member overlap portion 338. The solid patterned common electrode connection line portion 330 does not include any empty portion 334. The gate-side common electrode connection line portion 330G and the source-side common electrode connection line portion 330S include only sealing empty portions 340 for passing light therethrough for curing the sealing member 311*k*. The gate-side common electrode connection line portion 330G and the source-side common electrode connection line portion 330S do not include empty portions for obtaining the amount of light passing through the common electrode connection line portions 330G, 330S same as that of light passing through a gate line connection line 329G group and a source line connection line 329S group.

A pair of alignment films 311*d* and 311*e* is disposed on plate surfaces of a pair of boards 311*a* and 311*b* opposite a liquid crystal layer 311*c*, respectively. The alignment films 311*d* and 311*e* are arranged to extend over the display area AA and the non-display area NAA. As illustrated in FIGS. 15 and 17, on a source-side driver side in the non-display area NAA, the alignment films 311*d* and 311*e* overlap a dummy pixel portion 331 group and an ESD protection portion 332 group in a plan view and do not overlap the source line connection line 329S group and the source-side common electrode connection line portion 330S in a plan view. Namely, outer edges of the alignment films 311*d* and 311*e* in the Y-axis direction are between the ESD protection portion 332 group and both of the source line connection line 329S group and the source-side common electrode connection line portion 330S and the outer edges extend straight along the X-axis direction. The pair of alignment films 311*d* and 311*e* overlaps an entire area of a second source-side check line 342S2 in a plan view and overlaps a substantially half area of first source-side check lines 342S1 in a plan view. Specifically, the pair of alignment films 311*d* and 311*e* overlaps a substantially half area of first straight portions 342S1*b* on a second straight portion 342S1*c* side and an entire area of the second straight portions 342S1*c* in a plan view. The pair of alignment films 311*d* and 311*e* does not overlap a half area of the first straight portions 342S1*b* on an angled portion 342S1*a* side and an entire area of the angled portions 342S1*a* in a plan view. As illustrated in FIGS. 16 and 17, the pair of alignment films 311*d* and 311*e* overlaps in a plan view an ESD protection portion 332 group on a gate-side driver side of the non-display area NAA. The pair of alignment films 311*d* and 311*e* does not overlap a gate line connection line 329G group and a gate-side common electrode connection line portion 330G in a plan view. Namely, outer edges of the alignment films 311*d* and 311*e* in the Y-axis direction are between the ESD protection portion 332 group and both of a gate line connection line 329G group and a gate-side common electrode connection line portion 330G and the outer edges extend straight along the X-axis direction. The pair of alignment films 311*d* and 311*e* overlaps an entire area of a second gate-side check line 342G2 in a plan view and overlaps a substantially half area of first gate-side check lines 342G1 in a plan view. Specifically, the pair of alignment films 311*d* and 311*e* overlaps a substantially half area of first straight portions 342G1*b* on a second straight portion 342G1*c* side and an entire area of the second straight portions 342G1*c* in a plan view. The pair of alignment films 311*d* and 311*e* does not overlap a half area of the first straight portions 342G1*b* on an angled portion 342G1*a* side and an entire area of the angled portions 342G1*a* in a plan view.

Accordingly, as illustrated in FIG. 17, the non-display area NAA of the boards 311*a* and 311*b* includes an alignment film arrangement area AFA where both of the alignment films 311*d* and 311*e* are disposed and an alignment film non-arrangement area AFNA where no alignment film 311*d*, 311*e* is disposed. The alignment film arrangement area AFA and the alignment film non-arrangement area AFNA have similar functions as those in the third embodiment. Therefore, the non-display area NAA of the boards 311*a* and 311*b* is divided into a liquid crystals orientation portion 347 where the liquid crystal molecules in the liquid crystal layer 311*c* are oriented and a liquid crystals non-orientation portion 348 where the liquid crystal molecules in the liquid crystal layer 311*c* are not oriented. The liquid crystals orientation portion 347 and the liquid crystals non-orientation portion 348 have similar functions as those in the third embodiment. The liquid crystals non-orientation portion 348 overlaps the signal line connection line 329 group, the common electrode connection line portion 330, and a substantially half of the first check lines 342G1, 342S1 (specifically, the angled portions 342G1*a*, 342S1*a*) in a plan view. According to such a configuration, even if light passes through the empty portions between adjacent signal line connection lines 329 in the non-display area of the array board 311*b*, the light is less likely to pass through the liquid crystal panel 311. Therefore, the signal line connection lines 329, the common electrode connection line portion 330, and the angled portions 342G1*a*, 342S1*a* of the first check lines 32G1, 342S1 are less likely to be seen as a shadow by the user and a good appearance of the liquid crystal display device 210 is maintained. The cross-sectional configuration of the liquid crystal panel 311 on the source-side river side is illustrated in FIG. 17, and the cross-sectional configuration of the gate-side driver side is similar to that in FIG. 17.

Fifth Embodiment

Figure 18:
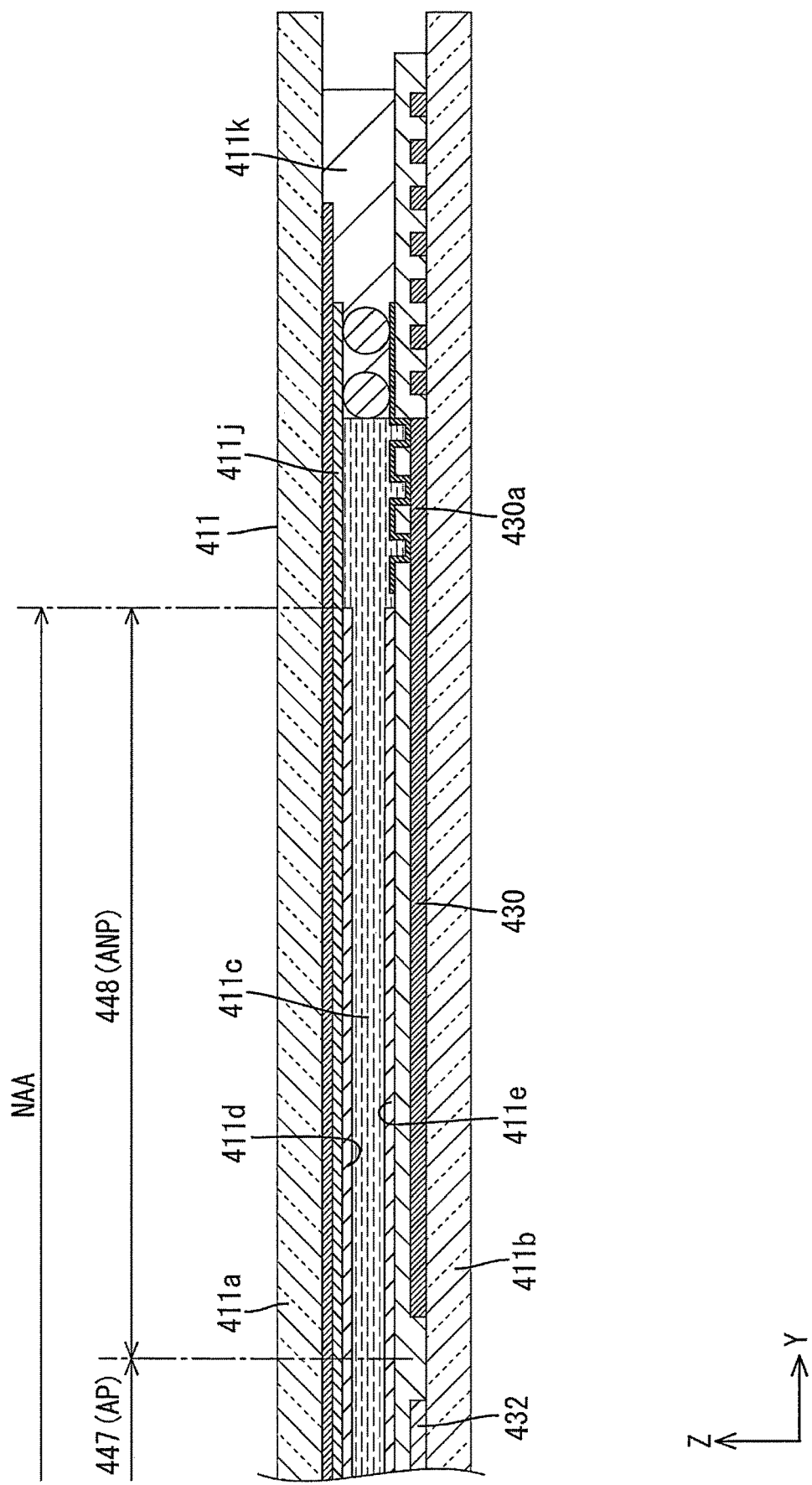
FIG. 18 is a cross-sectional view illustrating a cross-sectional configuration along a short-side direction of the non-display area of a liquid crystal panel according to a fifth embodiment of the present invention.

A fifth embodiment of the present invention will be described with reference to FIG. 18. In the fifth embodiment, an area where alignment films 411*d* and 411*e* are formed and an area of the alignment film that is subjected to the orientation process differ from those in the third embodiment. Structures, functions, and effects similar to those of the third embodiment will not be described.

A pair of alignment films 411*d* and 411*e* is disposed on plate surfaces of a pair of boards 411*a* and 411*b* opposite a liquid crystal layer 411*c*, respectively. The pair of boards 411*a* and 411*b* is included in a liquid crystal panel 411 of this embodiment. The alignment films 411*d* and 411*e* are arranged to extend over the display area AA and the non-display area NAA. As illustrated in FIG. 18, the alignment films 411*d* and 411*e* are formed in a solid pattern in a substantially entire area of the non-display area NAA except for a connection portion between a transfer pad portion 430*a* and a common electrode 411*j* and a portion having a sealing member 411*k*, similarly to the first embodiment. Unlike the third embodiment, the pair of alignment films 411*d* and 411*e* includes a rubbing processed portion (an orientation portion) AP and a rubbing non-processed portion (a non-orientation portion) ANP. The rubbing processed portion AP is subjected to rubbing process (orientation process) and the rubbing non-processed portion ANP is not subjected to the rubbing process. The rubbing-processed portion AP of the pair of alignment films 411*d* and 411*e* overlaps a dummy pixel portion group (not illustrated) and an ESD protection portion 432 group in a plan view and the rubbing non-processed portion ANP overlaps a signal line connection line 429 group and a common electrode connection line portion 430 in a plan view. Namely, a border between the rubbing-processed portion AP and the rubbing non-processed portion ANP is between the ESD protection portion 432 group and both of the signal line connection line 429 group and the common electrode connection line portion 430 and the border extends straight along the X-axis direction. The rubbing-processed portion AP and the rubbing non-processed portion ANP are formed in the above area as follows. In the rubbing process for the alignment films 411*e* and 411*e* during the manufacturing process, the rubbing non-processed portion ANP of each of the alignment films 411*d* and 411*e* is covered with a masking member such as a metal material so that the rubbing-processed portion AP is uncovered by the masking member. Then, the alignment films 411*d* and 411*e* and the masking member are rubbed with a cloth so that only the rubbing-processed portion AP uncovered with the masking member is subjected to the rubbing process and the rubbing non-processed portion ANP covered with the masking member is not subjected to the rubbing process. Since the rubbing-processed portion AP is subjected to the rubbing process as described before, liquid crystal molecules included in the liquid crystal layer 411*c* are processed with anchoring and the orientation of the liquid crystal molecules can be controlled in the rubbing-processed portion AP. The liquid crystal molecules included in the liquid crystal layer 411*c* are not processed with anchoring and the orientation of the liquid crystal molecules is not controlled in the rubbing non-processed portion ANP. Therefore, the non-display area NAA of the pair of boards 411*a* and 411*b* is divided into a liquid crystals orientation portion 447 where the liquid crystal molecules in the liquid crystal layer 411*c* are oriented and a liquid crystals non-orientation portion 448 where the liquid crystal molecules in the liquid crystal layer 411*c* are not oriented. The liquid crystals orientation portion 447 overlaps the rubbing-processed portion AP in a plan view and the liquid crystals non-orientation portion 448 overlaps the rubbing non-processed portion ANP in a plan view. The liquid crystals orientation portion 447 and the liquid crystals non-orientation portion 448 have similar functions as those in the third embodiment. The alignment films 411*d* and 411*e* of this embodiment have a same plan view area of the rubbing-processed portion AP and a same plan view area of the rubbing non-processed portion ANP. Therefore, the masking member used for the rubbing process is commonly used and a manufacturing cost is reduced.

The pair of alignment films 411*d* and 411*e* is printed on the pair of boards 411*a* and 411*b* with an ink jet method in the manufacturing process of the liquid crystal panel 411. Specifically, in the ink jet method, liquid drops of an alignment film material are ejected from ink jet nozzles toward the boards 411*a* and 411*b* to form the alignment films 411*d* and 411*e*. With the ink jet method, takt time is shortened and a manufacturing cost is reduced compared to the transfer printing method. However, with the ink jet method, the position accuracy of forming area of each alignment film 411*d*, 4113 is relatively decreased compared to the transfer printing method. With the rubbing process, accuracy of the forming area of the rubbing-processed portion AP (the forming area of the rubbing non-processed portion ANP) is easily increased. Accordingly, the similar functions and effects as those in the third embodiment are obtained.

As described before, according to this embodiment, the liquid crystal panel includes the pair of alignment films 411*d* and 411*e* that is disposed on the plate surfaces of the pair of boards 411*a* and 411*b* opposite the liquid crystal layer 411*c*, respectively. Portions of the pair of alignment films 411*d* and 411*e* in the display area AA correspond to the rubbing processed portion (the orientation portion) AP that is subjected to the rubbing process and a portion of one of the alignment films 411*d* and 411*e* that is in the non-display area and overlaps at least the signal line connection lines 429 in a plan view corresponds to the rubbing non-processed portion (the non-orientation portion) ANP that is not subjected to the rubbing process. The liquid crystals orientation portion 447 corresponds to the rubbing processed portion AP and the liquid crystals non-orientation portion 448 corresponds to the rubbing non-processed portion ANP. Accordingly, the pair of alignment films 411*d* and 411*e* extends over the display area AA and non-display area NAA. Therefore, even if the positions of the alignment films 411*d*, 411*e* are displaced during the manufacturing process, the alignment films 411*d* and 411*e* are reliably disposed in the display area AA. The liquid crystals orientation portion 447 corresponds to the rubbing processed portion AP that is a portion of the pair of alignment films 411*d* and 411*e* that are subjected to the orientation process, and the liquid crystals non-orientation portion 448 corresponds to the rubbing non-processed portion ANP that is a portion of one of the pair of alignment films 411*e* and 411*e* that is not subjected to the orientation process. In this configuration, the accuracy of the forming area of the alignment films 411*d* and 411*e* may not be ensured. Even if the accuracy of the position of the forming area of the alignment films 411e and 411e is low, the liquid crystals non-orientation portion 448 is reliably arranged and this reduces a cost.

The pair of alignment films 411d and 411e is disposed in same plan view areas of the boards 411a and 411b and the liquid non-orientation portion 448 is included in each of the boards 411a and 411b. Accordingly, since the liquid crystals non-arrangement portion 448 is disposed on each of the boards 411a and 411b, the light passing through portions between the adjacent signal line connection lines 429 is reliably prevented from leaking therefrom. Therefore, the signal line connection lines 429 are further less likely to be seen as the shadow and good appearance of the liquid crystal panel 411 is effectively maintained. Further, the alignment films 411d and 411e have the same plan view forming areas on the boards 411a and 411b. Therefore, the alignment film printing plate is commonly used for patterning the alignment films 411d and 411e during the manufacturing process and a manufacturing cost is reduced.

Sixth Embodiment

Figure 19:
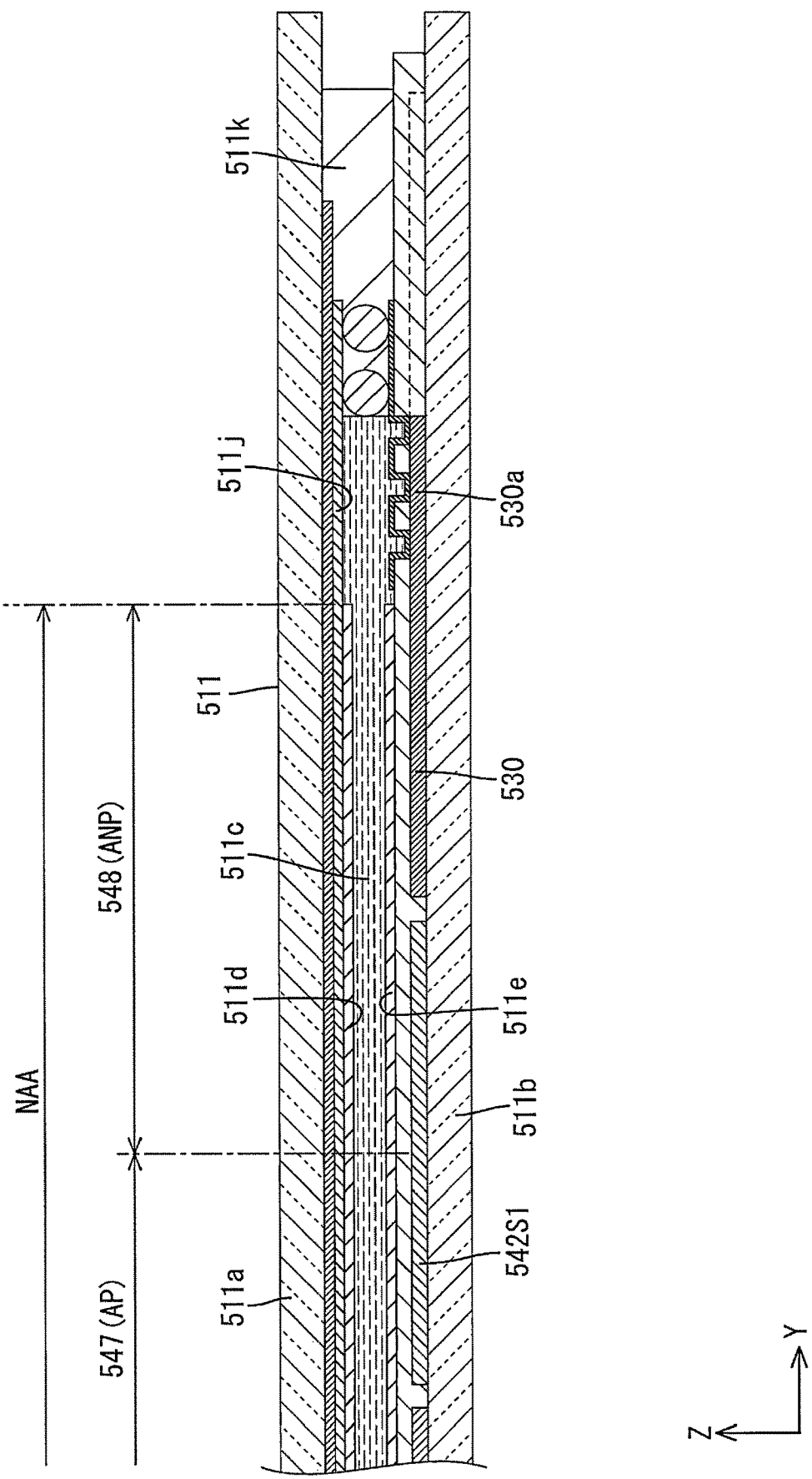
FIG. 19 is a cross-sectional view illustrating a cross-sectional configuration along a short-side direction of the non-display area of a liquid crystal panel according to a sixth embodiment of the present invention.

A sixth embodiment of the present invention will be described with reference to FIG. 19. In the sixth embodiment, an area where alignment films 511d and 511e are formed and an area of the alignment film that is subjected to the orientation process differ from those in the fifth embodiment. Structures, functions, and effects similar to those of the fourth and fifth embodiments will not be described.

A pair of alignment films 511d and 511e is disposed on plate surfaces of a pair of boards 511a and 511b opposite a liquid crystal layer 511c, respectively. The pair of boards 511a and 511b is included in a liquid crystal panel 511 of this embodiment. The alignment films 511d and 511e are arranged to extend over the display area AA and the non-display area NAA. As illustrated in FIG. 19, the alignment films 511d and 511e are formed in a solid pattern in a substantially entire area of the non-display area NAA except for a connection portion between a transfer pad portion 530a and a common electrode 511j and a portion having a sealing member 511k, similarly to the second embodiment. The alignment films 511d and 511e differ from those in the fourth embodiment in that they include a rubbing-processed portion (an orientation processed portion) AP that is subjected to the rubbing process (an orientation process) and a rubbing non-processed portion (an orientation non-processed portion) ANP that is not subjected to the rubbing process. The rubbing-processed portion AP of the pair of alignment films 511d and 511e overlap a dummy pixel portion group (not illustrated) and an ESD protection portion group (not illustrated) on a source-side driver side in a plan view and overlaps the ESD protection portion group (not illustrated) on a gate-side driver side in a plan view. The rubbing non-processed portion ANP overlaps a signal line connection line group (not illustrated), a common electrode connection line portion 530, and approximately half of the first check lines 542S1 (542G1) in a plan view. Namely, a border between the rubbing-processed portion AP and the rubbing non-processed portion ANP is between the ESD protection portion group and both of the signal line connection line group and the common electrode connection line portion 530 and the border extends straight along the X-axis direction. The rubbing-processed portion AP and the rubbing non-processed portion ANP have similar functions as those in the fifth embodiment and the method of forming the portions are similar to those in the fifth embodiment. The non-display area NAA of the boards 511a and 511b is divided into a liquid crystals orientation portion 547 where the liquid crystal molecules in the liquid crystal layer 511c are oriented and a liquid crystals non-orientation portion 548 where the liquid crystal molecules in the liquid crystal layer 511c are not oriented. The liquid crystals orientation portion 547 overlaps the rubbing-processed portion AP in a plan view and the liquid crystals non-orientation portion 548 overlaps the rubbing non-processed portion ANP. The liquid crystals orientation portion 547 and the liquid crystals non-orientation portion 548 have similar functions as those in the third embodiment.

Seventh Embodiment

Figure 20:
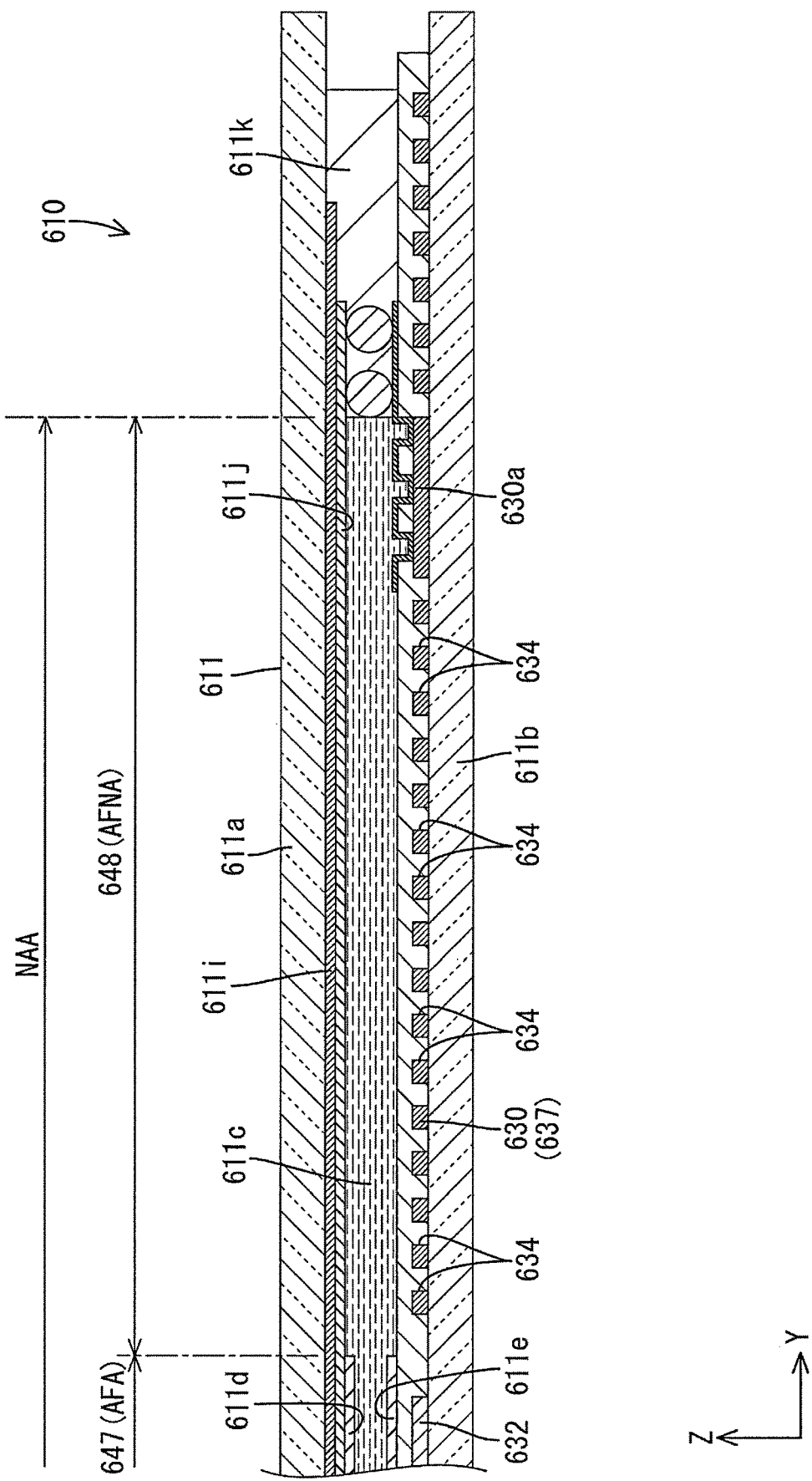
FIG. 20 is a cross-sectional view illustrating a cross-sectional configuration along a short-side direction of the non-display area of a liquid crystal panel according to a seventh embodiment of the present invention.

A seventh embodiment of the present invention will be described with reference to FIG. 20. In the seventh embodiment, the configuration of the first embodiment in that a common electrode connection line portion 630 includes empty portions 634 is combined with the configuration of the third embodiment relating a forming area of alignment films 611d and 611e. Structures, functions, and effects similar to those of the first and third embodiments will not be described.

A pair of alignment films 611d and 611e is disposed on plate surfaces of a pair of boards 611a and 611b opposite a liquid crystal layer 611c, respectively. The pair of boards 611a and 611b is included in a liquid crystal panel 611 of this embodiment. The alignment films 611d and 611e are arranged to extend over the display area AA and the non-display area NAA as illustrated in FIG. 20. In the non-display area NAA, the alignment films 611d and 611e overlap a dummy pixel portion group (not illustrated) and an ESD protection portion 632 group in a plan view and do not overlap a signal line connection line group (not illustrated) and a common electrode connection line portion 630 in a plan view. Namely, outer edges of the alignment films 611d and 611e in the Y-axis direction are between the ESD protection portion 632 group and both of the signal line connection line group and the common electrode connection line portion 630 and the outer edges extend straight along the X-axis direction. An entire area of the common electrode connection line portion 630 corresponds to an alignment film non-overlap portion 637 that does not overlap the alignment films 611d and 611e. Accordingly, the non-display area NAA of the boards 611a and 611b includes an alignment film arrangement area AFA where both of the alignment films 611d and 611e are disposed and an alignment film non-arrangement area AFNA were no alignment film 611d, 611e is disposed. The alignment film arrangement area AFA and the alignment film non-arrangement area AFNA have similar functions as those in the third embodiment. The non-display area NAA of the boards 611a and 611b is divided into a liquid crystals orientation portion 647 where the liquid crystal molecules in the liquid crystal layer 611c are oriented and a liquid crystals non-orientation portion 648 where the liquid crystal molecules in the liquid crystal layer 611c are not oriented. The liquid crystals orientation portion 647 corresponds to a portion overlapping the alignment film arrangement area AFA in a plan view and the liquid crystals non-orientation portion 648 corresponds to a portion overlapping the alignment film non-arrangement area AFNA in a plan view. The liquid crystals orientation portion 647 and the liquid crystals non-orientation portion 648 have similar functions as those in the third embodiment.

The common electrode connection line portion 630 includes empty portions 634. The empty portions 634 are formed in a substantially entire area of the common electrode connection line portion 630 except for the transfer pad portion 630a that is a connection portion to be connected to a common electrode 611j. Namely, the common electrode connection line portion 630 includes the empty portions 634 on a display area AA side with respect to the transfer pad portion 630a having a plan view belt-like shape, and the empty portions 634 are adjacent to the signal line connection line group (not illustrated). Even if a small amount of light passes through the liquid crystals non-orientation portion 648, the light passes through the empty portions 634 similarly to the empty portions between the adjacent signal line connection lines. Accordingly, even if a small amount of light passes through the liquid crystals non-orientation portion 648, the signal line connection line group and the common electrode connection line portion 630 are seen by the user of the liquid crystal display device 610 with similar brightness and good appearance of the liquid crystal display device 610 is maintained. Plan view shapes of the empty portions 634 are similar to those in the first embodiment.

As described before, the first liquid crystal panel 611 of this embodiment includes a pair of the boards 611a and 611b, the liquid crystal layer 611c, the pair of alignment films 611d, 611e, and the pair of liquid crystals non-orientation portions 647. The boards 611a and 611b are defined into the display area AA and the non-display area NAA. The liquid crystal layer 611c is sandwiched between the boards 611a and 611b. The pair of alignment films 611d and 611e is disposed on plate surfaces of the respective boards 611a and 611b opposite the liquid crystal layer 611c and extends over the display area AA and non-display area NAA. The pair of alignment films 611d and 611e is configured to orient the liquid crystal molecules included in the liquid crystal layer 611c. The liquid crystals non-orientation portion 648 overlaps in a plan view the signal line connection lines and the common electrode connection line portion 630 in the non-display area NAA of at least one of the boards 611a and 611b. The liquid crystal molecules included in the liquid crystal layer 611c are not oriented due to the liquid crystals non-orientation portion 648. According to such a configuration, even if light passes through a light blocking layer 611i, portions between adjacent signal line connection lines, and the empty portions 634 of the common electrode connection line portion 630, the liquid crystal molecules are not oriented due to the liquid crystals non-orientation portion 648 so that the light is less likely to pass therethrough. Accordingly, leakage of light is less likely to be caused and the good appearance of the liquid crystal panel 611 is maintained.

The second liquid crystal panel 611 of this embodiment includes the common electrode connection line portion (a wide line portion) 630 that is disposed in the non-display area NAA of one of the boards 611a and 611b and has a line width greater than that of the signal line connection line and partially includes the empty portions 634. If the common electrode connection line portion has no empty portions 634 and is formed in a solid pattern, the light is less likely to pass through the common electrode connection line portion and the amount of light passing through the common electrode connection line portion and that of light passing through the signal line connection lines greatly differ from each other. As a result, the common electrode connection line portion is likely to be seen as a shadow by the user of the liquid crystal panel 611 and this may deteriorate the appearance of the liquid crystal panel 611. In this embodiment, the common electrode connection line portion 630 partially includes empty portions 634 and the light passes through the empty portions 634 of the common electrode connection line portion 630 similarly to the signal line connection lines 629. Accordingly, it is less likely to occur that the common electrode connection line portion 630 is seen as a shadow by the user of the liquid crystal panel 611 and the good appearance of the liquid crystal panel 611 is maintained.

Eighth Embodiment

Figure 21:
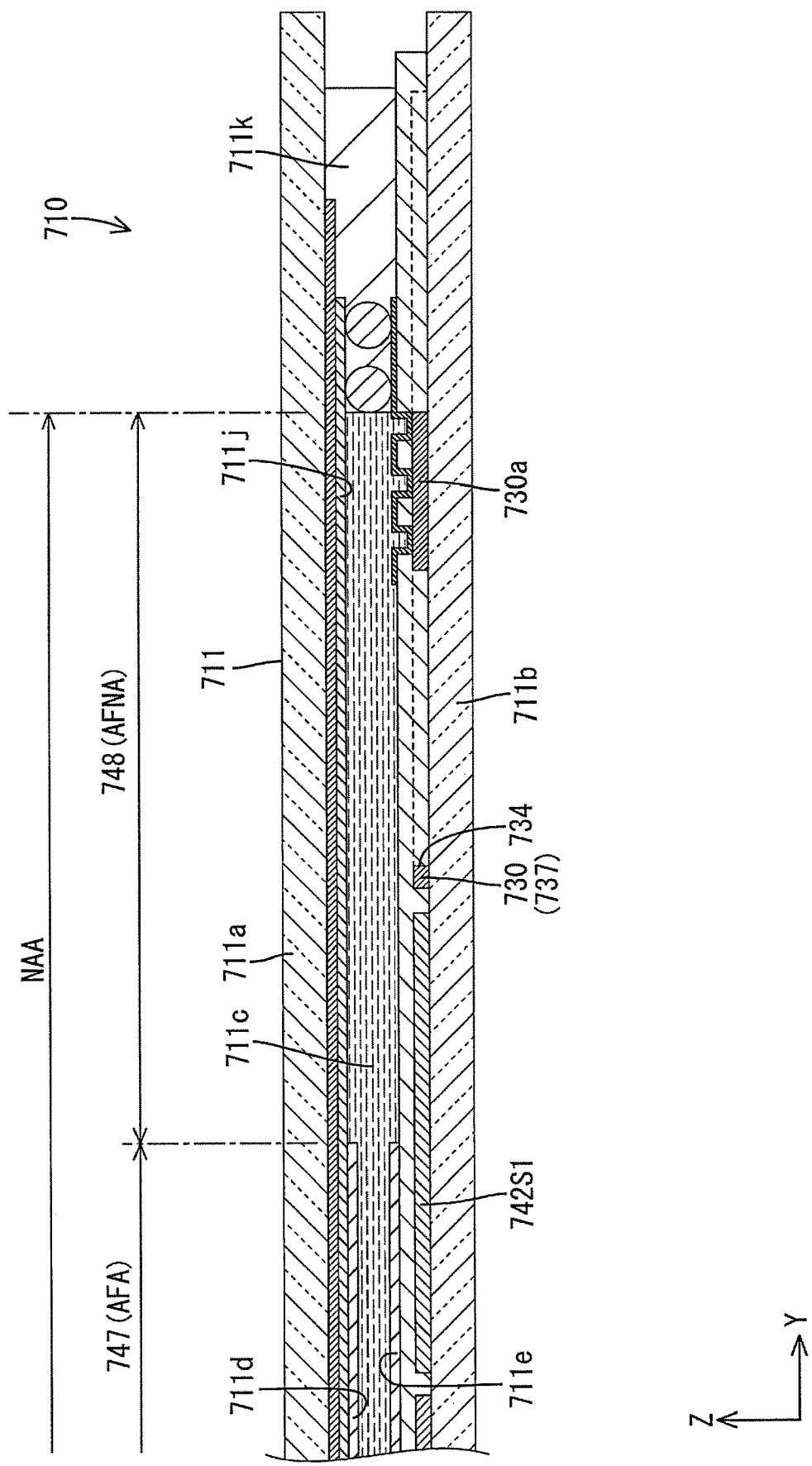
FIG. 21 is a cross-sectional view illustrating a cross-sectional configuration along a short-side direction of the non-display area of a liquid crystal panel according to an eighth embodiment of the present invention.

An eighth embodiment of the present invention will be described with reference to FIG. 21. In the eighth embodiment, the configuration of the second embodiment in that a common electrode connection line portion 730 includes empty portions 734 is combined with the configuration of the fourth embodiment relating a forming area of alignment films 711d and 711e. Structures, functions, and effects similar to those of the second and fourth embodiments will not be described.

A pair of alignment films 711d and 711e is disposed on plate surfaces of a pair of boards 711a and 711b opposite a liquid crystal layer 711c, respectively. The pair of boards 711a and 711b is included in a liquid crystal panel 711 of this embodiment. The alignment films 711d and 711e are arranged to extend over the display area AA and the non-display area NAA as illustrated in FIG. 21. In the non-display area NAA, the alignment films 711d and 711e overlap a dummy pixel portion group (not illustrated) and an ESD protection portion group (not illustrated) in a plan view and overlap the ESD protection portion group (not illustrated) on a gate-side driver side in a plan view. The alignment films 711d and 711e do not overlap the signal line connection line group (not illustrated), the common electrode connection line portion 730, and approximately a half of first check lines 742S1 (742G1) on the source-side driver side and the gate-side driver side in a plan view. Namely, outer edges of the alignment films 711d and 711e in the Y-axis direction are between the ESD protection portion group and both of the signal line connection line group and the common electrode connection line portion 730 and the outer edges extend straight along the X-axis direction. Therefore, an entire area of the common electrode connection line portion 730 corresponds to an alignment film non-overlap portion 737. Accordingly, the non-display area NAA of the pair of boards 711a and 711b includes an alignment film arrangement area AFA where both of the alignment films 711d and 711e are disposed and an alignment film non-arrangement area AFNA where no alignment film 711d, 711e is disposed. The alignment film arrangement area AFA and the alignment film non-arrangement area AFNA have similar functions as those in the third embodiment. The non-display area NAA of the boards 711a and 711b is divided into a liquid crystals orientation portion 747 where the liquid crystal molecules in the liquid crystal layer 711c are oriented and a liquid crystals non-orientation portion 748 where the liquid crystal molecules in the liquid crystal layer 711c are not oriented. The liquid crystals orientation portion 747 corresponds to a portion overlapping the alignment film arrangement area AFA in a plan view and the liquid crystals non-orientation portion 748 corresponds to a portion overlapping the alignment film non-arrangement area AFNA in a plan view. The liquid crystals orientation portion 747 and the liquid crystals non-orientation portion 748 have similar functions as those in the third embodiment.

The common electrode connection line portion 730 partially includes empty portions 734. The empty portions 734 are formed in a substantially entire area of the common electrode connection line portion 730 except for a transfer pad portion 730a that is a connection portion to be connected to a common electrode 711j. Namely, the common electrode connection line portion 730 includes the empty portions 734 on a display area AA side with respect to the transfer pad portion 730a having a plan view belt-like shape, and the empty portions 734 are adjacent to angled portions (not illustrated) of first source-side check lines 742S1 (see FIG. 10). Therefore, even if a small amount of light passes through the liquid crystals non-orientation portion 748, the light passes through the empty portions 734 similarly to the empty portions between the adjacent signal line connection lines and the empty portion between the adjacent angled portions. Angled portion of the first-side check lines 742S1 includes second empty portions, which are not illustrated, and the light passing through the liquid crystals non-orientation portion 748 passes the second empty portions. Accordingly, even if a small amount of light passes through the liquid crystals non-orientation portion 748, all of the signal line connection line group, the common electrode connection line portion 730, and the angled portion group of the first source-side check line 742S1 are seen by the user of the liquid crystal display device 710 with similar brightness, and good appearance of the liquid crystal display device 710 is maintained. Plan view shapes of the empty portions 734 and the second empty portions are similar to those in the second embodiment.

Ninth Embodiment

Figure 22:
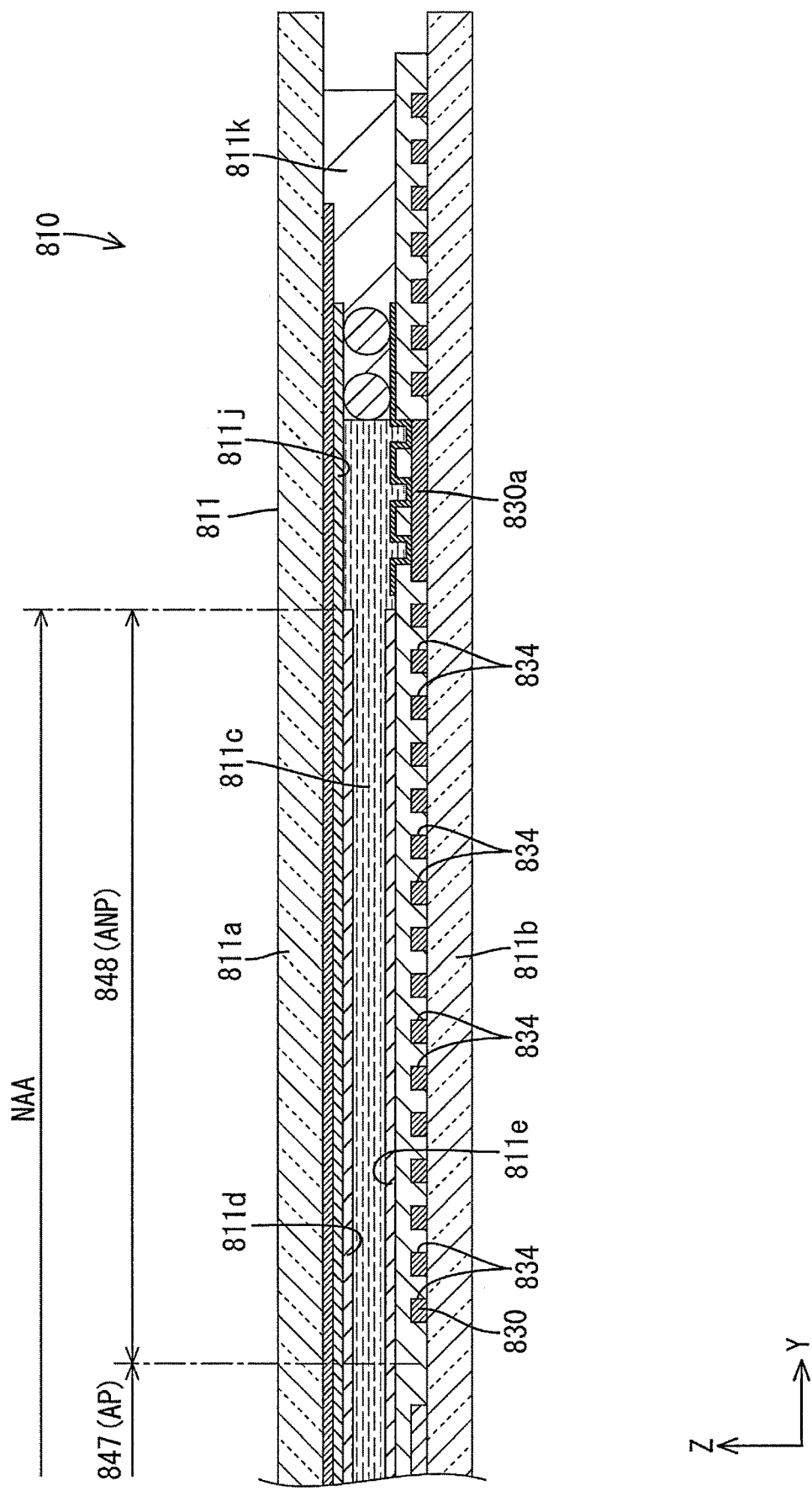
FIG. 22 is a cross-sectional view illustrating a cross-sectional configuration along a short-side direction of the non-display area of a liquid crystal panel according to a ninth embodiment of the present invention.

A ninth embodiment of the present invention will be described with reference to FIG. 22. In the ninth embodiment, the configuration of the first embodiment in that a common electrode connection line portion 830 includes empty portions 834 is combined with the configuration of the fifth embodiment regarding an orientation-processed area where alignment films 811d and 811e are subjected to the orientation process. Structures, functions, and effects similar to those of the first and fifth embodiments will not be described.

A pair of alignment films 811d and 811e is disposed on plate surfaces of a pair of boards 811a and 811b opposite a liquid crystal layer 811c, respectively. The pair of boards 811a and 811b is included in a liquid crystal panel 811 of this embodiment. The alignment films 811d and 811e are arranged to extend over the display area AA and the non-display area NAA. As illustrated in FIG. 22, the alignment films 811d and 811e are formed in a solid state on a substantially entire area of the non-display area NAA except for a connection portion between the a transfer pad portion 830a of the common electrode connection line portion 830 and the portion having the sealing member 811k. The alignment films 811d and 811e include a rubbing-processed portion (an orientation processed portion) AP that is subjected to the rubbing process (an orientation processed portion) and a rubbing non-processed portion (an orientation non-processed portion) ANP that is not subjected to the rubbing process. Forming areas, the forming method, and functions of the rubbing-processed portion AP and the rubbing non-processed portion ANP are similar to those in the fifth embodiment. The non-display area NAA of the boards 811a and 811b is divided into a liquid crystals orientation portion 847 where the liquid crystal molecules in the liquid crystal layer 811c are oriented and a liquid crystals non-orientation portion 848 where the liquid crystal molecules in the liquid crystal layer 811c are not oriented. The liquid crystals orientation portion 847 corresponds to a portion overlapping the rubbing-processed portion AP in a plan view and the liquid crystals non-orientation portion 848 corresponds to a portion overlapping the rubbing non-processed portion ANP in a plan view. The liquid crystals orientation portion 847 and the liquid crystals non-orientation portion 848 have similar functions as those in the third embodiment.

The common electrode connection line portion 830 partially includes empty portions 834. The empty portions 834 are formed in a substantially entire area of the common electrode connection line portion 830 except for a transfer pad portion 830a that is a connection portion to be connected to a common electrode 811j. Namely, the common electrode connection line portion 830 includes the empty portions 834 on a display area AA side with respect to the transfer pad portion 830a having a plan view belt-like shape, and the empty portions 834 are adjacent to signal line connection line group (not illustrated). Therefore, even if a small amount of light passes through the liquid crystals non-orientation portion 848, the light passes through the empty portions 834 similarly to the empty portions between the adjacent signal line connection lines. Accordingly, even if a small amount of light passes through the liquid crystals non-orientation portion 848, both of the signal line connection line group and the common electrode connection line portion 830 are seen by the user of the liquid crystal display device 810 with similar brightness, and good appearance of the liquid crystal display device 810 is maintained. Plan view shapes of the empty portions 834 are similar to those in the first embodiment.

Tenth Embodiment

Figure 23:
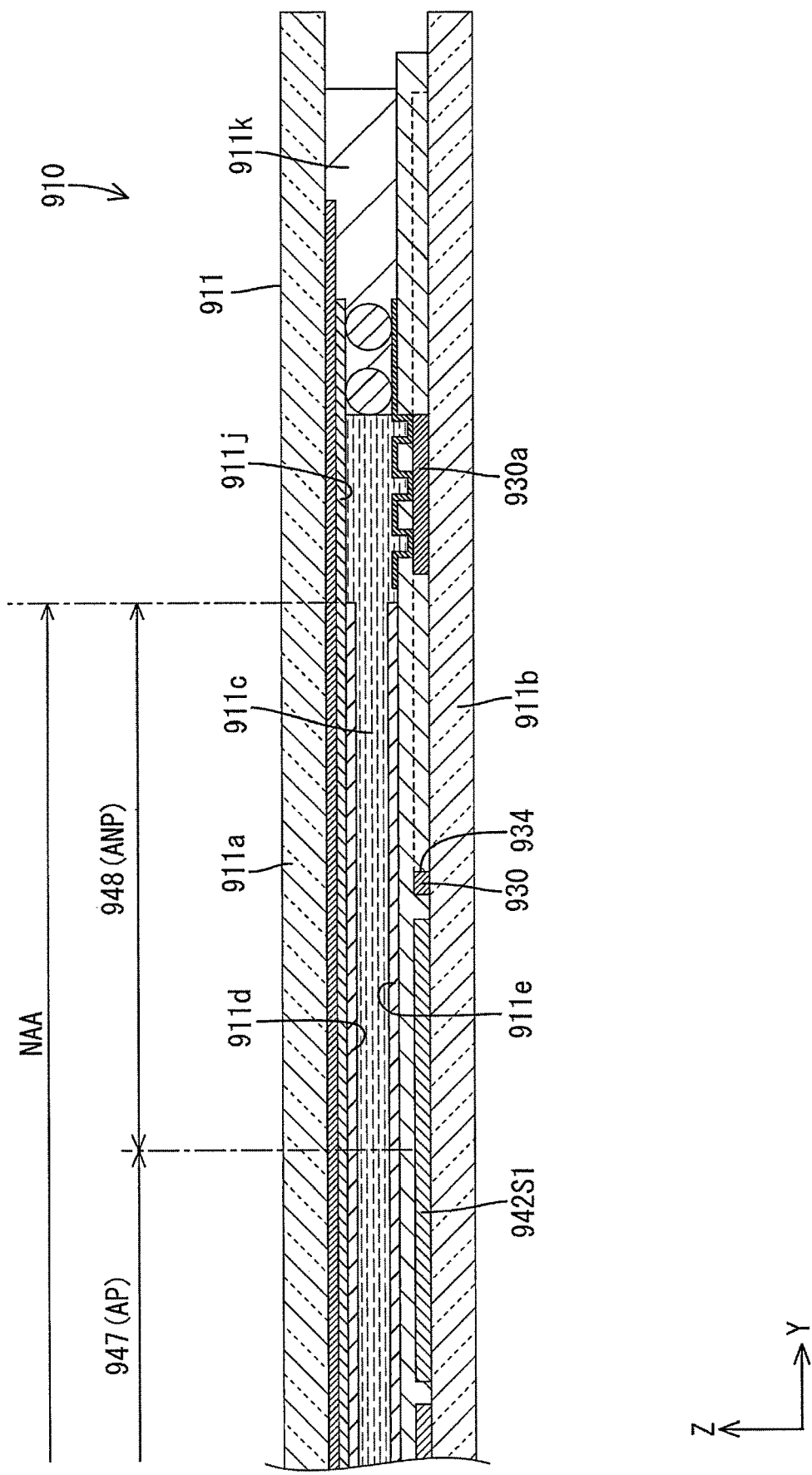
FIG. 23 is a cross-sectional view illustrating a cross-sectional configuration along a short-side direction of the non-display area of a liquid crystal panel according to a tenth embodiment of the present invention.

A tenth embodiment of the present invention will be described with reference to FIG. 23. In the tenth embodiment, the configuration of the second embodiment in that a common electrode connection line portion 930 includes empty portions 934 is combined with the configuration of the sixth embodiment regarding an orientation-processed area where alignment films 911d and 911e are subjected to the orientation process. Structures, functions, and effects similar to those of the second and sixth embodiments will not be described.

A pair of alignment films 911d and 911e is disposed on plate surfaces of a pair of boards 911a and 911b opposite a liquid crystal layer 911c, respectively. The pair of boards 911a and 911b is included in a liquid crystal panel 911 of this embodiment. The alignment films 911d and 911e are arranged to extend over the display area AA and the non-display area NAA. As illustrated in FIG. 23, the alignment films 911d and 911e are formed in a solid pattern on a substantially entire area of the non-display area NAA except for a connection portion between the a transfer pad portion 930a of the common electrode connection line portion 930 and the portion having the sealing member 911k similar to the second embodiment. The alignment films 911d and 911e include a rubbing-processed portion (an orientation processed portion) AP that is subjected to the rubbing process (an orientation processed portion) and a rubbing non-processed portion (an orientation non-processed portion) ANP that is not subjected to the rubbing process. Forming areas, the forming method, and functions of the rubbing-processed portion AP and the rubbing non-processed portion ANP are similar to those in the sixth embodiment. The non-display area NAA of the boards 911a and 911b is divided into a liquid crystals orientation portion 947 where the liquid crystal molecules in the liquid crystal layer 911c are oriented and a liquid crystals non-orientation portion 948 where the liquid crystal molecules in the liquid crystal layer 911c are not oriented. The liquid crystals orientation portion 947 corresponds to a portion overlapping the rubbing-processed portion AP in a plan view and the liquid crystals non-orientation portion 948 corresponds to a portion overlapping the rubbing non-processed portion ANP in a plan view. The liquid crystals orientation portion 947 and the liquid crystals non-orientation portion 948 have similar functions as those in the third embodiment.

The common electrode connection line portion 930 partially includes empty portions 934. The empty portions 934 are formed in a substantially entire area of the common electrode connection line portion 930 except for a transfer pad portion 930a that is a connection portion to be connected to a common electrode 911j. Namely, the common electrode connection line portion 930 includes the empty portions 934 on a display area AA side with respect to the transfer pad portion 930a having a plan view belt-like shape, and the empty portions 834 are adjacent to angled portions (not illustrated) of first source-side check lines 942S1 (see FIG. 10). Therefore, even if a small amount of light passes through the liquid crystals non-orientation portion 948, the light passes through the empty portions 934 similarly to the empty portions between the adjacent signal line connection lines and empty portion between adjacent angled portions. Angled portion of the first-side check lines 942S1 includes second empty portions, which are not illustrated, and the light passing through the liquid crystals non-orientation portion 948 passes the second empty portions. Accordingly, even if a small amount of light passes through the liquid crystals non-orientation portion 948, all of the signal line connection line group, the common electrode connection line portion 930, and the angled portion group of the first source-side check line 942S1 are easily seen by the user of the liquid crystal display device 910 with a same level, and good appearance of the liquid crystal display device 910 is maintained. Plan view shapes of the empty portions 934 and the second empty portions are similar to those in the second embodiment.

Eleventh Embodiment

An eleventh embodiment of the present invention will be described with reference to FIG. 24. In the eleventh embodiment, unlike the first embodiment, a common electrode connection line portion 1030 includes divided common electrode connection lines 1035 and short-circuit portions 49. Structures, functions, and effects similar to those of the first embodiment will not be described.

Figure 24:
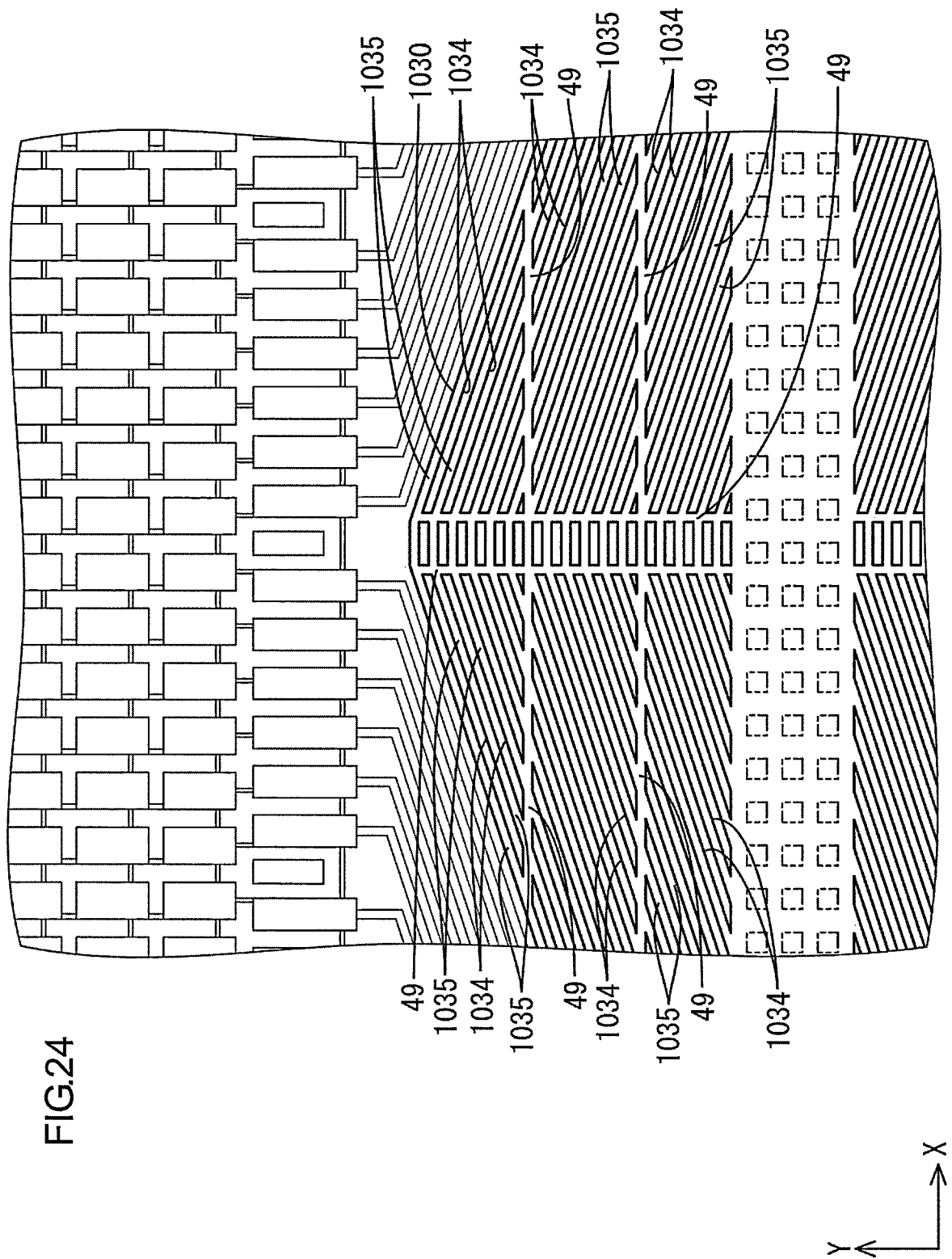
FIG. 24 is a plan view illustrating a tracing configuration between a pair of source side drivers in a non-display area of an array board included in a liquid crystal panel according to an eleventh embodiment of the present invention.

As illustrated in FIG. 24, the common electrode connection line portion 1030 partially include empty portions 1034 and is defined into a plurality of divided common electrode connection lines 1035. Adjacent divided common electrode connection lines 1035 are short-circuited by the short-circuit portions 49. The short-circuit portions 49 extend along a direction crossing an extending direction of the divided common electrode portion 1035. Specifically, some of the short-circuit portions 49 extend in the Y-axis direction and short-circuit the divided common electrode connection line portions 1035 that are adjacent to each other in the Y-axis direction, and some of the short-circuit portions 49 extend in the X-axis direction and short-circuit the divided common electrode connection lines 1035 that are adjacent to each other in the X-axis direction. The two kinds of short-circuit portions 49 are disposed at intervals. Each of the divided common electrode connection lines 1035 is connected to the short-circuit portions 49 at several portions thereof with respect to the extending direction thereof at intervals. According to such a configuration, if any one of the divided common electrode connection lines 1035 is disconnected, two side portions sandwiching the disconnected portion are connected (short-circuited) to the adjacent divided common electrode connection lines 1035 via the short-circuit portions 49 so that the divided common electrode connection line 1035 having the disconnected portion keeps electric potential same as that of the adjacent divided common electrode connection lines 1035. Further, the common electrode connection line portion 1030 increases an area thereof by an area of the short-circuit portions 49 and therefore line resistance is reduced.

As described before, the common electrode connection line portion 1030 includes the short-circuit portions 49 that short-circuit the adjacent divided common electrode connection lines 1035. According to such a configuration, the adjacent divided common electrode connection lines 1035 are short-circuited by the short-circuit portion 49. Therefore, even if any one of the divided common electrode connection lines 1035 is disconnected, the divided common electrode connection line 1035 having the disconnection is electrically connected to the adjacent divided common electrode connection lines 1035 via the short-circuit portions 49. Further, line resistance of the common electrode connection line portion 1030 is reduced.

Twelfth Embodiment

A twelfth embodiment of the present invention will be described with reference to FIG. 25. In the twelfth embodiment, unlike the second embodiment, a common electrode connection line portion 1130 includes divided common electrode connection lines 1135 and short-circuit portions 1149. Structures, functions, and effects similar to those of the second embodiment will not be described.

Figure 25:
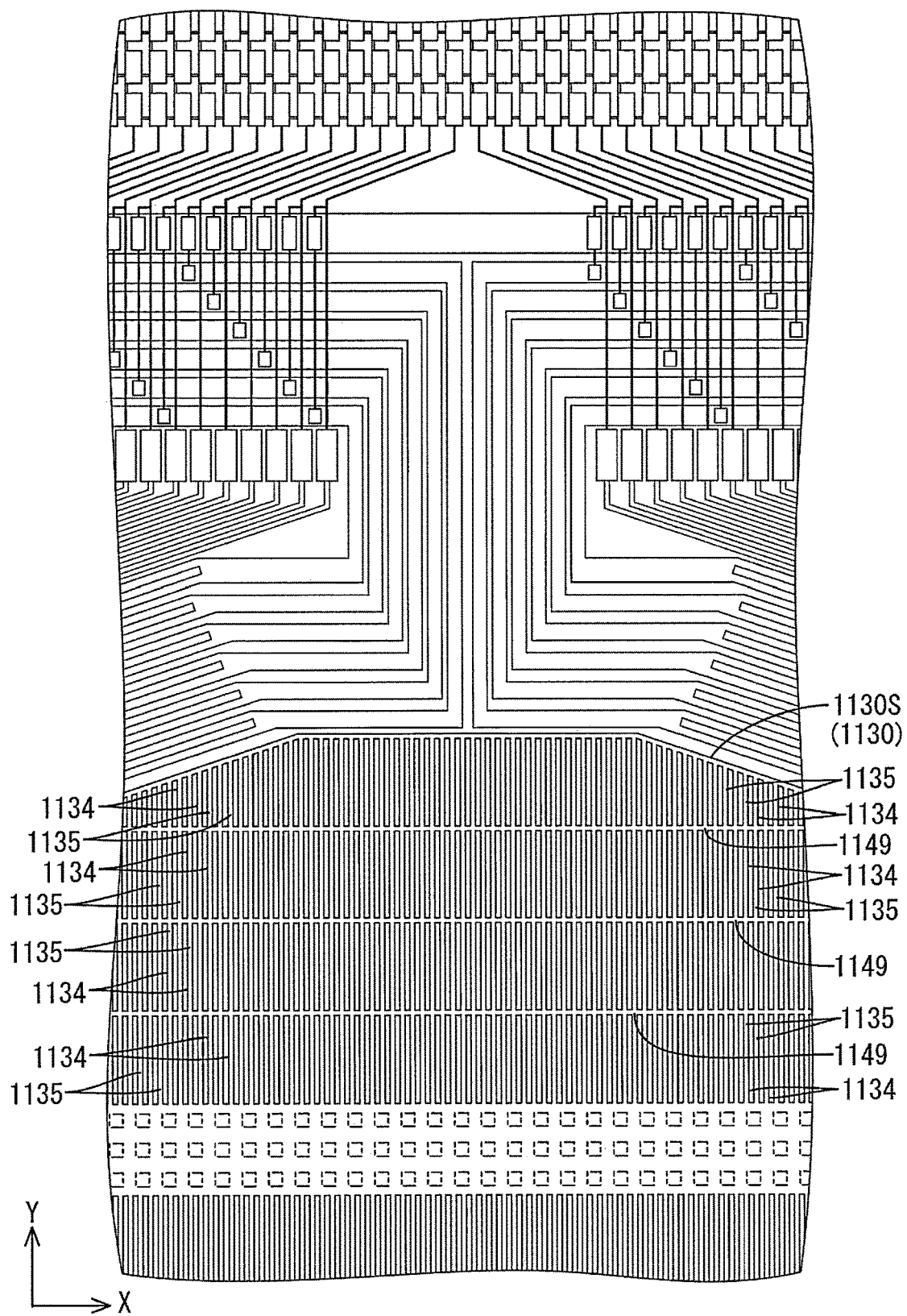
FIG. 25 is a plan view illustrating a tracing configuration between a pair of source side drivers in a non-display area of an array board included in a liquid crystal panel according to a twelfth embodiment of the present invention.

As illustrated in FIG. 25, the common electrode connection line portion 1130 partially include empty portions 1134 and is defined into a plurality of divided common electrode connection lines 1135. Adjacent divided common electrode connection lines 1135 are short-circuited by the short-circuit portions 1149. The short-circuit portions 1149 extend along a direction crossing an extending direction of the divided common electrode connection lines 1135 and empty portions 1134 (an arrangement direction in which the divided common electrode connection lines 1135 and the empty portions 1134 are arranged). Thus, the short-circuit portions 1149 are connected to the divided common electrode connection line 1135 that crosses the short-circuit portions 1149. The short-circuit portions 1149 are disposed at intervals in the extending direction of the divided common electrode connection lines 1135 and the empty portions 1134. Each of the divided common electrode connection lines 1135 is connected to the short-circuit portions 1149 at several portions thereof with respect to the extending direction at intervals. According to such a configuration, if any one of the divided common electrode connection lines 1035 is disconnected, two side portions sandwiching the disconnected portion are connected (short-circuited) to the adjacent divided common electrode connection lines 1135 via the short-circuit portions 1149 so that the divided common electrode connection line 1135 having the disconnected portion keeps electric potential same as that of the adjacent divided common electrode connection lines 1135. Further, the common electrode connection line portion 1130 increases an area thereof by an area of the short-circuit portions 1149 and therefore line resistance is reduced. Although only source-side common electrode connection line portion 1130S is illustrated in FIG. 25, a gate-side common electrode connection line portion also include the short-circuit portions 1149.

Thirteenth Embodiment

A thirteenth embodiment of the present invention will be described with reference to FIG. 26. In the thirteenth embodiment, a common electrode connection line portion 1230 includes empty portions 1234 and the empty portions 1234 have a plan view shape that differs from that of the second embodiment. Structures, functions, and effects similar to those of the second embodiment will not be described.

Figure 26:
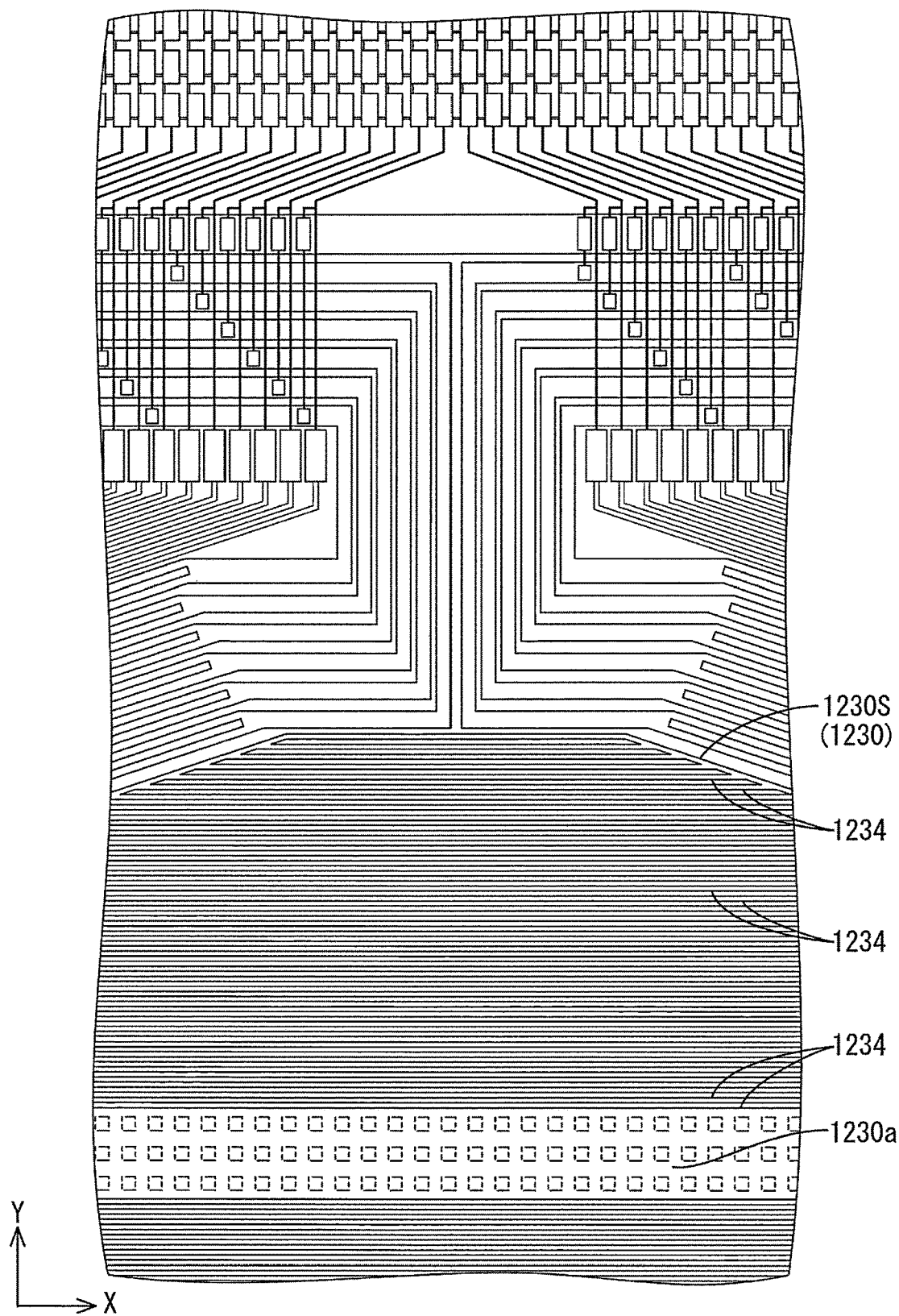
FIG. 26 is a plan view illustrating a tracing configuration between a pair of source side drivers in a non-display area of an array board included in a liquid crystal panel according to a thirteenth embodiment of the present invention.

As illustrated in FIG. 26, the common electrode connection line portion 1230 of this embodiment includes empty portions 1234 extending along an extending direction in which a transfer pad portion 1230a extends. Namely, the empty portions 1234 of this embodiment have a plan view shape extending in a direction perpendicular to the extending direction of the empty portions 34 of the second embodiment. Although only the source-side common electrode connection line portion 1230S is illustrated in FIG. 26, a gate-side common electrode connection line portion includes similar empty portions 1234.

Fourteenth Embodiment

A fourteenth embodiment of the present invention will be described with reference to FIG. 27. In the fourteenth embodiment, unlike the thirteenth embodiment, a common electrode connection line portion 1330 includes divided common electrode connection lines 1335 and short-circuit portions 1349. Namely, the configuration of the fourteenth embodiment is similar to that of the twelfth embodiment. Structures, functions, and effects similar to those of the twelfth and thirteenth embodiments will not be described.

Figure 27:
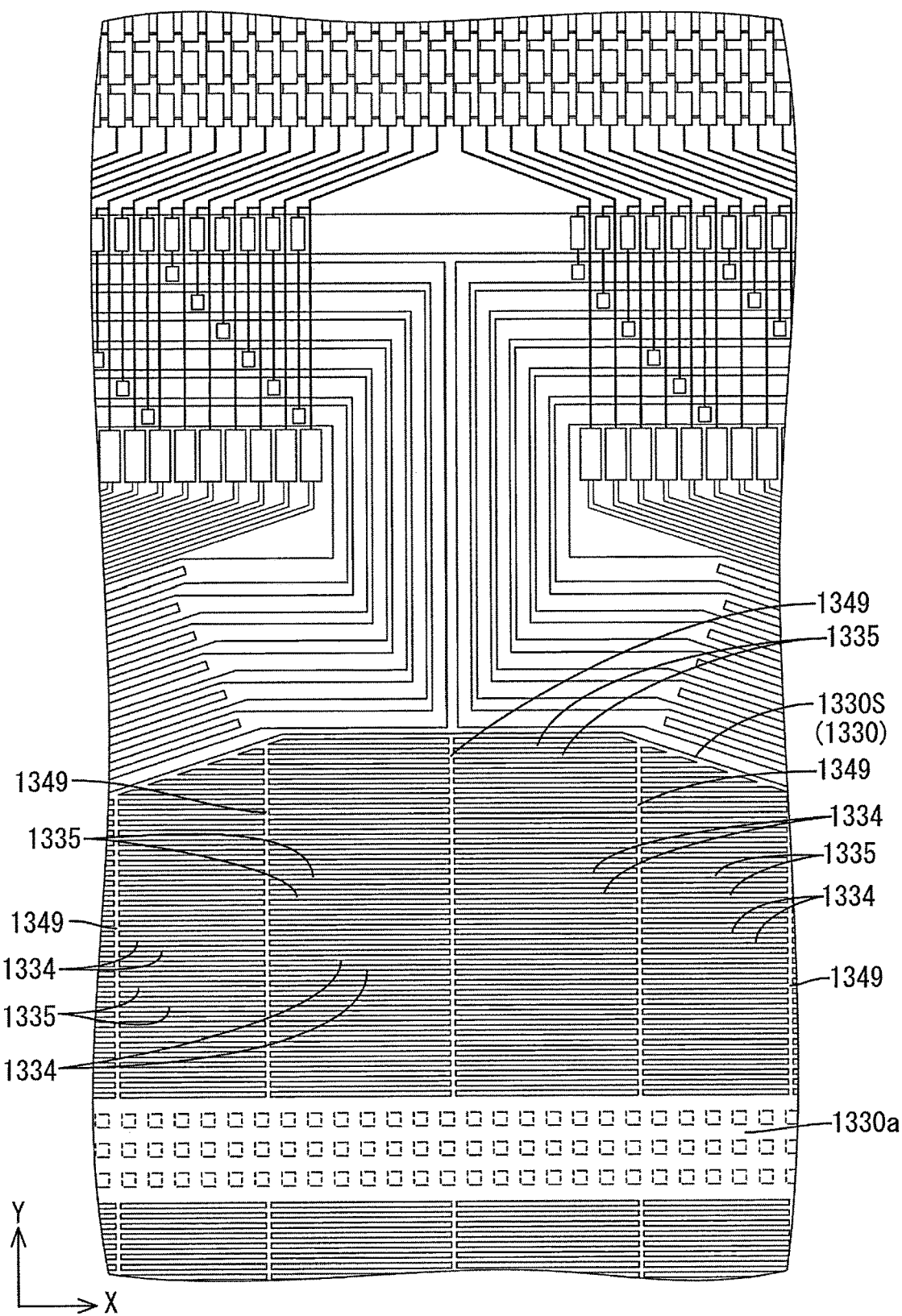
FIG. 27 is a plan view illustrating a tracing configuration between a pair of source side drivers in a non-display area of an array board included in a liquid crystal panel according to a fourteenth embodiment of the present invention.

As illustrated in FIG. 27, the common electrode connection line portion 1330 partially include empty portions 1334 and is defined into a plurality of divided common electrode connection lines 1335. Adjacent divided common electrode connection lines 1335 are short-circuited by the short-circuit portions 1349. The short-circuit portions 1349 extend along a direction crossing an extending direction of the divided common electrode connection lines 1335 and empty portions 1134, that is, along a direction crossing an extending direction of the transfer pad portion 1330a (the extending direction of the transfer pad portion 1330a matches an arrangement direction in which the divided common electrode connection lines 1335 and the empty portions 1334 are arranged). Thus, the short-circuit portions 1349 are connected to the divided common electrode connection line 1335 that crosses the short-circuit portions 1349. The short-circuit portions 1349 are disposed at intervals in the extending direction of the divided common electrode connection lines 1335 and the empty portions 1334. Each of the divided common electrode connection lines 1335 is connected to the short-circuit portions 1349 at several points in the extending direction thereof. The functions of the short-circuit portions 1349 are similar to those in the twelfth embodiment. Although only source-side common electrode connection line portion 1330S is illustrated in FIG. 27, a gate-side common electrode connection line portion also include the short-circuit portions 1349.

Fifteenth Embodiment

A fifteenth embodiment of the present invention will be described with reference to FIG. 28. A configuration of the fifteenth embodiment includes a parallax barrier panel 50 in addition to the configuration of the first embodiment. Structures, functions, and effects similar to those of the first embodiment will not be described.

Figure 28:
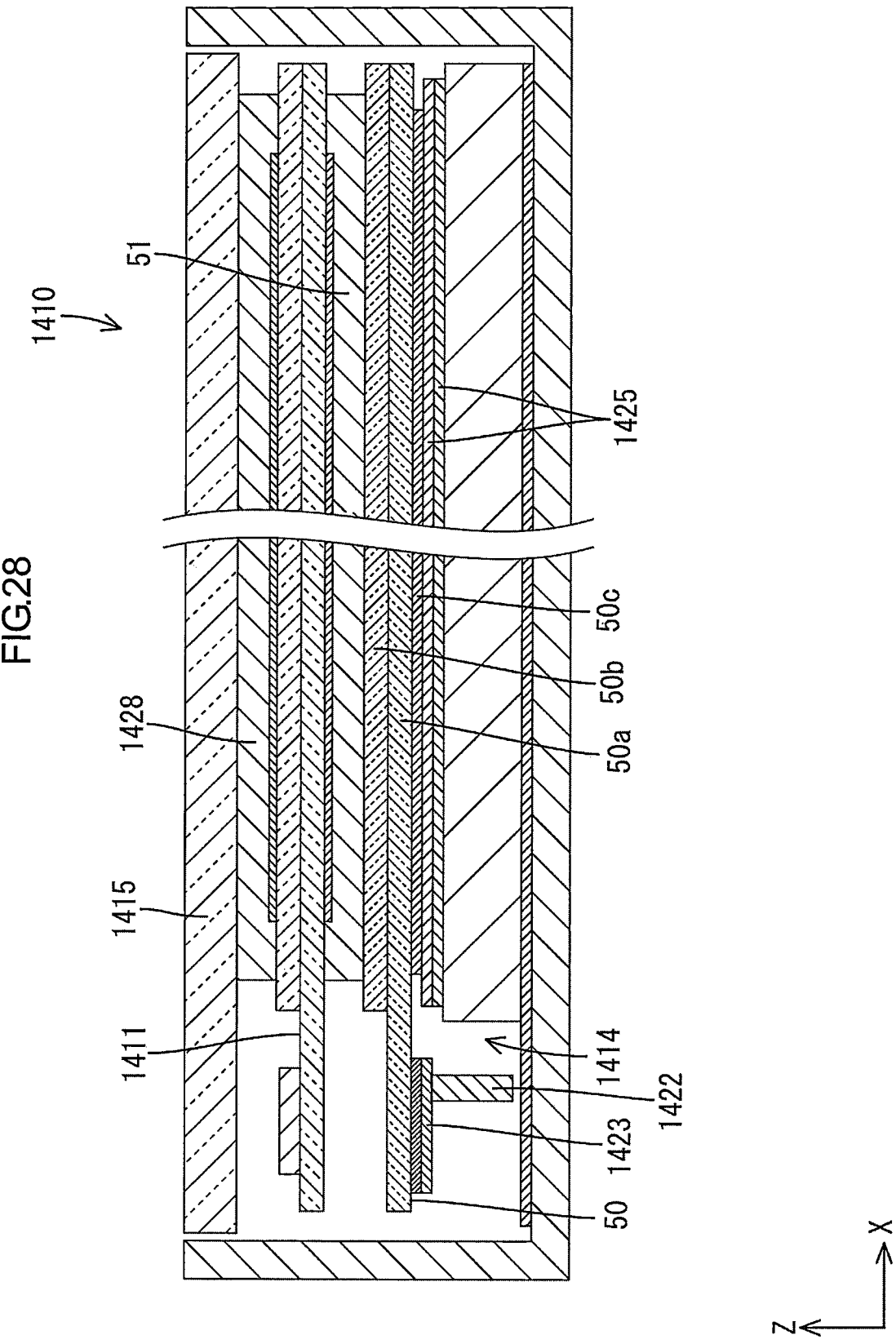
FIG. 28 is a cross-sectional view illustrating a cross-sectional configuration along a long-side direction of a liquid crystal panel according to a fifteenth embodiment of the present invention.

As illustrated in FIG. 28, a liquid crystal display device 1410 of this embodiment includes the parallax barrier panel 1410. The parallax barrier panel 50 is arranged (sandwiched) between a liquid crystal panel 1411 and a backlight unit 1414. The parallax barrier panel 50 is layered on an optical sheet 1425 included in the backlight unit 1414 and fixed to a rear-side surface of the liquid crystal panel 1411 via an adhesive member 51. The adhesive member 51 is similar to an adhesive member 28 that fixes the liquid crystal panel 1411 and a touch panel 1415. The parallax barrier panel 50 includes a pair of transparent (having transmissive properties) glass boards 50a and 50b and a liquid crystal layer (not illustrated). The liquid crystal layer is disposed between the boards 50a and 50b and includes liquid crystal molecules that change optical properties thereof according to application of an electric field. The boards 50a and 50b are bonded together via a sealing member (not illustrated) with keeping a gap of a thickness of the liquid crystal layer therebetween. Namely, the parallax barrier panel 50 is a liquid crystal panel. The parallax barrier panel 50 has a screen size that is substantially same as that of the liquid crystal panel 1411. A polarizing plate 50c is attached to the board 50b on an outer surface side thereof. An LED board 1423 where LEDs 1422 are mounted is attached to a rear-side surface of the parallax barrier panel 50. A barrier portion (not illustrated) is formed in the parallax barrier panel 50 by controlling the orientation of the liquid crystal molecules and the light transmittance according to the voltage applied to the liquid crystal layer. Accordingly, an image appearing on the liquid crystal panel 1411 via the pixels (not illustrated) is separated by the parallax so that a viewer (a user) can see the image. A liquid crystal display device 1410 of this embodiment is used for in-vehicle terminals. Therefore, users may be in a driver's seat and a passenger's seat and the liquid crystal display device 1410 may be disposed between the driver's seat and the passenger's seat. In such a case, an image for a driver's seat and an image for a passenger's seat appear on a display surface of the liquid crystal panel 1411 and the light transmittance of the liquid crystal layer of the parallax barrier panel 50 is controlled to form a barrier portion so that the user in the driver's seat sees only the image for a driver's seat and the user in the passenger's seat sees only the image for a passenger's seat. The liquid crystal display device 1410 including the parallax barrier panel 50 has a multi-view (dual view) function that enables viewers having two different visual angles to see different images.

Other Embodiment

The present invention is not limited to the above embodiments described with reference to the drawings. The following embodiments may be included in the technical scope of the present invention.

(1) In each of the embodiments (except for the third to sixth embodiments), the empty portion formed in the common electrode connection line portion has a width dimension same as that of each divided common electrode connection line. However, the width dimension of the empty portion may differ from that of each divided common electrode connection line, that is, the width dimension of the empty portion may be greater than that of each divided common electrode connection line or the width dimension of the empty portion may be smaller than that of each divided common electrode connection line. In such a configuration, the width dimension of the empty portion is preferably ⅓ of the width dimension of each divided common electrode connection line or greater than ⅓ thereof. The empty portions in the common electrode connection line portion may have two or more variations in the width dimension thereof or the divided common electrode connection lines may have two or more variations in the width dimension thereof.

(2) In each of the embodiments (except for the third to sixth embodiments), the width dimension of each signal line connection line (the source line connection line, the gate line connection line) is equal to an interval between the adjacent signal line connection lines (the source line connection lines, the gate line connection lines). However, the width dimension of each signal line connection line (the source line connection line, the gate line connection line) may differ from the interval between the adjacent signal line connection lines (the source line connection lines, the gate line connection lines), that is, the width dimension of the empty portion may be greater than the width dimension of each divided common electrode connection line or the width dimension of each signal line connection line (the source line connection line, the gate line connection line) may be smaller than the interval between the adjacent signal line connection lines (the source line connection lines, the gate line connection lines). The signal line connection line (the source line connection line, the gate line connection line) may have two or more variations in the width dimension thereof or the adjacent signal line connection lines (the source line connection lines, the gate line connection lines) may have two or more variations in the interval therebetween.

(3) In each of the embodiments (except for the third to sixth embodiments), the empty portion formed in the common electrode connection line portion has a width dimension same as that of each signal line connection line (the source line connection line, the gate line connection line). However, the width dimension of the empty portion in the common electrode connection line portion may differ from that of each signal line connection line (the source line connection line, the gate line connection line), that is, the width dimension of the empty portion may be greater than that of each signal line connection line (the source line connection line, the gate line connection line) or the width dimension of the empty portion may be smaller than that of each signal line connection line (the source line connection line, the gate line connection line). In such a configuration, the width dimension of the empty portion is preferably ⅓ of the width dimension of each signal line connection line (the source line connection line, the gate line connection line) or greater than ⅓ thereof.

(4) In each of the embodiments (except for the third to sixth embodiments), a width dimension of each divided common electrode connection line is equal to a width dimension of each signal line connection line (the source line connection line, the gate line connection line). However, the width dimension of the divided common electrode connection line may differ from that of each signal line connection line (the source line connection line, the gate line connection line), that is, the width dimension of the divided common electrode connection line may be greater than that of each signal line connection line (the source line connection line, the gate line connection line) or the width dimension of the divided common electrode connection line may be smaller than that of each signal line connection line (the source line connection line, the gate line connection line).

(5) In each of the embodiments (except for the third to sixth embodiments), the width dimension of the empty portion formed in the common electrode connection line portion is equal to the interval between the adjacent signal line connection lines (the source line connection lines, the gate line connection lines). However, the width dimension of the empty portion formed in the common electrode connection line portion may differ from the interval between the adjacent signal line connection lines (the source line connection lines, the gate line connection lines), that is, the width dimension of the empty portion may be greater than the interval between the adjacent signal line connection lines (the source line connection lines, the gate line connection lines) or the width dimension of the empty portion may be smaller than the interval between the adjacent signal line connection lines (the source line connection lines, the gate line connection lines).

(6) In each of the embodiments (except for the third to sixth embodiments), the width dimension of each divided common electrode connection line is equal to an interval between the adjacent signal line connection lines (the source line connection lines, the gate line connection lines). However, the width dimension of each divided common electrode connection line may differ from the interval between the adjacent signal line connection lines (the source line connection lines, the gate line connection lines), that is, the width dimension of each divided common electrode connection line may be greater than the interval between the adjacent signal line connection lines (the source line connection lines, the gate line connection lines) or the width dimension of each divided common electrode connection line may be smaller than the interval between the adjacent signal line connection lines (the source line connection lines, the gate line connection lines).

(7) In each of the embodiments (except for the third to sixth embodiments), the width dimension of the empty portion formed in the common electrode connection line portion, the width dimension of each divided common electrode connection line, the width dimension of each divided common electrode connection line, and the interval between the adjacent signal line connection lines (the source line connection lines, the gate line connection lines) are 10 µm, respectively. However, the specific value may be altered if necessary (for example, 3 µm).

(8) In each of the embodiments (except for the third to sixth embodiments), a ratio of a total area of the empty portions to a total area of the common electrode connection line portion is approximately 50%. However, the specific value may be altered if necessary. When a ratio of a total area of the empty portions between the adjacent signal line connection lines (the source line connection lines, the gate line connection lines) to a total area of the signal line connection lines (the source line connection lines, the gate line connection lines) is approximately 50%, it is preferably to keep the ratio of the total area of the empty portions to the area of the common electrode connection line portion to be 18% or more to keep the good appearance of the liquid crystal display device.

(9) In each of the embodiments (except for the third to sixth embodiments), a ratio of a total area of the empty portions between the adjacent signal line connection lines (the source line connection lines, the gate line connection lines) to a total area of the signal line connection lines (the source line connection lines, the gate line connection lines) is approximately 50%. However, the specific value may be altered if necessary.

(10) In each of the embodiments (except for the third to sixth embodiments), each of the empty portions formed in the common electrode connection line portion has a shape of an elongated slit. However, each empty portion may have a plan view shape of a quadrangle shape (a square shape, a rectangular shape), a triangle shape, a circular shape, an ellipsoidal shape, a trapezoidal shape, a pentagonal shape, or other polygonal shapes. In such a configuration, it is preferable to form the empty portions at intervals along the extending direction in which the signal line connection lines (the source line connection lines, the gate line connection lines) extend.

(11) In each of the embodiments (except for the third to sixth embodiments), the empty portions formed in the common electrode connection line portion may alter in the plan view shape, the number, and the formation area if necessary. For example, the common electrode connection line portion of the first embodiment may include the empty portions having the plan view shape of the second and thirteenth embodiments. The divided common electrode connection lines may alter the plan view shape, the number, and the formation area thereof according to the alternation of the plan view shape, the number, and the formation area of the empty portions.

(12) Other than the eleventh, twelfth, and fourteenth embodiments, the short-circuit portions may alter the plan view shape (such as the extending direction), the number, and the formation area if necessary. For example, the short-circuit portions may extend obliquely with respect to the X-axis direction and the Y-axis direction. Among the short-circuit portions extending in the X-axis direction, the short-circuit portions extending in the Y-axis direction, and the short-circuit portions extending obliquely with respect to the X-axis direction and the Y-axis direction, two or three kinds of short-circuit portions may be formed.

(13) In each of the embodiments, the common electrode connection line portion includes the sealing empty portions. However, the sealing empty portions are not necessarily included in the common electrode connection line portion if the sealing member is made of thermosetting resin that is cured by heat or if the ultraviolet rays that cure the sealing member are effectively directed toward the sealing member.

(14) In each of the embodiments, the sealing member is made of ultraviolet curable resin. However, the sealing member may be made of thermosetting resin that is cured by visible light or made of thermosetting resin that is cured by heat.

(15) In each of the embodiments, the transfer pad portion of the common electrode connection line portion is disposed on a display area side with respect to the sealing member overlapping portion. However, the sealing member overlapping portion may be disposed on the display area side with respect to the transfer pad portion.

(16) In the second embodiment (the fourth, sixth, eighth, and tenth embodiments), the second empty portions formed in the angled portions of the first source-side check lines have a slit shape extending along the angled portions. However, the second empty portions may have a plan view shape of a quadrangle shape (a square shape, a rectangular shape), a triangle shape, a circular shape, an ellipsoidal shape, a trapezoidal shape, a pentagonal shape, or other polygonal shapes. In such a configuration, it is preferable to dispose the empty portions at intervals along the extending direction in which the angled portions extend.

(17) In the second embodiment (the fourth, sixth, eighth, and tenth embodiments), the angled portions of the first source-side check lines include the second empty portions. However, the first straight portions or the second straight portions may include the second empty portions.

(18) In the second embodiment (the fourth, sixth, eighth, and tenth embodiments), the first source-side check lines include the second empty portions. Further, the second source-side check lines may also include the second empty portions.

(19) In the second embodiment (the fourth, sixth, eighth, and tenth embodiments), the first source-side check lines include the second empty portions. However, the first gate-side check lines or the second gate-side check lines may include the second empty portions.

(20) In the second embodiment (the fourth, sixth, eighth, and tenth embodiments), all the first source-side check lines include the second empty portions. However, a part of the first source-side check lines may include the second empty portions and another part of the first source-side check lines may include no first source-side check lines.

(21) Other than the second embodiment (the fourth, sixth, eighth, and tenth embodiments), the plan view arrangement, the tracing paths, the line width, and the arrangement interval may be altered if necessary.

(22) In the third embodiment (the fourth, seventh, and eighth embodiments), the pair of alignment films includes an area that does not overlap the lines in a plan view. However, only one of the two alignment films may include an area that does not overlap the lines in a plan view and another one of the two alignment films may include an area that overlaps the lines in a plan view similarly to the first and second embodiments. According to such a configuration, one of the alignment films is not disposed in an area that overlaps the lines in a plan view (the liquid crystals non-orientation portion). Therefore, the orientation of the liquid crystal molecules included in the liquid crystal layer in the area is less likely to be controlled and light is less likely pass through the area.

(23) In the fifth embodiment (the sixth, ninth, and tenth embodiments), the pair of alignment films includes the orientation non-processed portion that overlaps the lines in a plan view. One of the alignment films may include the orientation non-processed portion that overlaps the lines and another one of the alignment films may include the orientation processed portion in an entire area thereof similarly to the first and second embodiments. According to such a configuration, one of the alignment films includes the orientation non-processed portion in an area that overlaps the lines in a plan view (the liquid crystals non-orientation portion). Therefore, the orientation of the liquid crystal molecules included in the area of the liquid crystal layer is less likely to be controlled and light is less likely to pass through the area.

(24) In the fifth embodiment (the sixth, ninth, and tenth embodiments), the alignment films have the same plan view formation area of the alignment processed portion and the same plan view formation area of the alignment non-processed area. However, the alignment films may have different plan view formation areas of the alignment processed portion and different plan view formation areas of the alignment non-processed portion.

(25) In each of the embodiments, the rubbing processing is executed as the orientation processing of the alignment films. However, photo-alignment processing may be executed as the orientation processing.

(26) Other than the embodiments, the specific metal material used for the signal line connection lines (the source line connection lines, the gate line connection lines) and the common electrode connection line portion may be altered if necessary. For example, the signal line connection lines (the source line connection lines, the gate lines connection) and the common electrode connection line portion may be made of the same metal as that of the source lines. Further, the signal line connection lines (the source line connection lines, the gate lines connection) are made of metal different from that of the common electrode connection line portion.

(27) In each of the embodiments, the TFTs of the pixels (the dummy TFTs of the dummy pixels and the ESD protection portion) include an amorphous silicon thin film as a semiconductor film. However, the semiconductor film made of an oxide semiconductor material (such as In—Ga—Zn—O (oxide) semiconductor material (Indium Gallium Zinc Oxygen)) may be used as the semiconductor film. Following oxide semiconductor materials may be used other than the In—Ga-An-O (oxide) semiconductor (Indium Gallium Zinc Oxygen). Specifically, an oxide containing indium (In), silicon (Si), and zinc (Zn), an oxide containing indium (In), aluminum (Al), and zinc (Zn), an oxide containing tin (Sn), silicon (Si), and zinc (Zn), an oxide containing tin (Sn), aluminum (Al), and zinc (Zn), an oxide containing tin (Sn), gallium (Ga), and zinc (Zn), an oxide containing gallium (Ga), silicon (Si), and zinc (Zn), an oxide containing gallium (Ga), aluminum (Al), and zinc (Zn), an oxide containing indium (In), copper (Cu), and zinc (Zn), an oxide containing tin (Sn), copper (Cu), and zinc (Zn) may be used. A semiconductor film made of continuous grain silicon (CG silicon) thin film that is a kind of a polycrystalline silicone thin film may be used. The CG silicon thin film is formed by adding a metal material to the amorphous silicon thin film and heating the amorphous silicon thin film at a low temperature of approximately 550° C. for a short time. Accordingly, the atomic arrangement in silicon grain boundary has continuity. The electron mobility in the CG silicon thin film is approximately 200-300 cm2/Vs that is greater than that of the amorphous silicon thin film. Therefore, the TFTs are reduced in size easily and the amount of light passing through the pixel electrodes is greatly increased and this is effective to increase precision and decrease power consumption. The TFTs including such a semiconductor film are stagger type (coplanar type) TFTs in which the semiconductor film is disposed as a lowermost layer and the gate electrode is laminated thereon having an insulation film therebetween.

(28) The array board includes the ESD protection portions and the dummy pixels in each of the above embodiments. However, the array board may not include one of the ESD protection portions and the dummy pixels.

(29) Other than the above embodiments, the number of drivers may be altered and the gate-side drivers may not be provided.

(30) The driver is mounted directly on the array board by the COG method in the above embodiments. However, the driver mounted on the flexible printed circuit board connected to the array board through ACF may be included in the scope of the present invention.

(31) The liquid crystal panel 11 is the TN type in each of the embodiments. However, the present invention is applied to the liquid crystal panel of a VA type, a MVA type, an IPS type, or a FFS type.

(32) In each of the embodiments, the liquid crystal display device include the touch panel, the liquid crystal panel, and the backlight unit that are collectively arranged in the casing. However, a chassis where components of the backlight unit are arranged may be additionally provided. In such a case, the LED boards may not be attached to the liquid crystal panel but may be arranged in the chassis.

(33) The backlight device in the liquid crystal display device is the edge-light type in the above embodiments. However, a liquid crystal display device including a direct backlight device may be included in the scope of the present invention.

(34) The LEDs are used as the light source of the backlight device in the above embodiments. However, other light source (such as organic ELs) may be used.

(35) Each of the above embodiments includes the transmissive type liquid crystal display device including the backlight device as an external light source. However, a semi-transmissive type liquid crystal display device (a reflective and transmissive type) configured to display images using light from the backlight device (transmissive type display) and configured to display images using external light (reflective type display) may be included in the scope of the present invention.

(36) Each of the above embodiments includes the TFTs as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

(37) The touch panel is disposed on a front side with respect to the liquid crystal panel in each of the embodiments. However, the touch panel may not be included if a touch panel pattern is formed on the CF board included in the liquid crystal panel. The touch panel may be simply omitted without forming the touch panel pattern on the liquid crystal panel.

(38) The parallax barrier panel is disposed between the liquid crystal panel and the backlight unit in the fifteenth embodiment. However, the parallax barrier panel may be disposed between the liquid crystal panel and the touch panel. Further, the parallax barrier panel may be disposed outside the touch panel so that the touch panel is sandwiched between the parallax barrier panel and the liquid crystal panel.

(39) The parallax barrier panel has a multi-view (dual view) function in the fifteenth embodiment. A parallax barrier panel that enables a viewer to see three-dimensional images may be used.

(40) The above embodiments include the liquid crystal display devices used for in-vehicle terminals. The present invention may be applied to liquid crystal display devices used for mobile phones (including smart phones), laptop computers (including tablet type computers), digital photo frames, and portable video games.

EXPLANATION OF SYMBOLS

11, 111,211, 311, 411, 511, 611, 711, 811, 911, 1411: Liquid crystal panel (a display device), 11*a*, 111*a*, 211*a*, 311*a*, 411*a*, 511*a*, 611*a*, 722*a*, 811*a*, 911*a*: CF board (a board), 11*b*, 111*b*, 211*b*, 311*b*, 411*b*, 511*b*, 611*b*, 711*b*, 811*b*, 911*b*: Array board (a board), 11*c*, 211*c*, 311*c*, 411*c*, 511*c*, 611*c*, 711*c*, 811*c*, 911*c*: Liquid crystal layer, 11*d*, 211*d*, 311*d*, 411*d*, 511*d*, 611*d*, 711*d*, 811*d*, 911*d*: Alignment film, 11*e*, 211*e*, 311*e*, 411*e*, 511*e*, 611*e*, 711*e*, 811*e*, 911*e*: Alignment film, 11*i*, 111*i*, 211*i*, 611*i*: Light blocking layer (a light blocking portion), 11*j*, 411*j*, 511*j*, 611*j*, 711*j*, 811*j*, 911*j*: Common electrode, 11*k*, 211*k*, 311*k*. 4111*k*, 511*k*, 611*k*, 711*k*, 811*k*, 911*k*: Sealing member, 18: Pixel electrode, 21, 121: Driver (signal processor), 29, 129, 229, 329: Signal line connection lines (a narrow line portion, a line portion), 30, 130, 230, 330, 430, 530, 630, 730, 830, 930, 1030, 1130, 1230, 1330: Common electrode connection line portion (a wide line portion), 31, 131, 231, 331: Dummy pixels (a second light blocking portion), 32, 132, 232, 332, 432: ESD protection portion (a second light blocking portion), 34, 134, 234, 334, 634, 734, 834, 934, 1034, 1134, 1234, 1334: Empty portion, 35, 1035, 1135, 1235, 1335: Divided common electrode connection line (a divided line), 36: Alignment film overlap portion, 37, 637, 737: Alignment film non-overlap portion, 38, 238, 338: Sealing member overlap portion, 39: Sealing non-overlap portion, 40, 240: Sealing empty portion, 42, 342: Check line (a narrow line portion, a wide line portion, a line portion, a check line portion), 43: Second empty portion (an empty portion), 47, 447, 547, 647, 747, 847, 947: Liquid crystal orientation portion, 48, 448, 548, 648, 748, 848, 948: Liquid crystal non-orientation portion, 49, 1149, 1349: Short-circuit portion, AA: Display area, AFA: Alignment film arrangement area, AFNA: Alignment film non-arrangement area, AP: Orientation-processed portion, ANP: Orientation non-processed portion, NAA: Non-display area

The invention claimed is:

1. A display device comprising:
a display area where images are displayed;
a non-display area that is outside the display area;
substrates each including the display area and the non-display area; and
a liquid crystal layer sandwiched between the substrates;
one of the substrates including:
lines in the display area;
connection lines at intervals in the non-display area;
at least two groups of terminals at intervals in the non-display area;
at least two groups of the connection lines connecting the at least two groups of the terminals and the lines, respectively;
the at least two groups of connection lines including at least two narrow line portions, respectively;
the at least two narrow line portions respectively spreading outwardly with increasing distance from the at least two groups of the terminals;
a wide line portion between the at least two narrow line portions;
pixel electrodes provided in the display area;
an insulation film that covers the wide line portion and the at least two narrow line portions; and
contact holes formed in a portion of the insulation film; and
another one of the substrates including:
a light blocking portion overlapped with the connection lines and the wide line portion in the non-display area, wherein
the wide line portion includes divided lines that are defined by empty portions and are arranged at intervals,
the wide line portion includes a short-circuit portion to short-circuit adjacent divided lines,
a common electrode that is opposite to the pixel electrodes, and
the wide line portion is connected to the common electrode via the contact holes at a portion where the light blocking portion is in the non-display area.

2. The display device according to claim 1, wherein the wide line portion has a first width in a portion that is close to the display area and a second width in a portion that is far from the display area and the second width is greater than the first width.

3. The display device according to claim 1, wherein the empty portions include angled portions and straight portions.

4. The display device according to claim 3, wherein
the angled portions include a first angled portion extending in a first direction and a second angled portion extending in a second direction different from the first direction, and
the straight portions extend in a third direction different from the first direction and the second direction.

5. The display device according to claim 1, wherein
the short-circuit portion includes short-circuit portions, and
the short circuit portions include a first short-circuit portion extending along a first direction and a second short-circuit portion extending along a second direction different from the first direction.

6. The display device according to claim 5, wherein the second direction is perpendicular to the first direction.

7. The display device according to claim 5, wherein the short-circuit portions further include a third short circuit portion extending along a third direction crossing the first direction and the second direction.

8. The display device according to claim 1, wherein the short-circuit portion extends along a direction perpendicular to an extending direction in which the empty portions or the divided lines extend.

9. The display device according to claim 8, wherein
the short-circuit portion includes short-circuit portions that are arranged at intervals along the extending direction of the empty portions or the divided lines.

10. The display device according to claim 1, wherein the contact holes are arranged at intervals each of which is larger than a line width of the divided lines or a width of the empty portions.

11. The display device according to claim 1, wherein each of the divided lines includes a line width that is equal to that of each of the connection lines.

12. The display device according to claim 1, wherein adjacent divided lines have an interval therebetween that is equal to an interval between adjacent connection lines.

13. The display device according to claim 1, wherein
the one of the substrates further includes:
electro-static discharge (ESD) protection portions connected to the respective connection lines and overlapped with the light blocking portion, and
a group of ESD protection portions includes ESD protection portions arranged at intervals along a direction that is perpendicular to the extending direction of the lines.

14. The display device according to claim 1, wherein
the one of the substrates further includes switching components in the display area,
the pixel electrodes are connected to drain electrodes of the switching components, and
the lines are connected to gate electrodes of the switching components.

15. The display device according to claim 1, wherein
the one of the substrates further includes switching components in the display area,
the pixel electrodes are connected to drain electrodes of the switching components, and
the lines are connected to source electrodes of the switching components.

16. The display device according to claim 1, wherein
the one of the substrates further includes:
in the non-display area, switching components connected to the connection lines, and
in the non-display area, lines located between the wide line portion and the display area, and the lines located between the wide line portion and the display area are substantially parallel to the connection line.

17. The display device according to claim 16, wherein the lines located between the wide line portion and the display area include empty portions.

18. The display device according to claim 1, wherein the one of the substrates further includes an alignment film located over the display area and the non-display area, the narrow line portion includes a portion that overlaps the alignment film in a plan view, the wide line portion includes an alignment film overlap portion overlapping the alignment film and an alignment film non-overlap portion that does not overlap the alignment film, and the empty portions are at least in the alignment non-overlap portion.

19. The display device according to claim 1, wherein the common electrode and the wide line portion are electrically connected via a conductive layer.

20. The display device according to claim 1, wherein the empty portions are provided in the non-overlap portion of the wide line portion with the contact holes.

21. The display device according to claim 1, wherein the display device is a liquid crystal panel of an IPS type or an FFS type.

22. The display device according to claim 1, wherein the display device is a liquid crystal panel of a VA type.

* * * * *